US 12,313,826 B2

(12) United States Patent
Yamashita et al.

(10) Patent No.: US 12,313,826 B2
(45) Date of Patent: May 27, 2025

(54) OPTICAL SYSTEM, OPTICAL APPARATUS AND METHOD FOR MANUFACTURING THE OPTICAL SYSTEM, AND ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventors: Masashi Yamashita, Tokyo (JP); Tomoki Ito, Kawasaki (JP); Tomonori Kuribayashi, Yokohama (JP); Keigo Koida, Kawasaki (JP); Satoshi Miwa, Yokohama (JP); Yoko Komatsubara, Yokohama (JP); Katsuya Watanabe, Yokohama (JP); Azuna Nonaka, Yokohama (JP); Ayumu Makida, Kawaguchi (JP)

(73) Assignee: Nikon Corporation, Tokyo (JP)

(*) Notice: Subject to any disclaimer, the term of this patent is extended or adjusted under 35 U.S.C. 154(b) by 7 days.

(21) Appl. No.: 17/636,872

(22) PCT Filed: Aug. 26, 2020

(86) PCT No.: PCT/JP2020/032105
§ 371 (c)(1),
(2) Date: Feb. 19, 2022

(87) PCT Pub. No.: WO2021/039813
PCT Pub. Date: Mar. 4, 2021

(65) Prior Publication Data
US 2022/0269056 A1    Aug. 25, 2022

(30) Foreign Application Priority Data

Aug. 30, 2019 (JP) .................................. 2019-157739
Aug. 30, 2019 (JP) .................................. 2019-157743

(51) Int. Cl.
*G02B 15/14* (2006.01)
*G02B 13/00* (2006.01)

(52) U.S. Cl.
CPC ..... *G02B 15/145523* (2019.08); *G02B 13/006* (2013.01)

(58) Field of Classification Search
CPC .............. G02B 6/64; G02B 13/006; G02B 15/145113; G02B 15/145121; G02B 15/145523; G02B 15/1461
See application file for complete search history.

(56) References Cited

U.S. PATENT DOCUMENTS

| 5,157,550 A | 10/1992 | Tsuchida et al. |
| 8,114,796 B2 | 2/2012 | Ritter et al. |

(Continued)

FOREIGN PATENT DOCUMENTS

| CN | 108689599 A | 10/2018 |
| CN | 208818913 U | 5/2019 |

(Continued)

OTHER PUBLICATIONS

Office Action issued Oct. 4, 2022, in Japanese Patent Application No. 2021-542946.

(Continued)

*Primary Examiner* — Jack Dinh
(74) *Attorney, Agent, or Firm* — Potomac Law Group, PLLC

(57) ABSTRACT

This optical system (LS) has an aperture diaphragm (S) and a negative lens (L4) disposed closer to an object side than the aperture diaphragm (S) and satisfies the following conditional expression.

$-0.010 < ndN1 - (2.015 - 0.0068 \times vdN1)$, $50.00 < vdN1 < 65.00$, $0.545 < \theta gFN1$, $-0.010 < \theta gFN1 - (0.6418 - 0.00168 \times vdN1)$.

(Continued)

Where, ndN1 is a refractive index of the negative lens with respect to a d-line,
vdN1 is an Abbe number of the negative lens based on the d-line, and
θgFN1 is a partial dispersion ratio of the negative lens.

20 Claims, 47 Drawing Sheets

(56) References Cited

U.S. PATENT DOCUMENTS

| | | |
|---|---|---|
| 10,852,535 B2 | 12/2020 | Nagatoshi et al. |
| 2004/0259714 A1 | 12/2004 | Fujiwara et al. |
| 2019/0094533 A1 | 3/2019 | Nagatoshi et al. |
| 2019/0293907 A1 | 9/2019 | Emi |
| 2020/0018937 A1 | 1/2020 | Yamada et al. |
| 2021/0011256 A1 | 1/2021 | Muratani et al. |

FOREIGN PATENT DOCUMENTS

| | | |
|---|---|---|
| JP | 61-40839 A | 2/1986 |
| JP | H03-158817 A | 7/1991 |
| JP | 2009-150970 A | 7/2009 |
| JP | 2011-180218 A | 9/2011 |
| JP | 2016-155745 A | 9/2016 |
| JP | 2016-194609 A | 11/2016 |
| JP | 2019-113576 A | 7/2019 |
| JP | 2020-012911 A | 1/2020 |
| WO | 2019/116564 A1 | 6/2019 |

OTHER PUBLICATIONS

International Search Report from International Patent Application No. PCT/JP2020/032105, Nov. 24, 2020.
International Preliminary Report on Patentability from International Patent Application No. PCT/JP2020/032105, Mar. 10, 2022.
Office Action issued Apr. 24, 2023, in Chinese Patent Application No. 202080059140.X.
Office Action issued Nov. 25, 2023, in Chinese Patent Application No. 202080059140.X.
Office Action issued Apr. 2, 2024, in Japanese Patent Application No. 2023-005529.
Office Action issued Sep. 3, 2024, in Japanese Patent Application No. 2023-005529.
Schott, "Technical Information", Advanced Optics, TIE-29: Refractive Index and Dispersion, Feb. 2016.
Schott, Datasheet, N-LAK 12, Jul. 13, 2016.
Sumita Optical Glass, Inc., Datasheet, K-SK18.
Decision of Dismissal of Amendment issued Mar. 25, 2025, in Japanese Patent Application No. 2023-005529.
Decision of Refusal issued Mar. 25, 2025, in Japanese Patent Application No. 2023-005529.

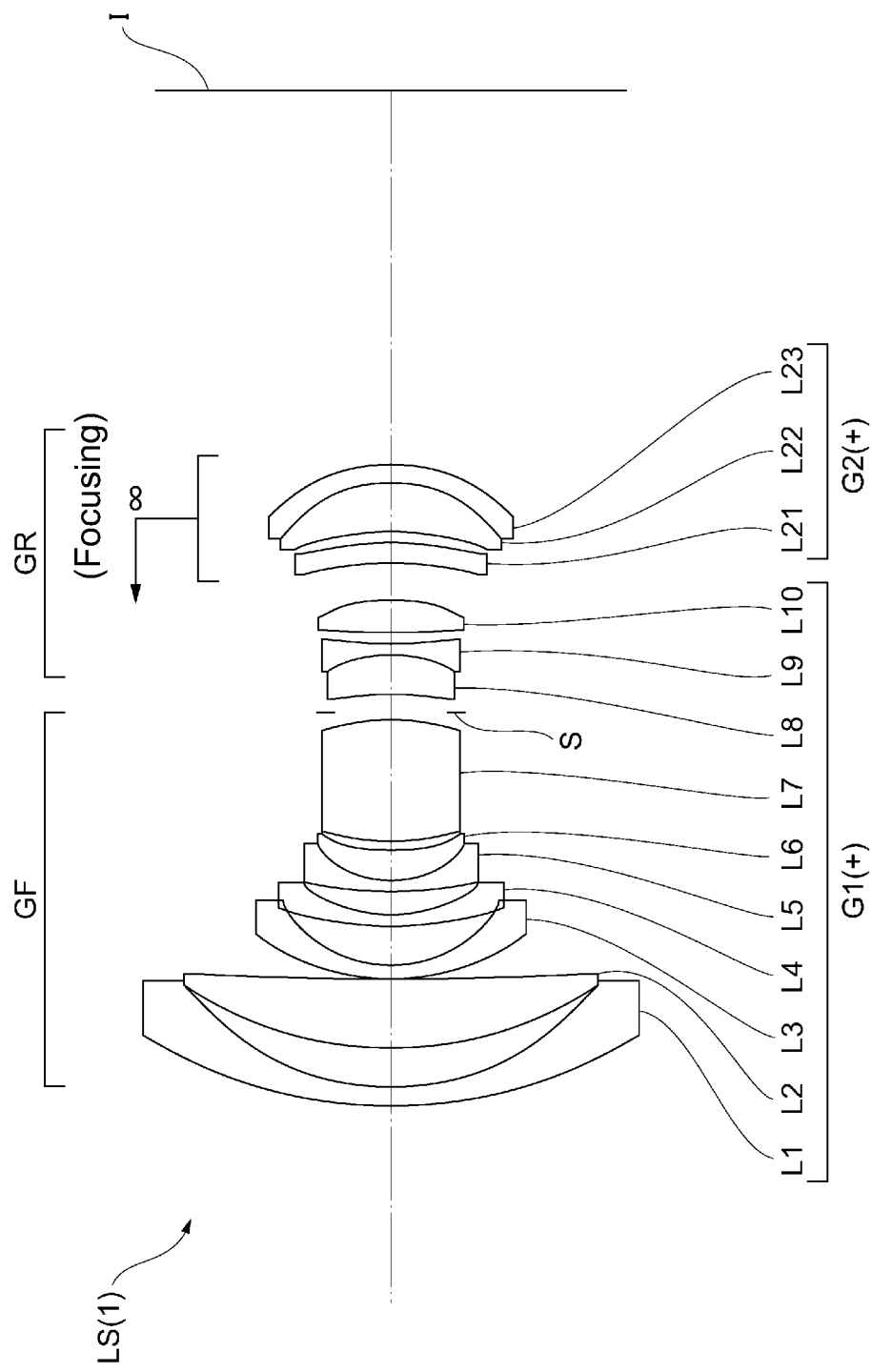

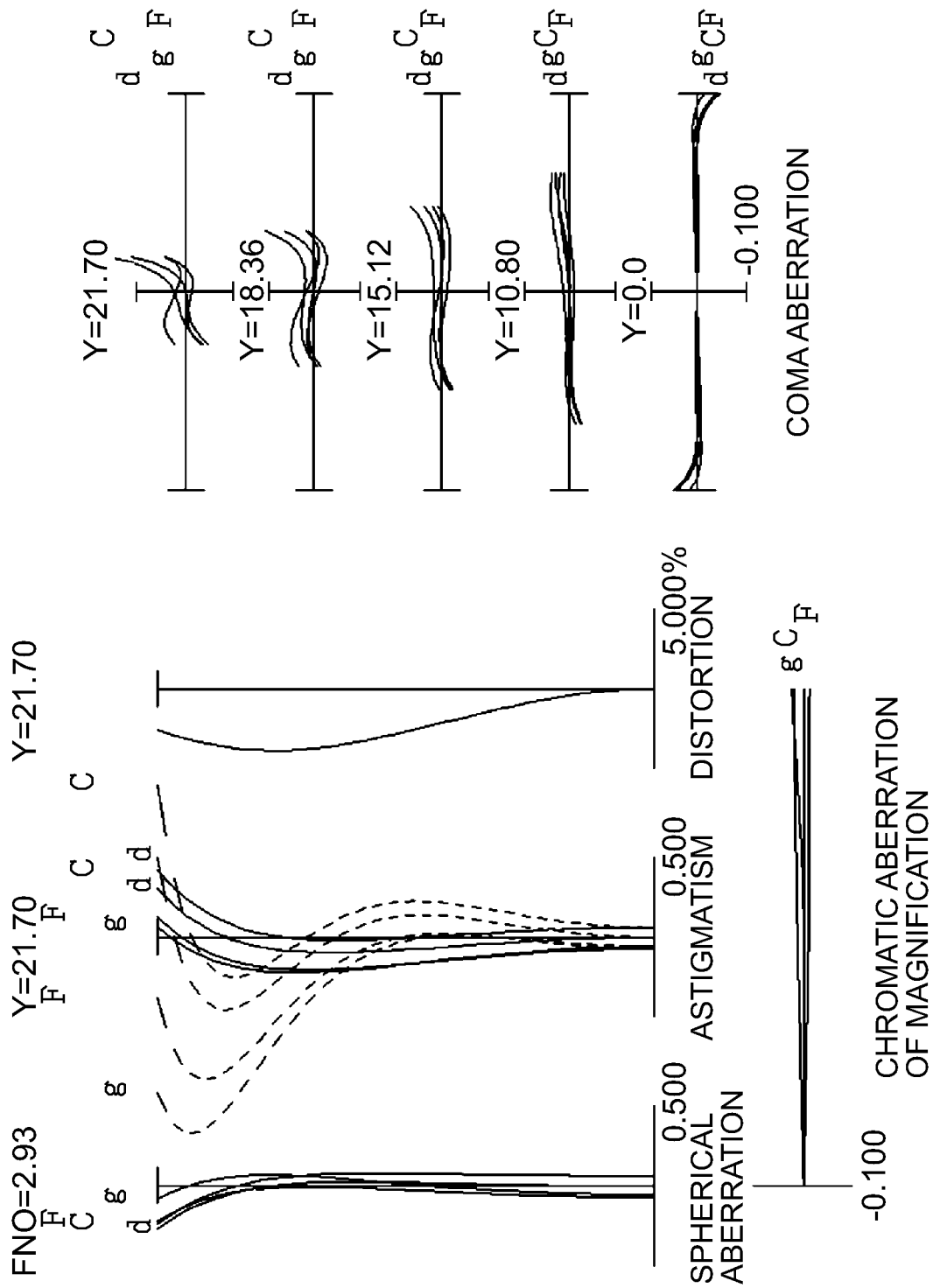

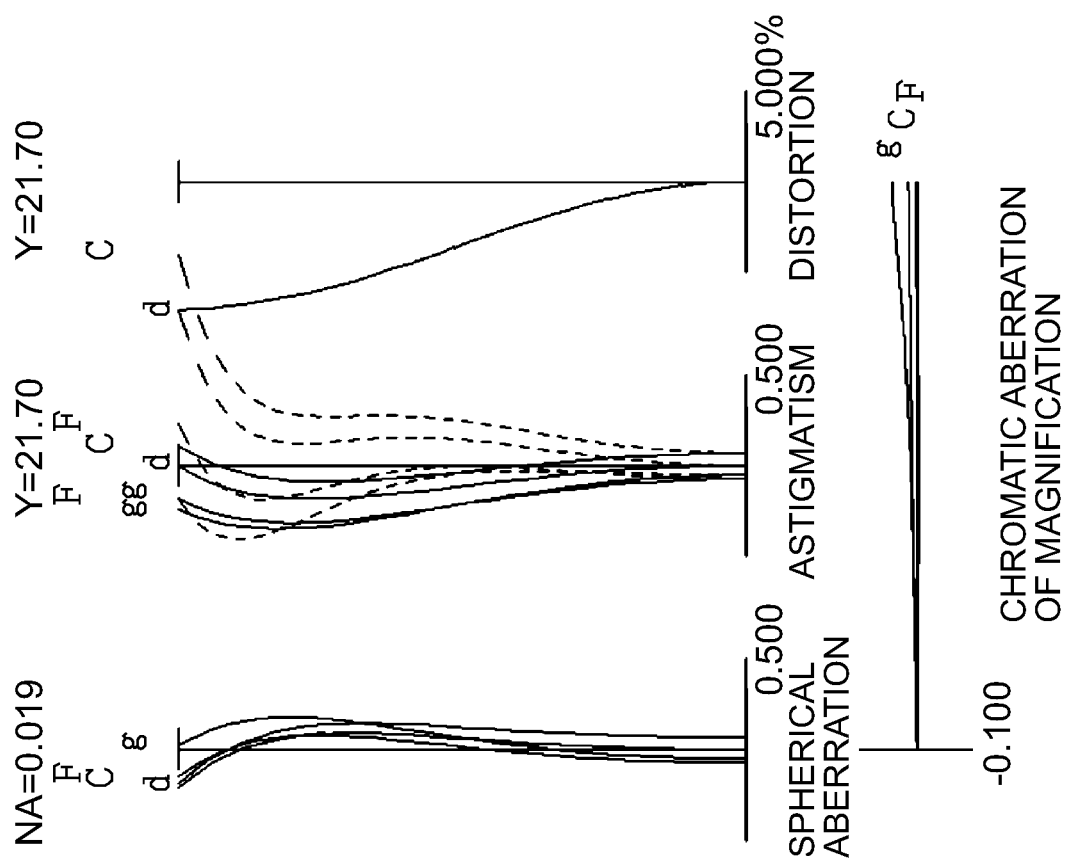

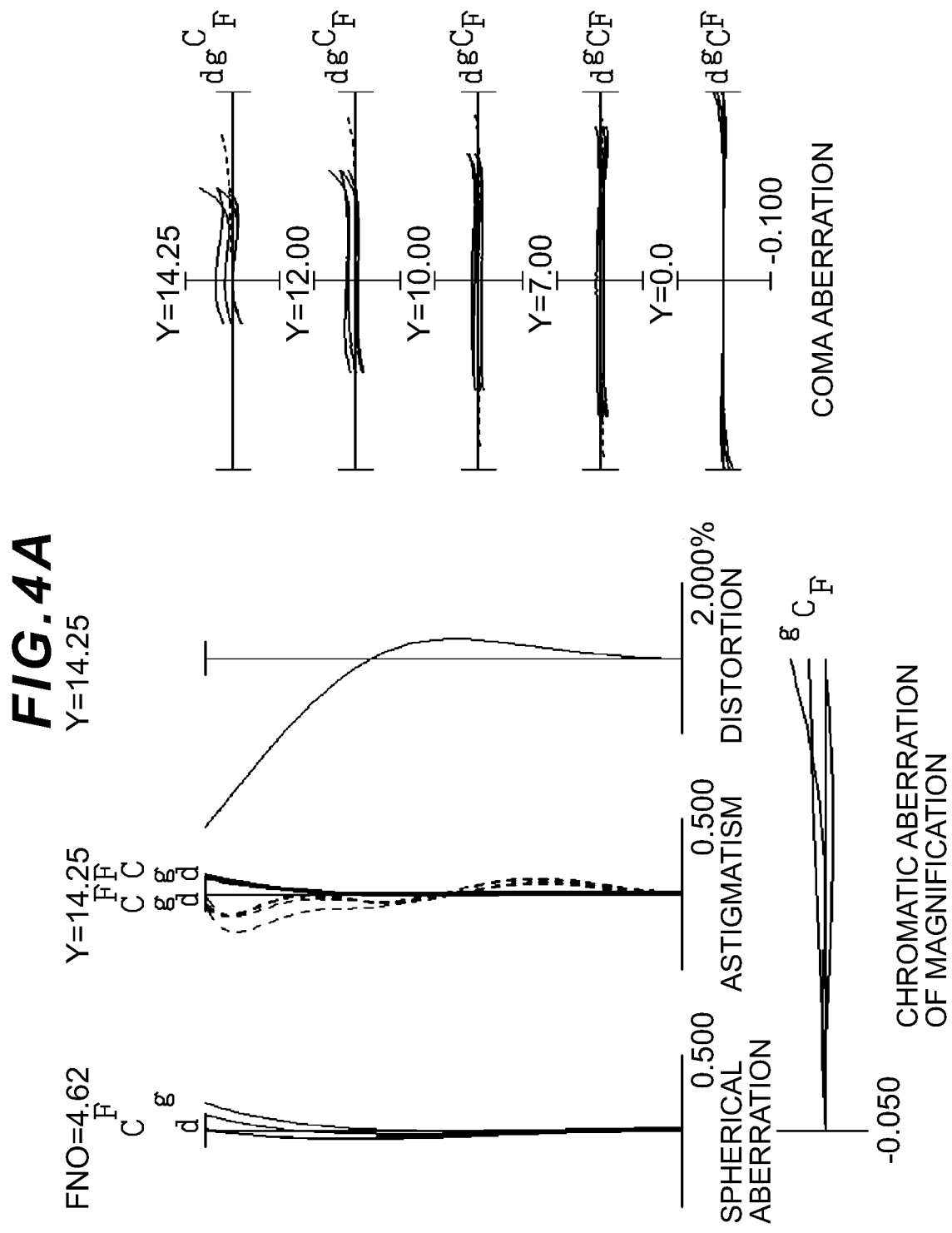

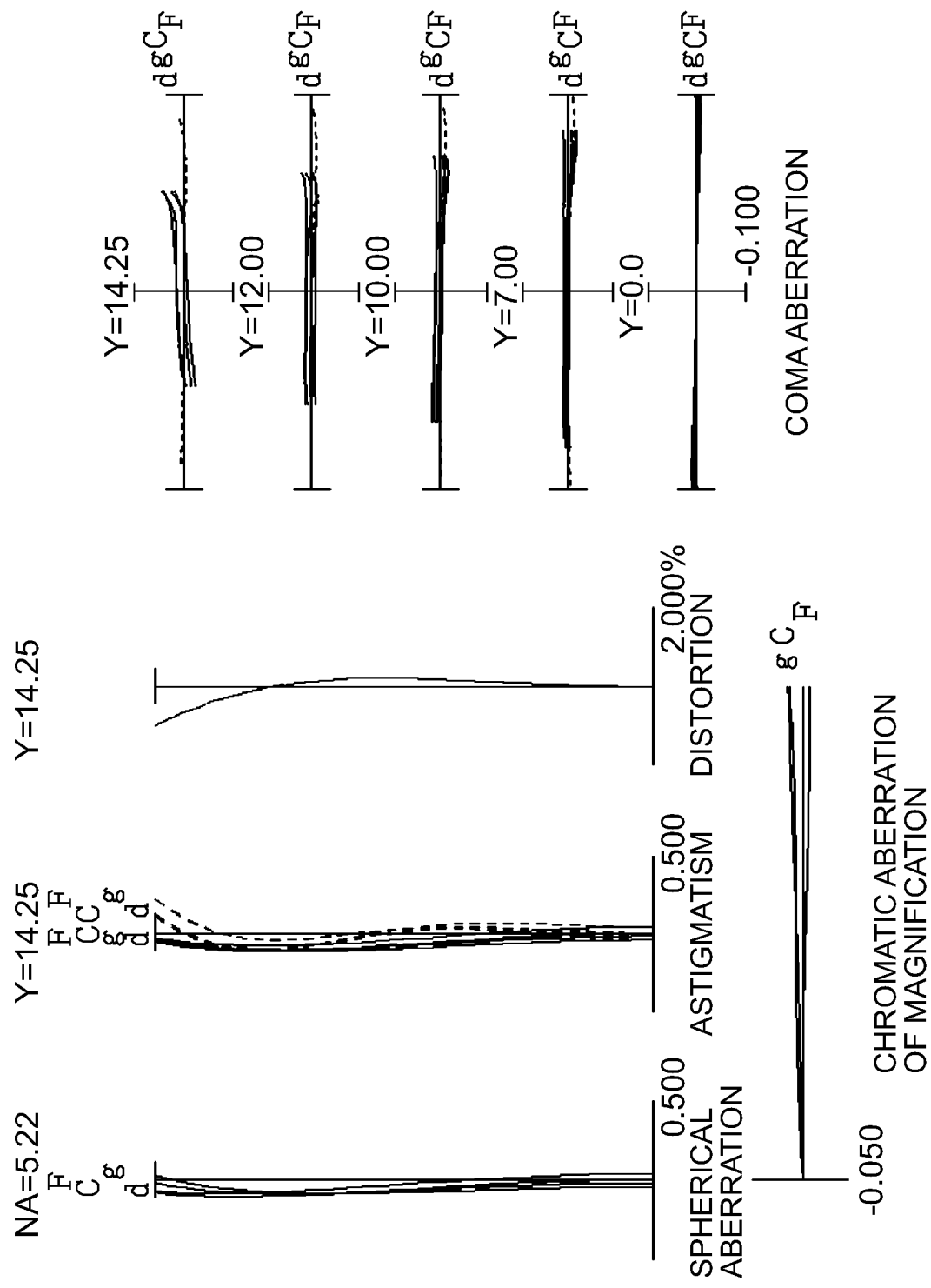

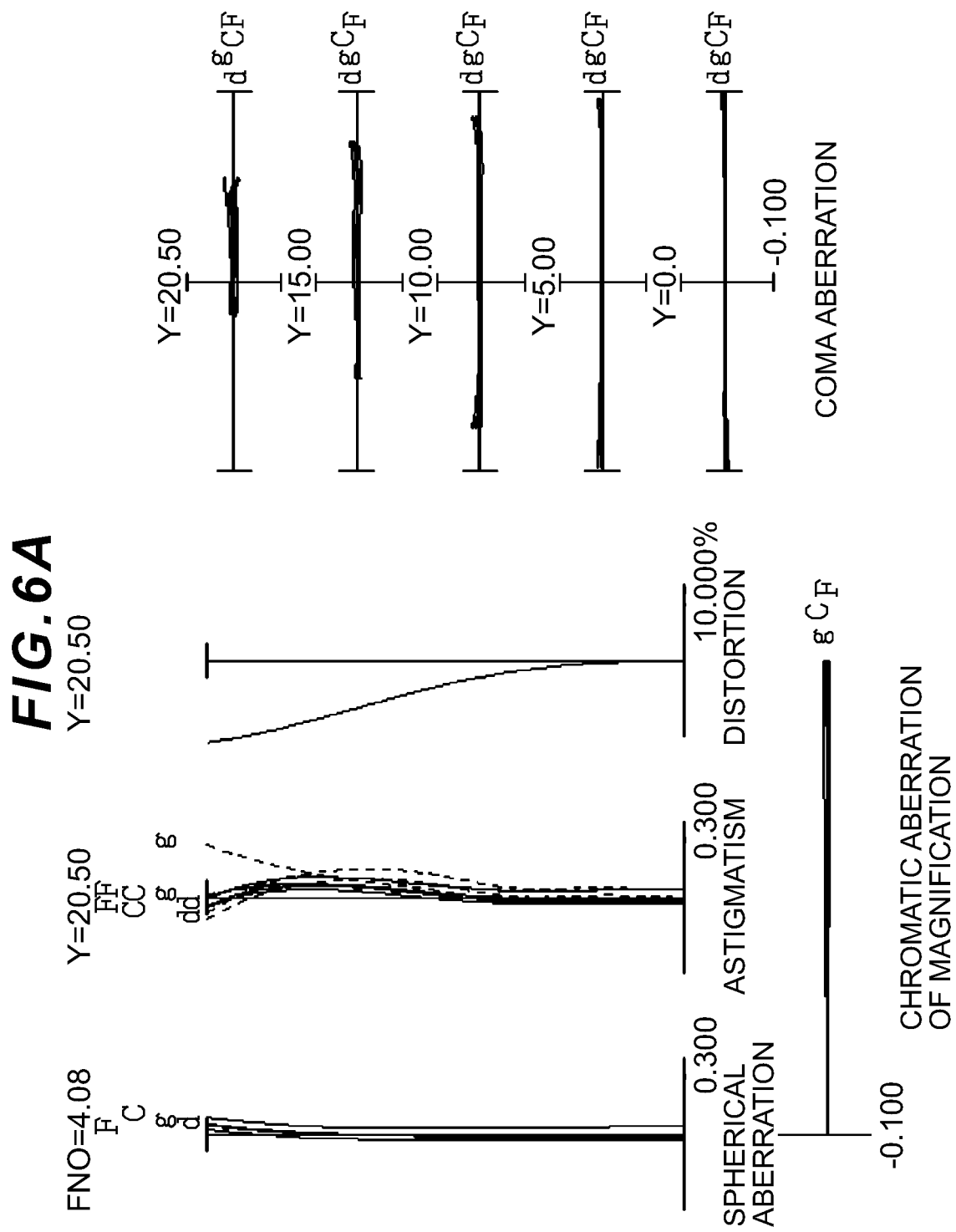

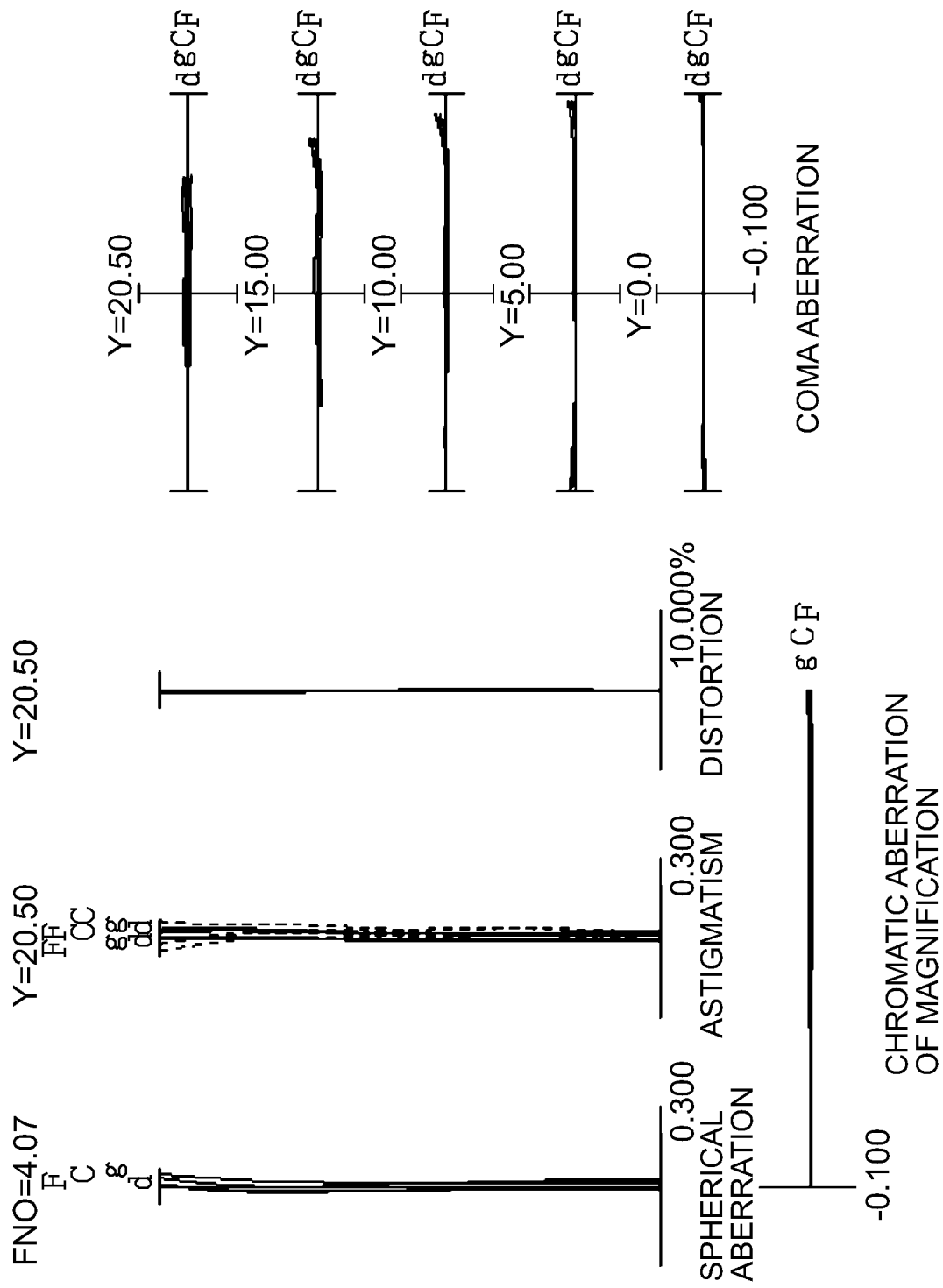

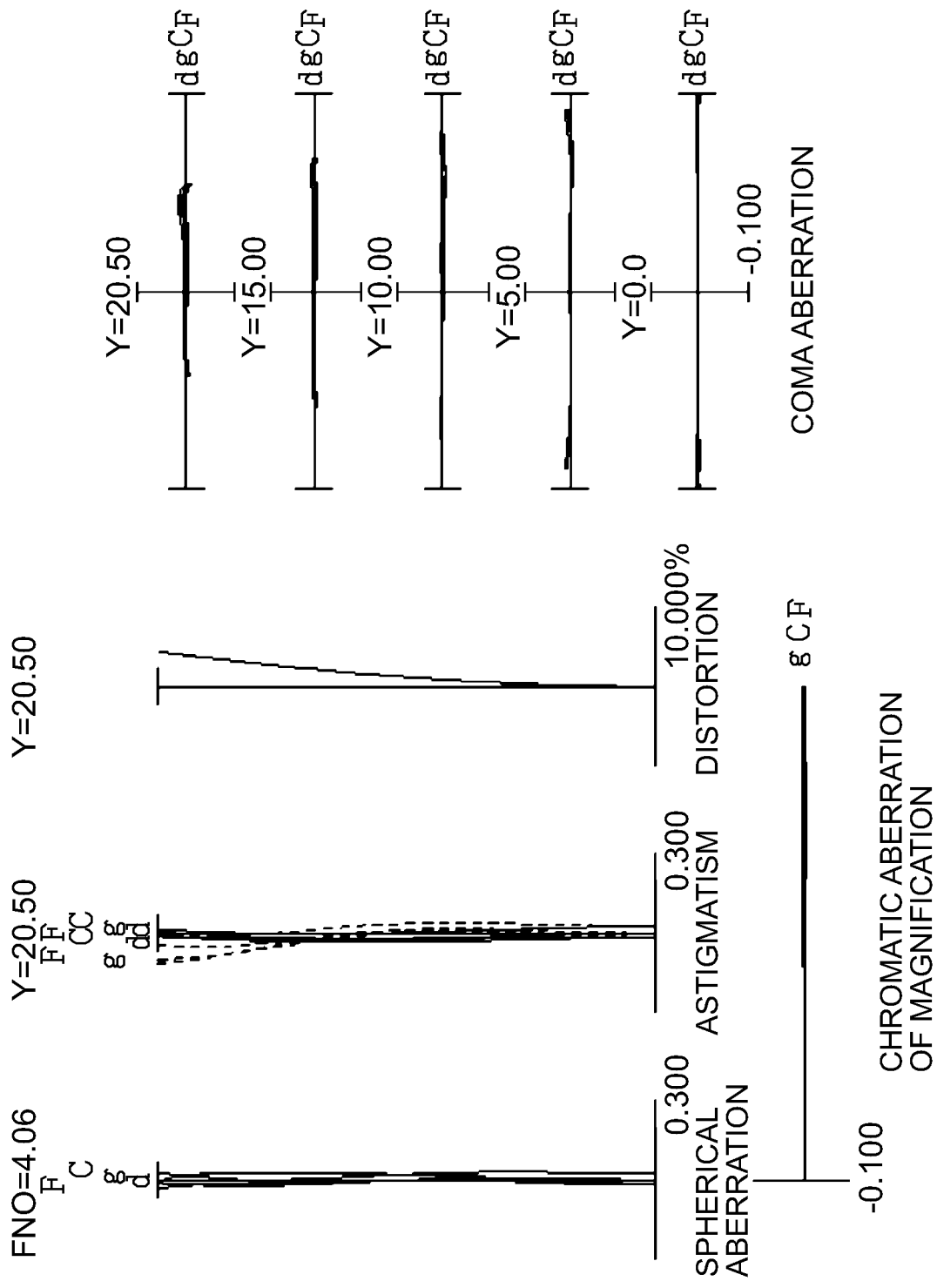

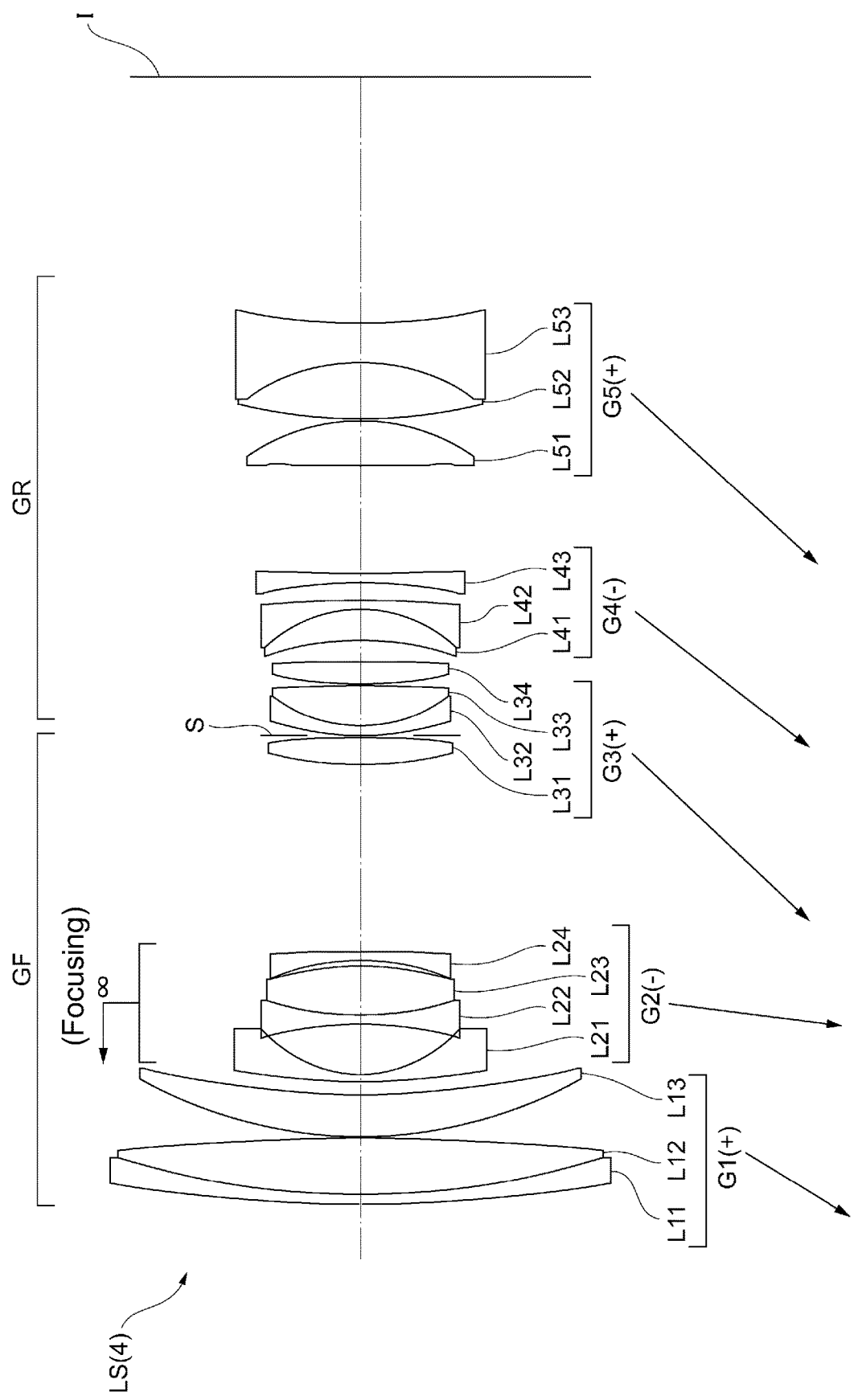

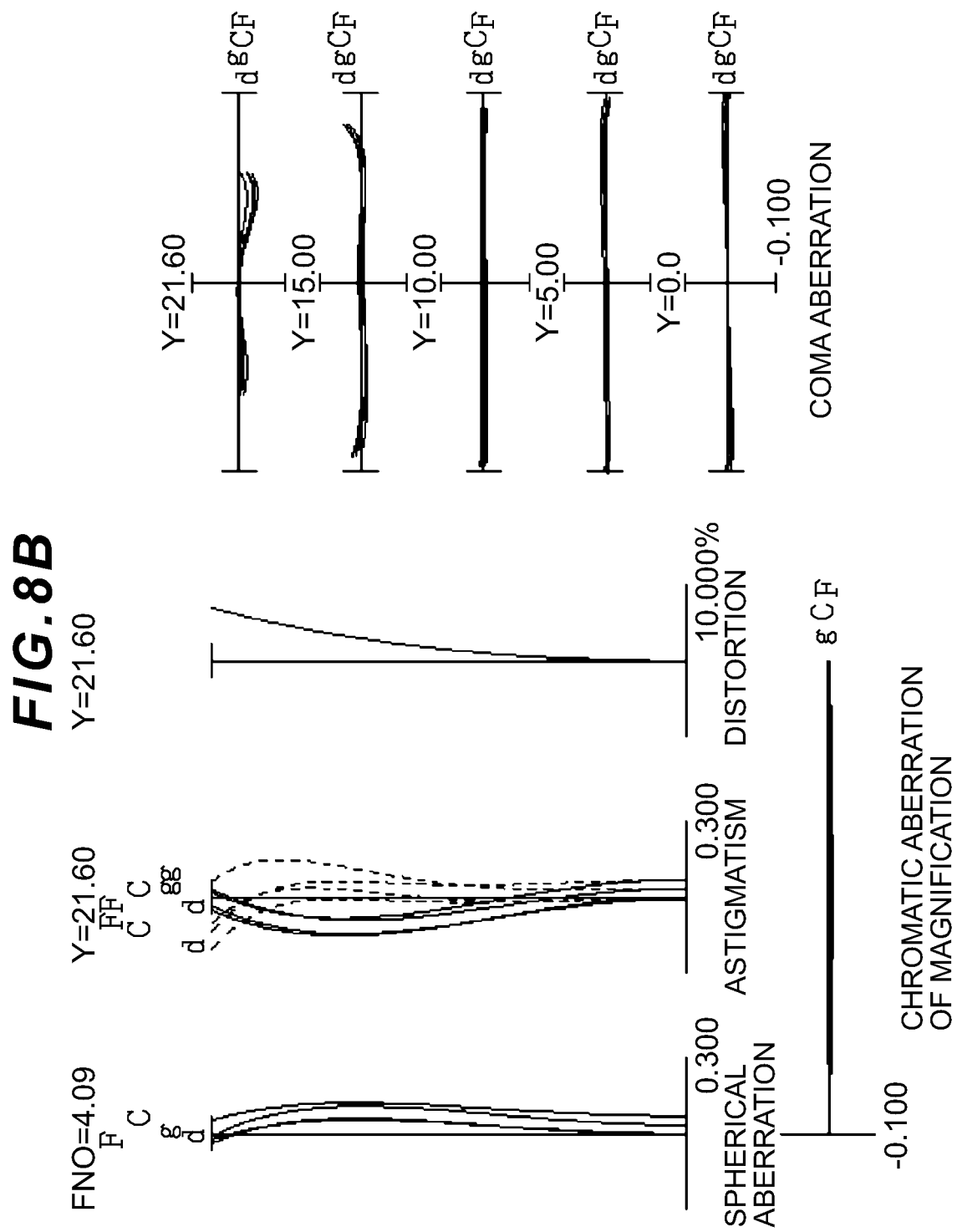

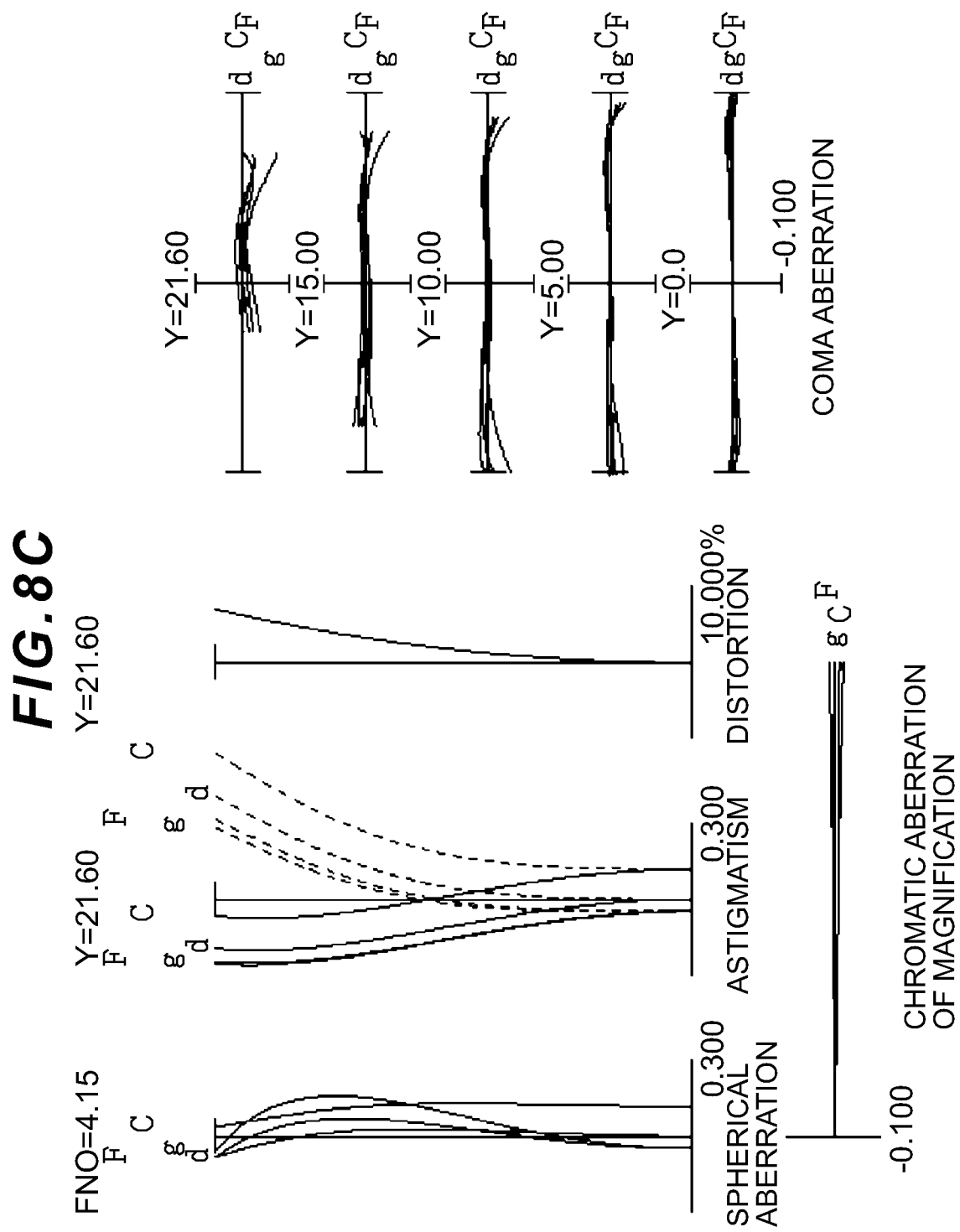

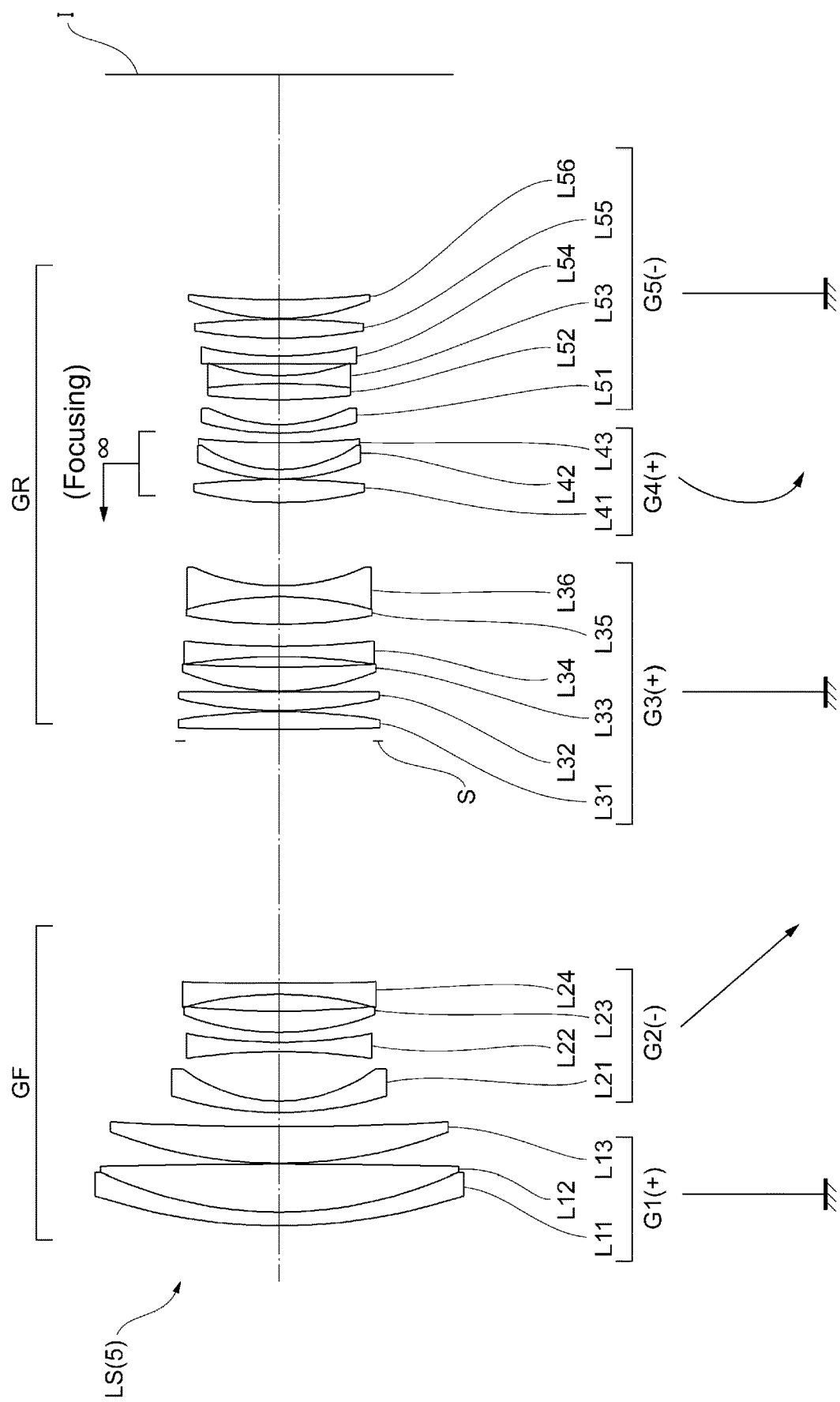

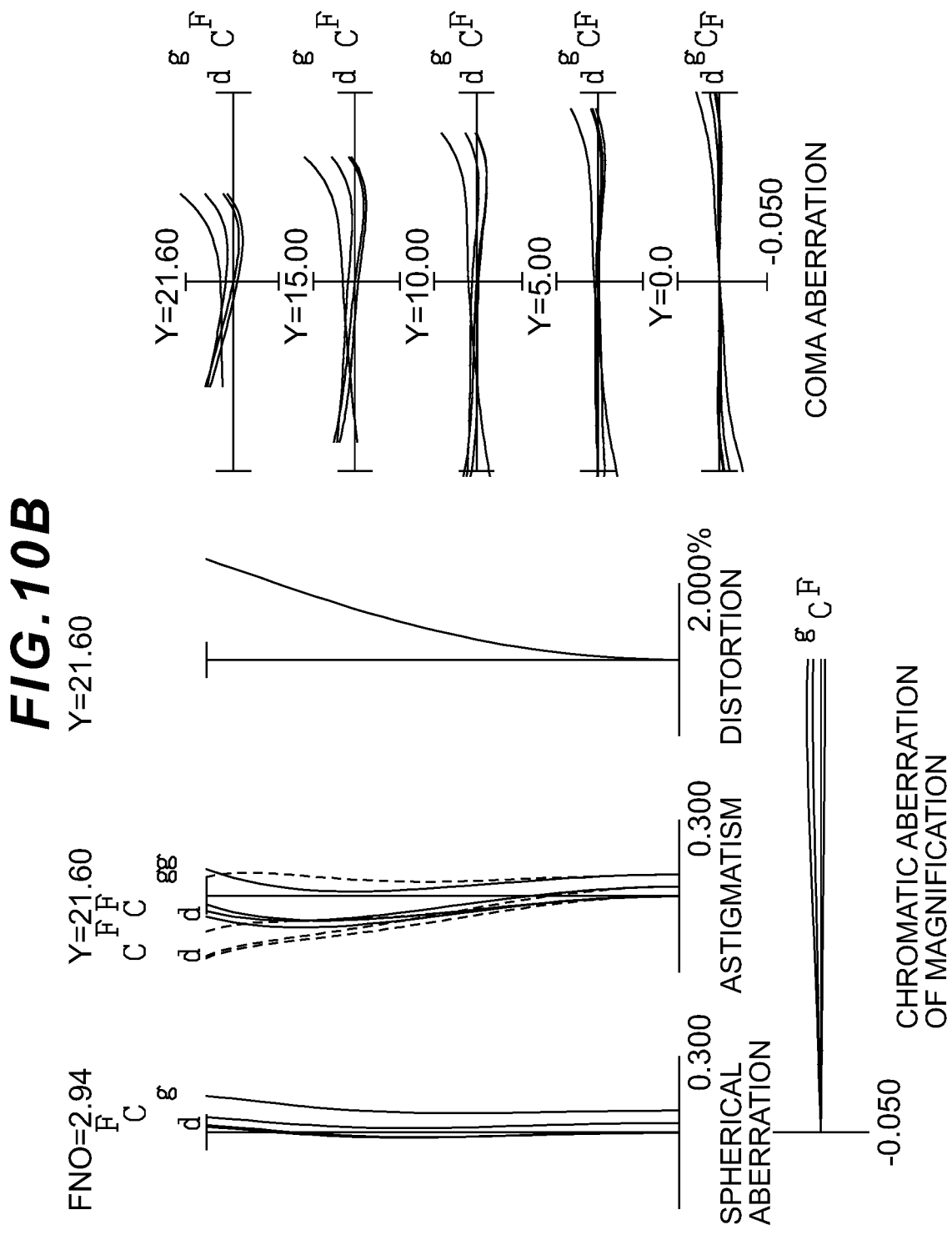

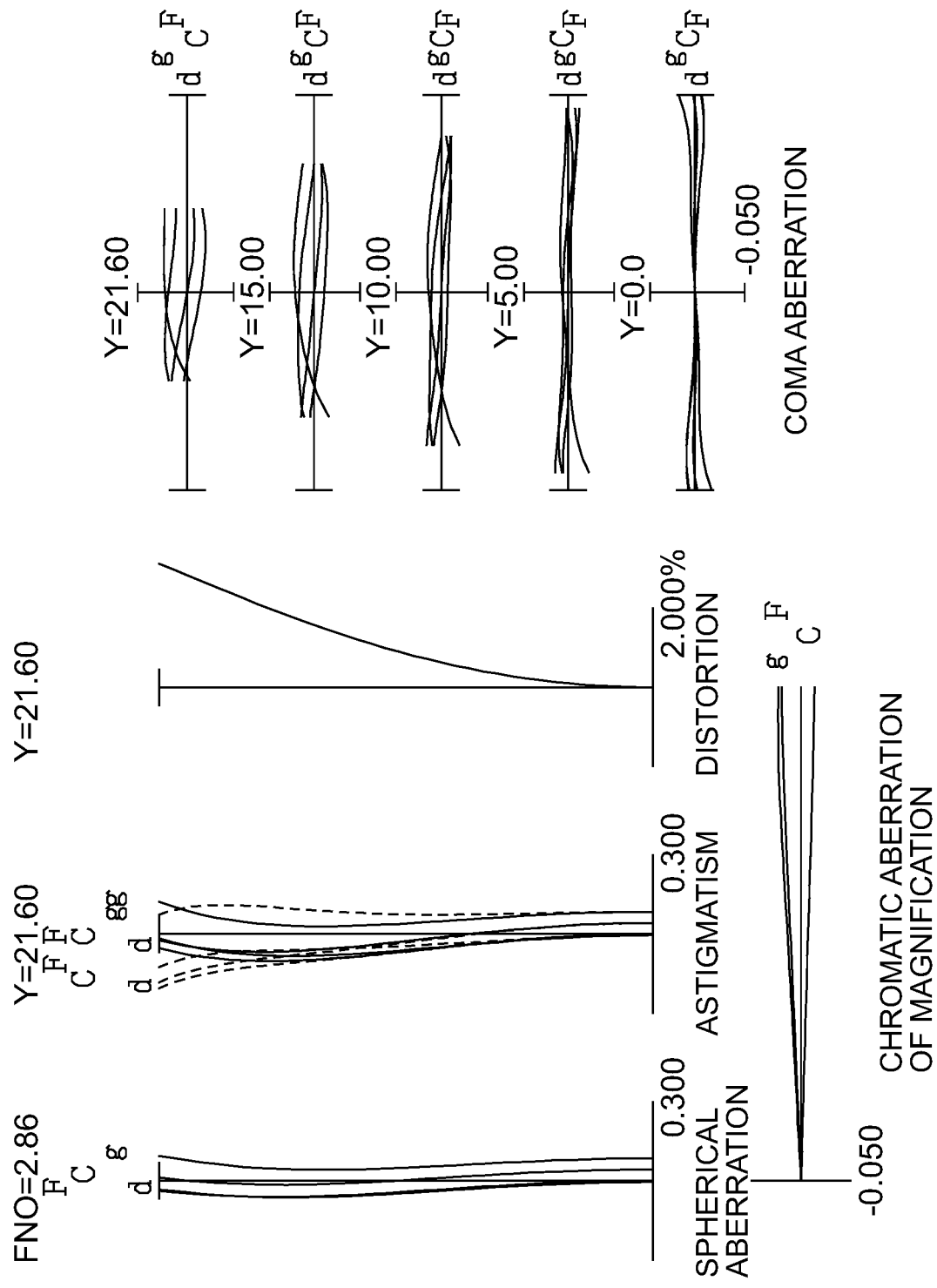

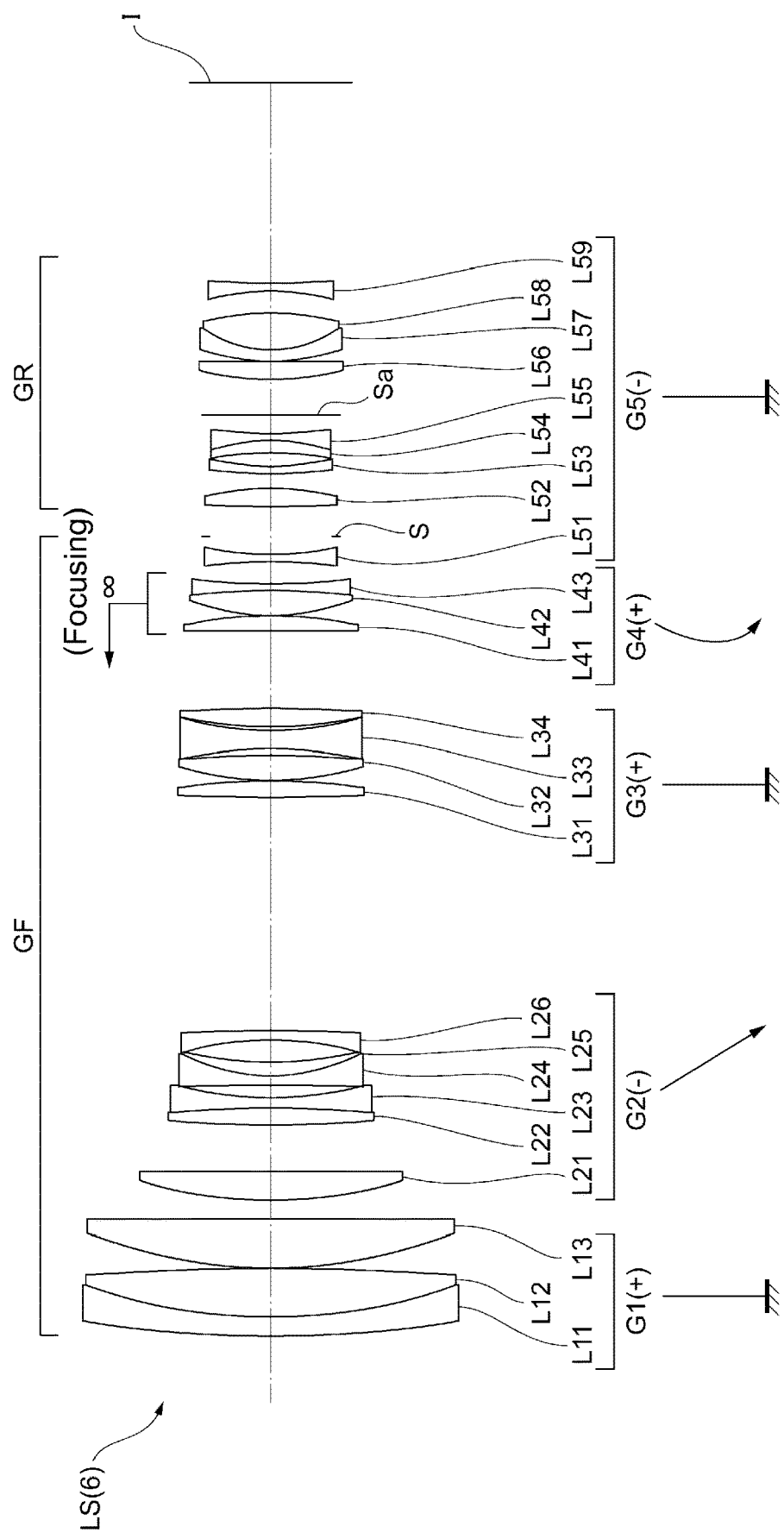

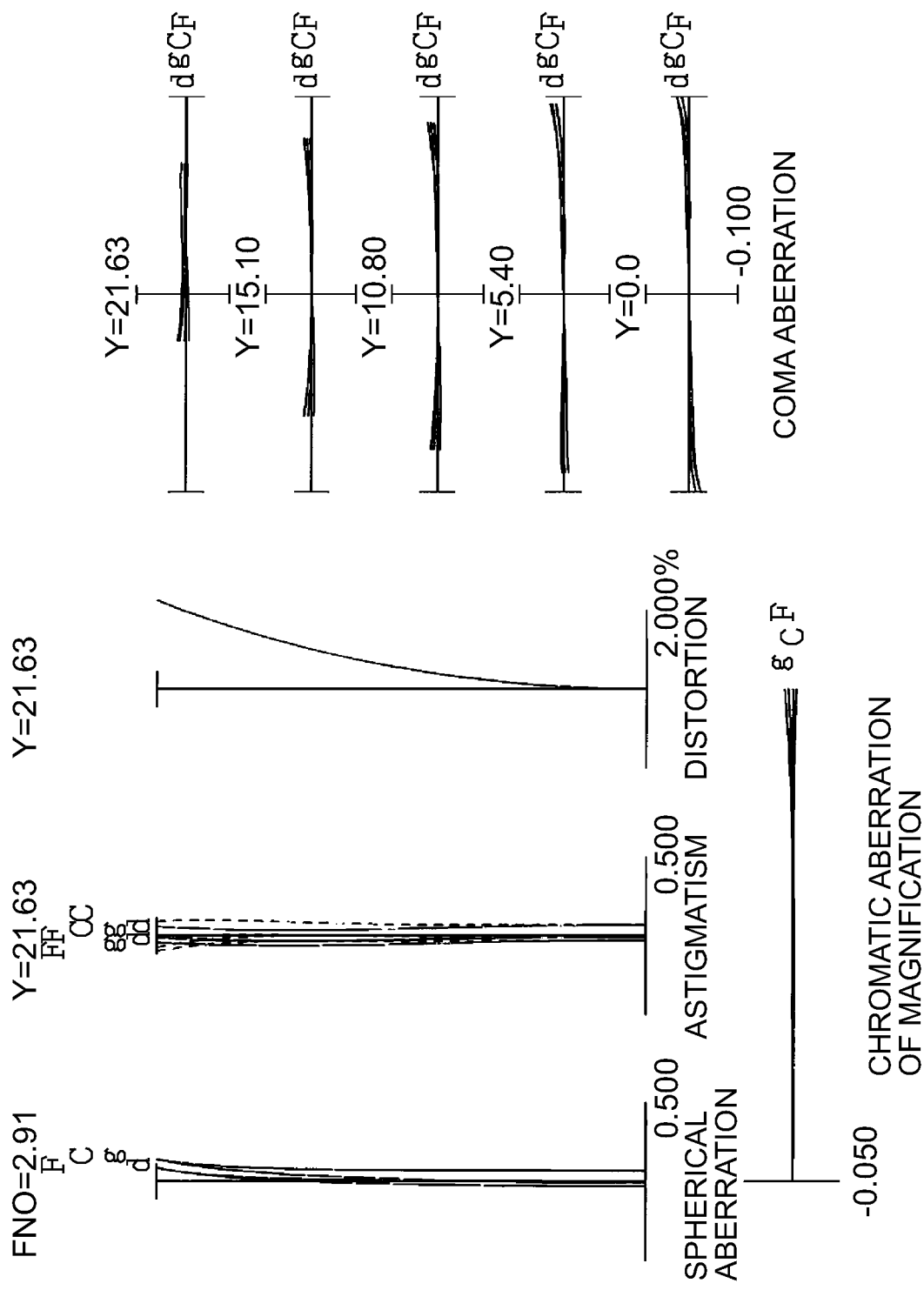

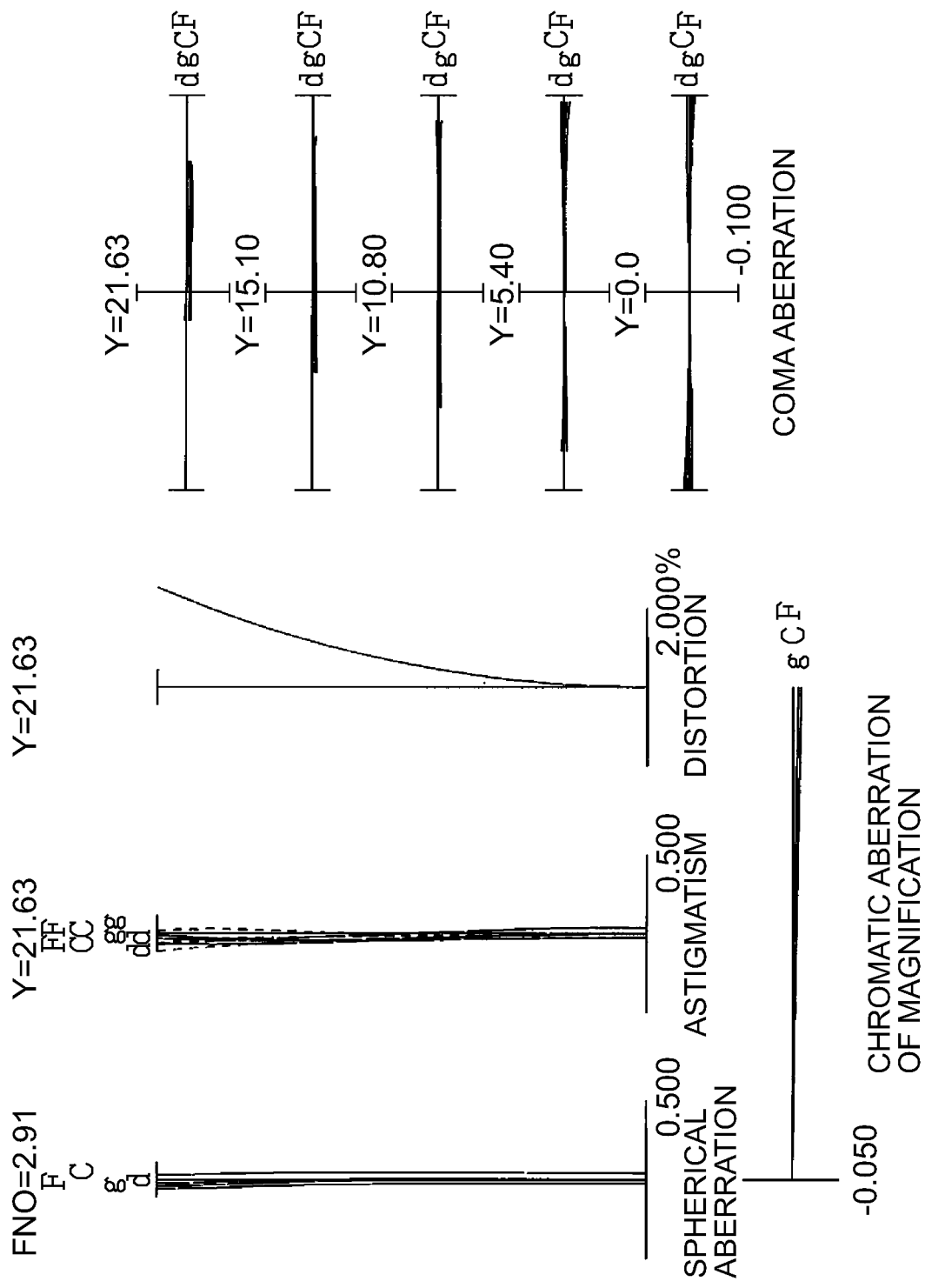

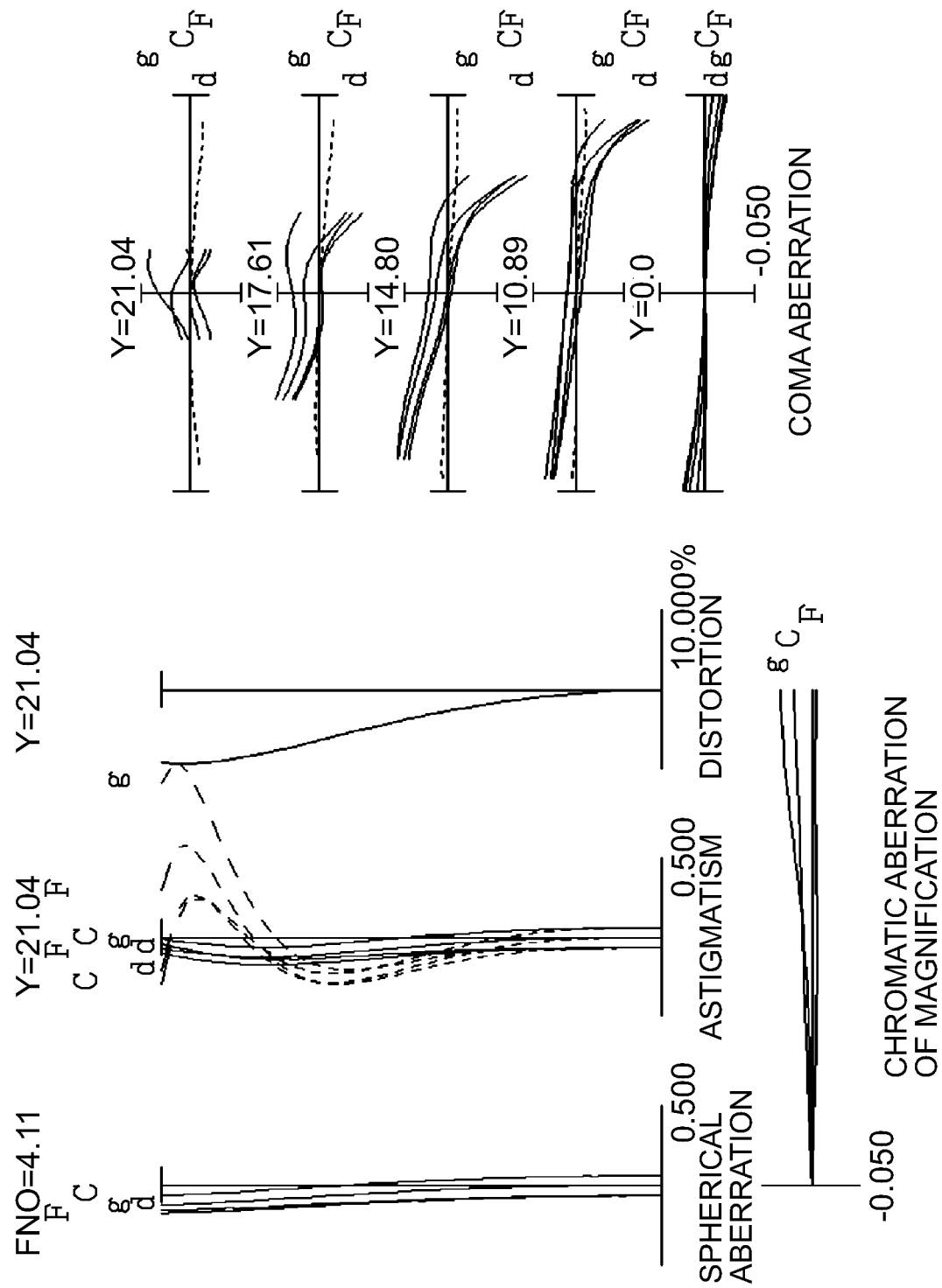

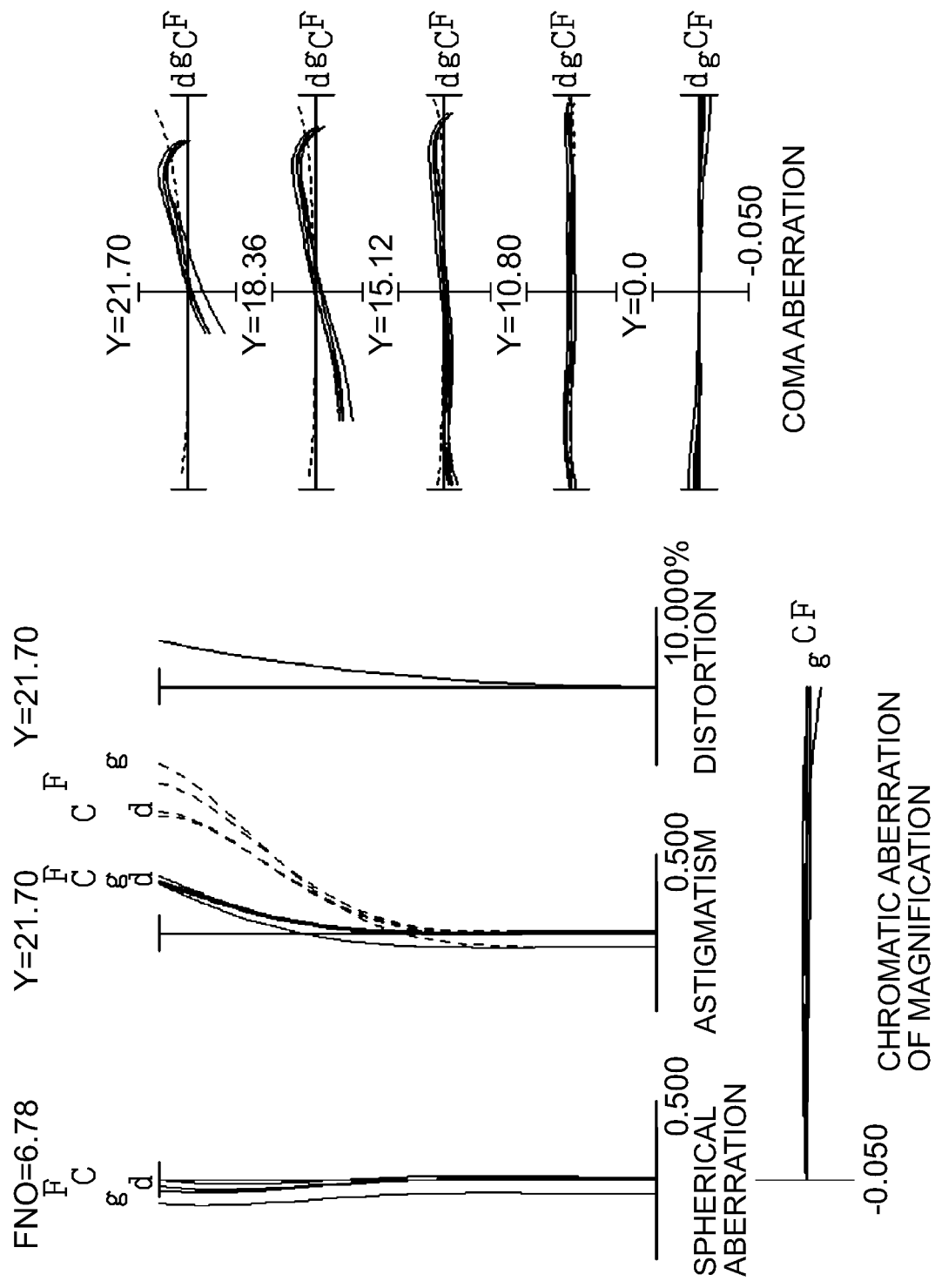

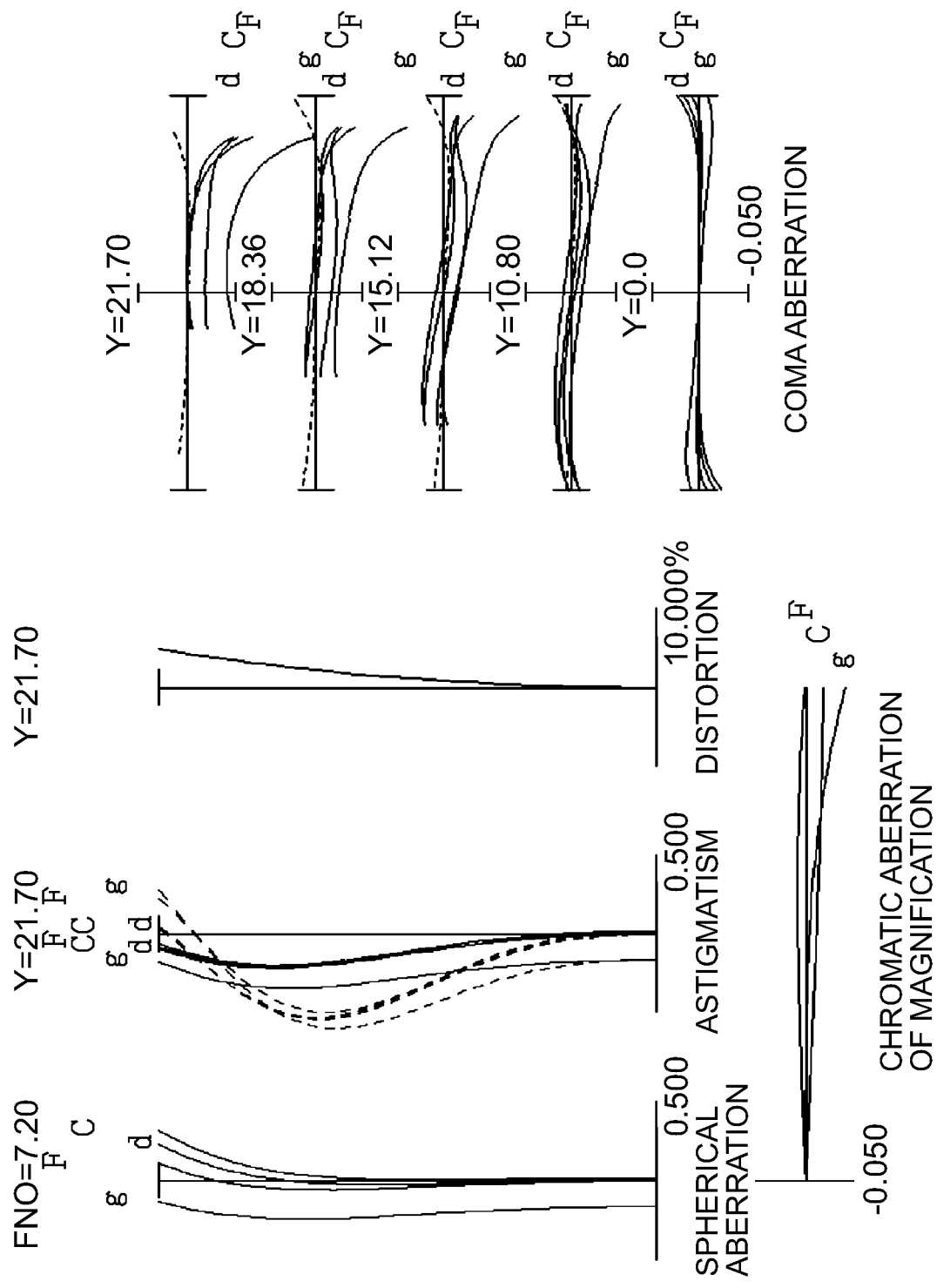

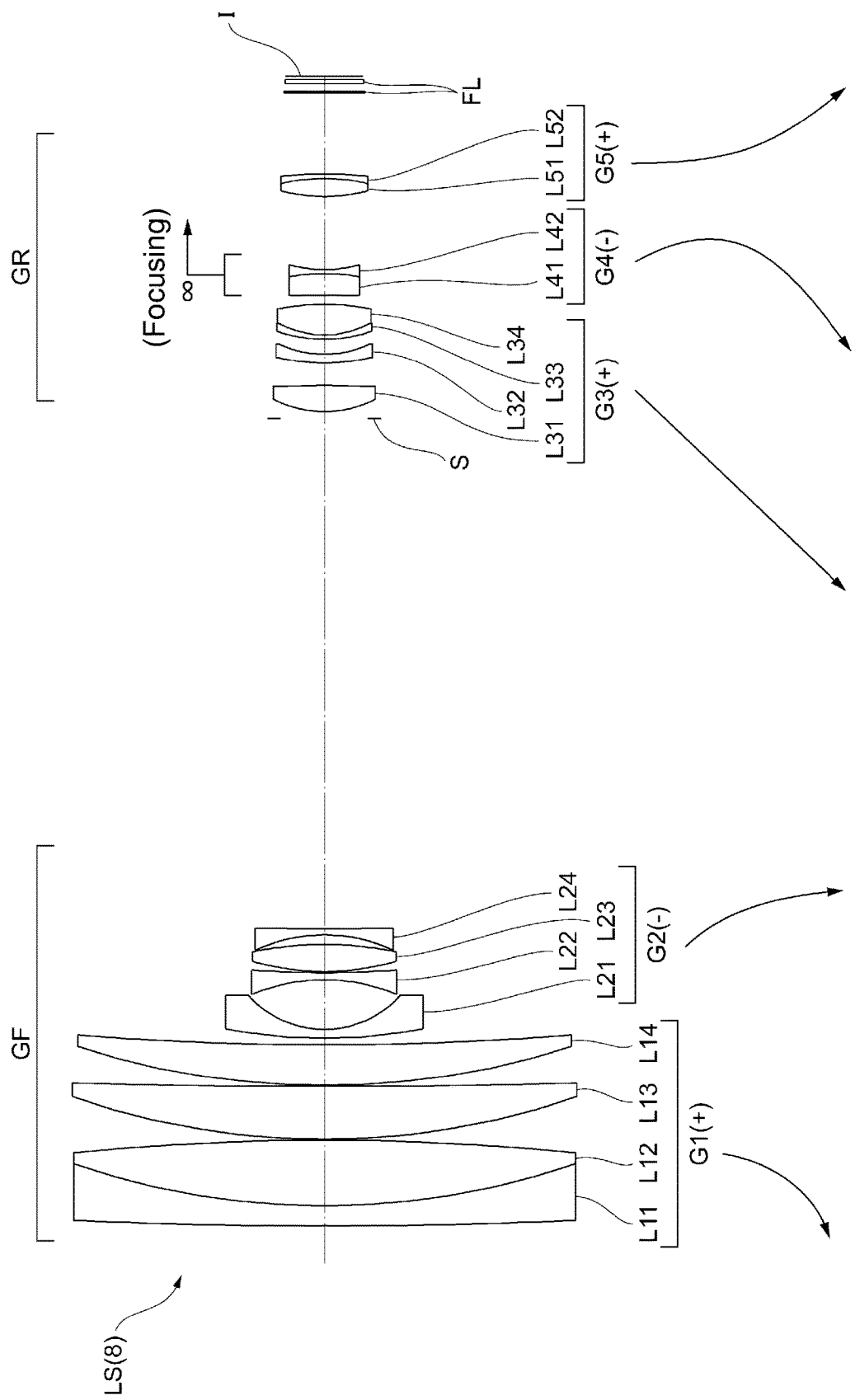

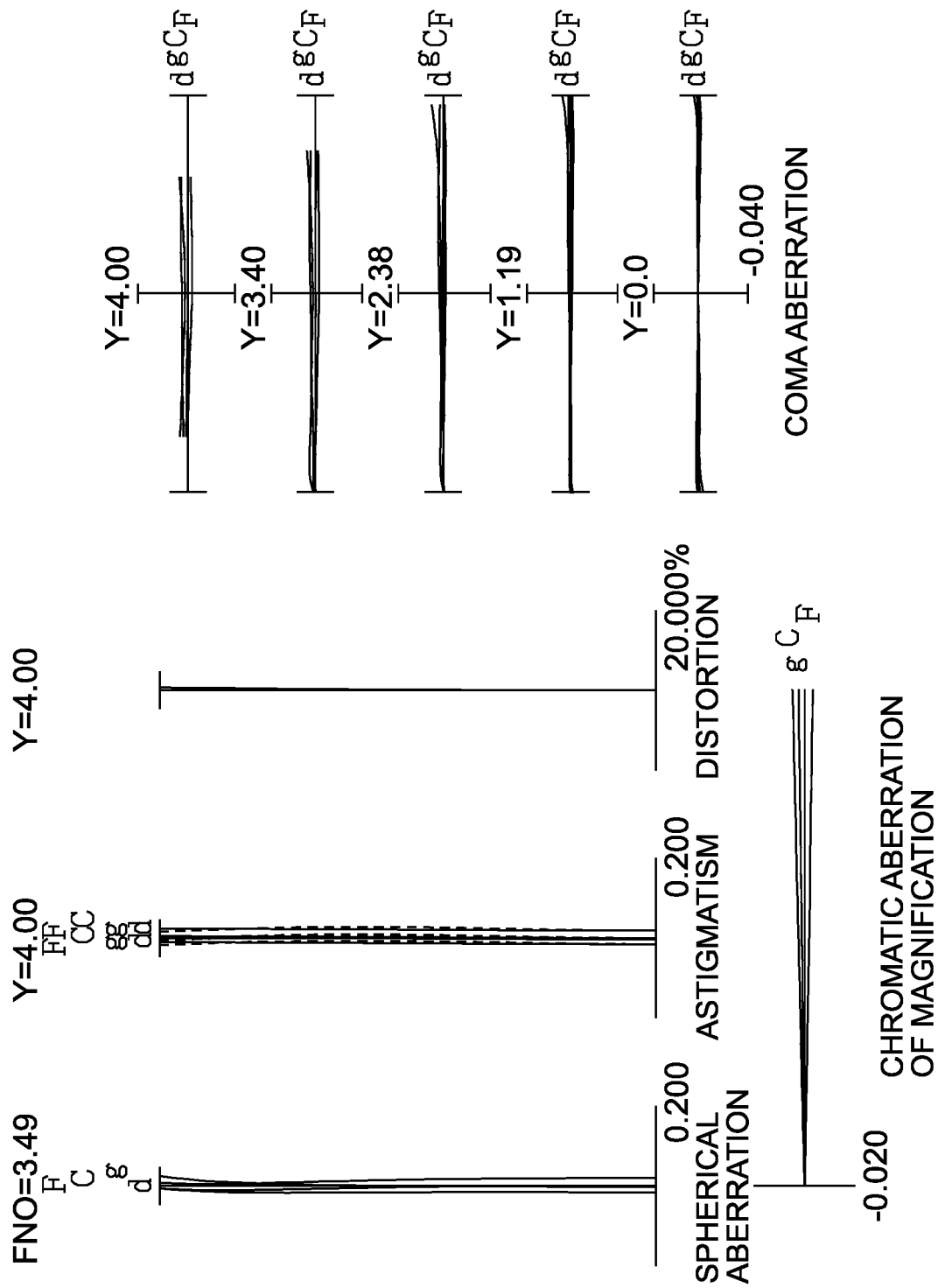

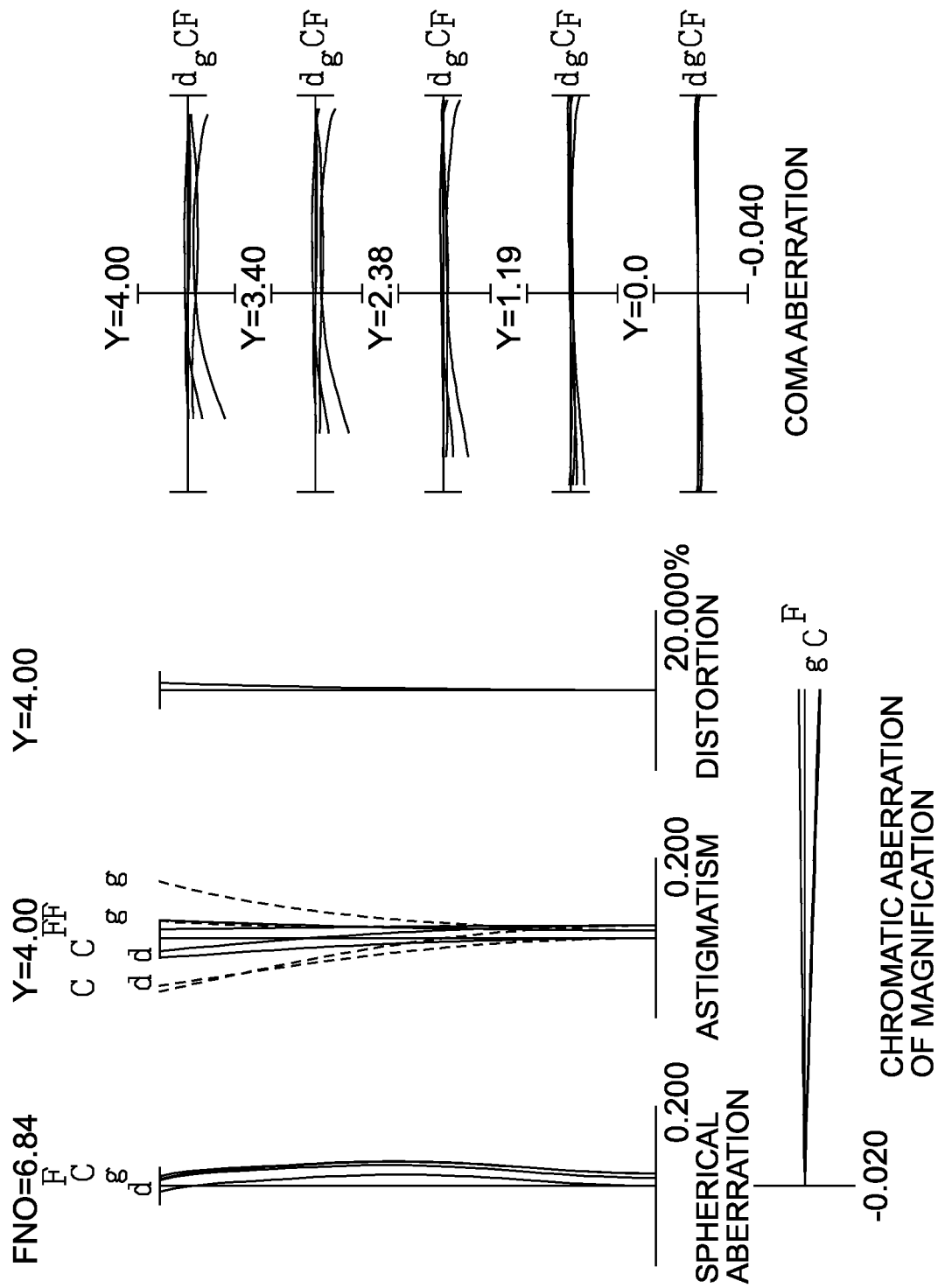

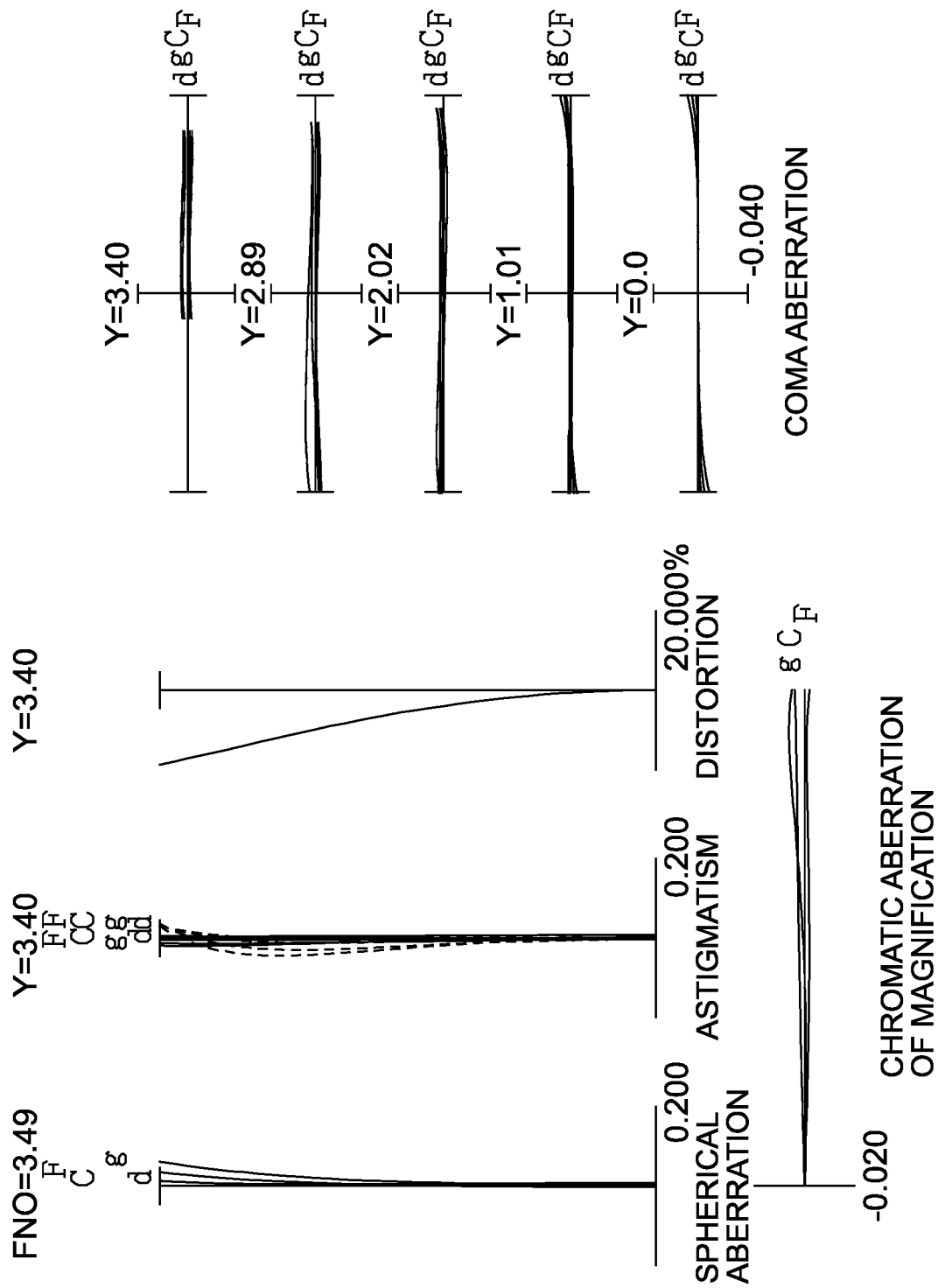

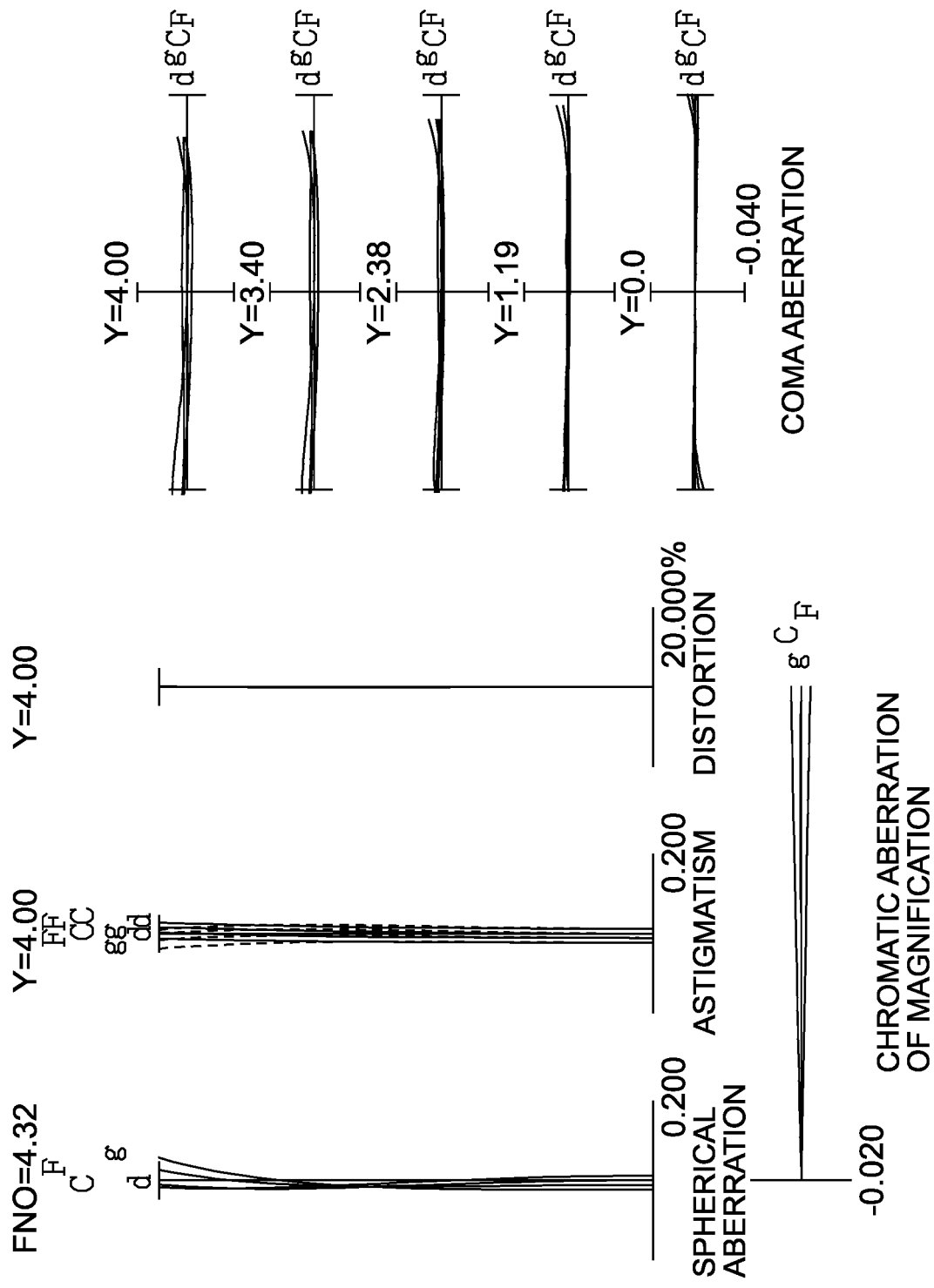

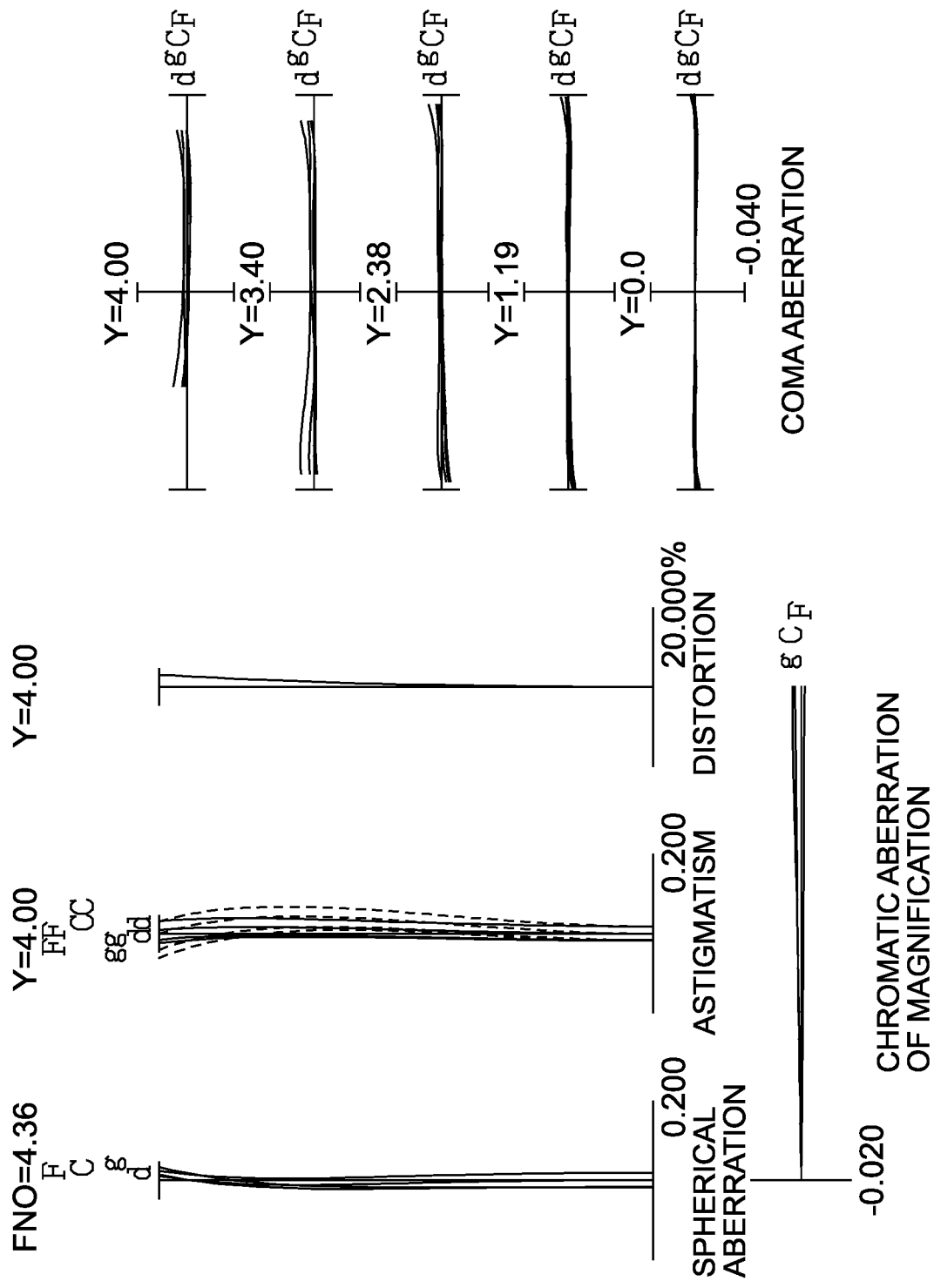

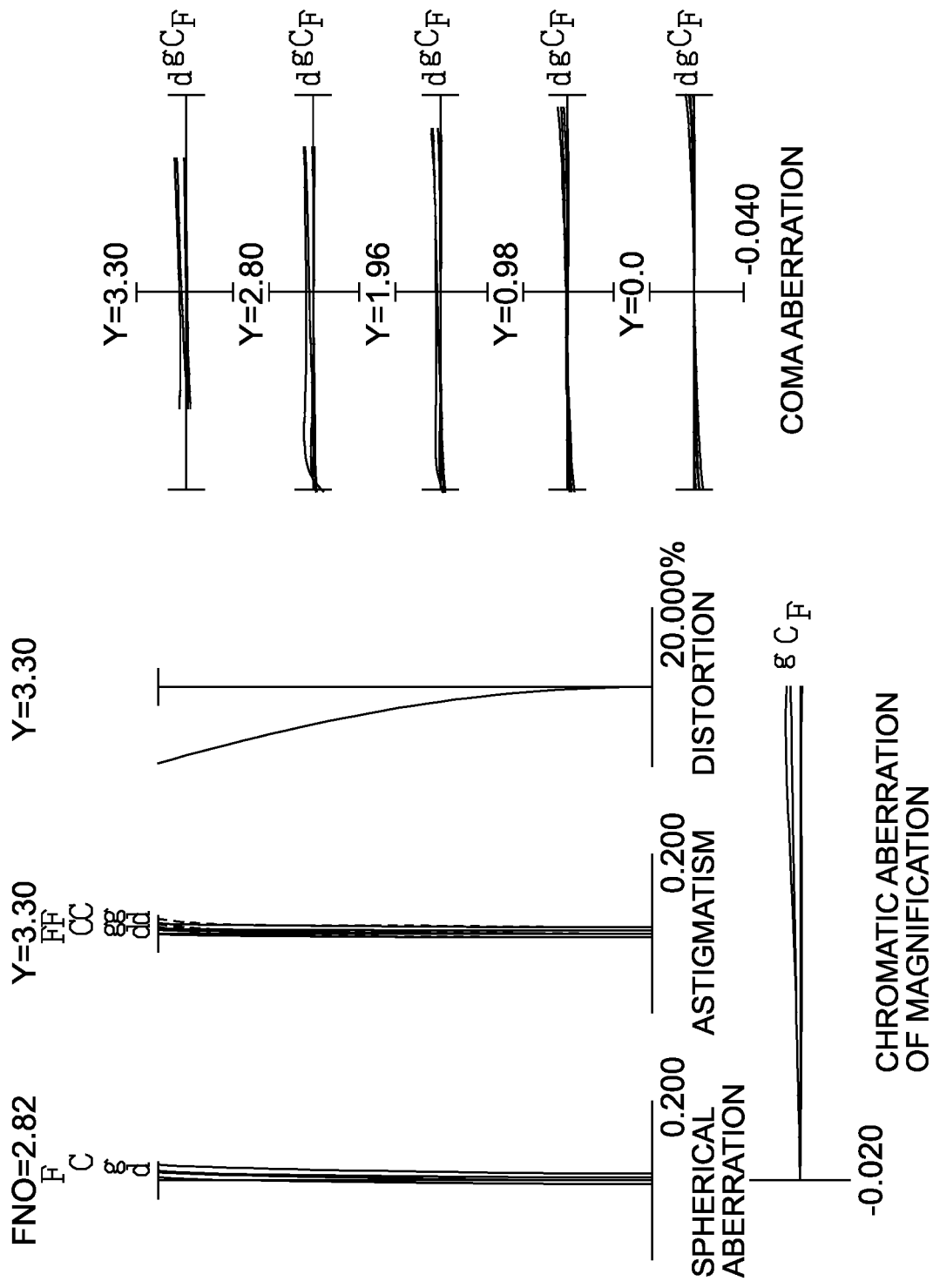

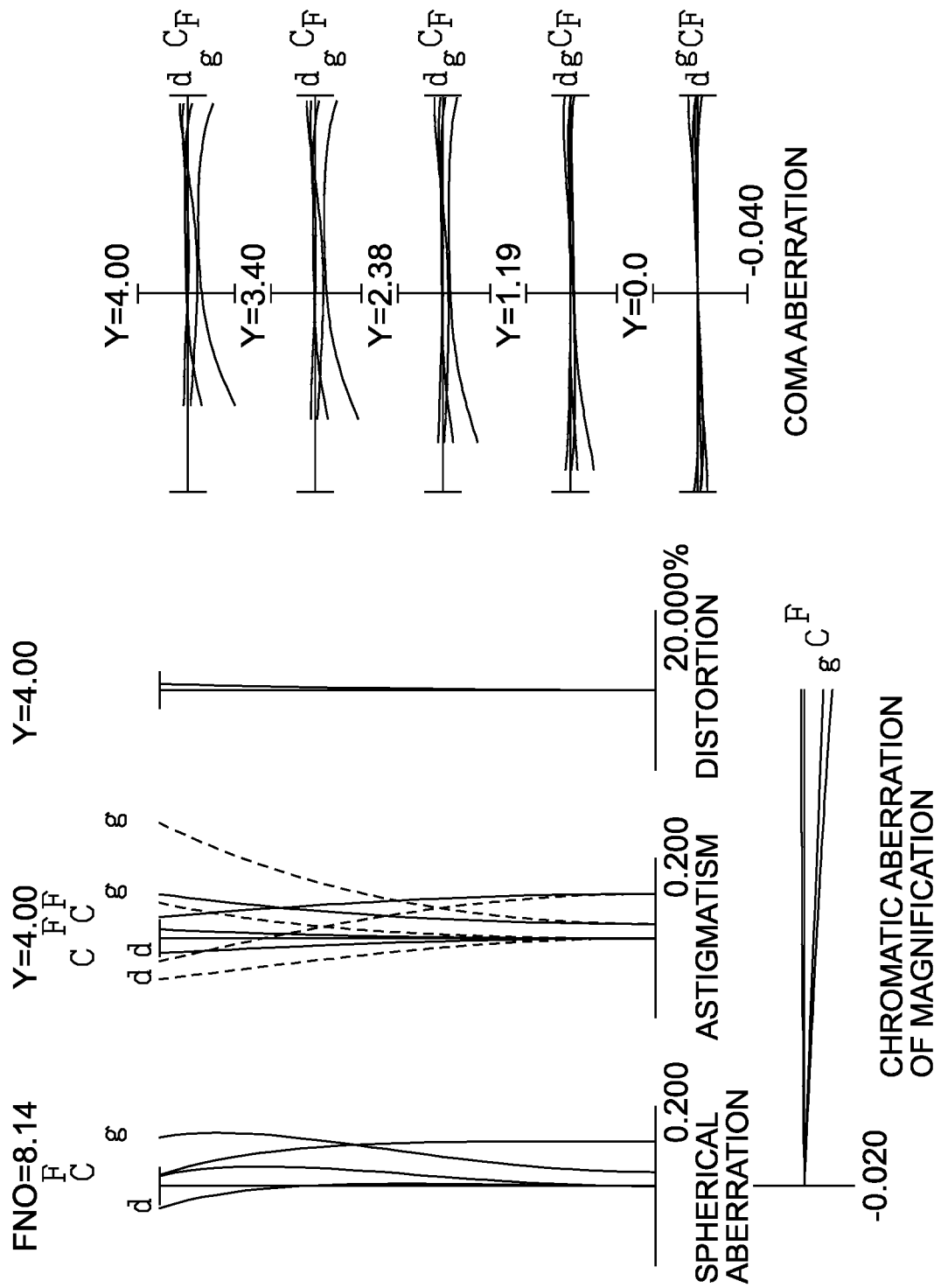

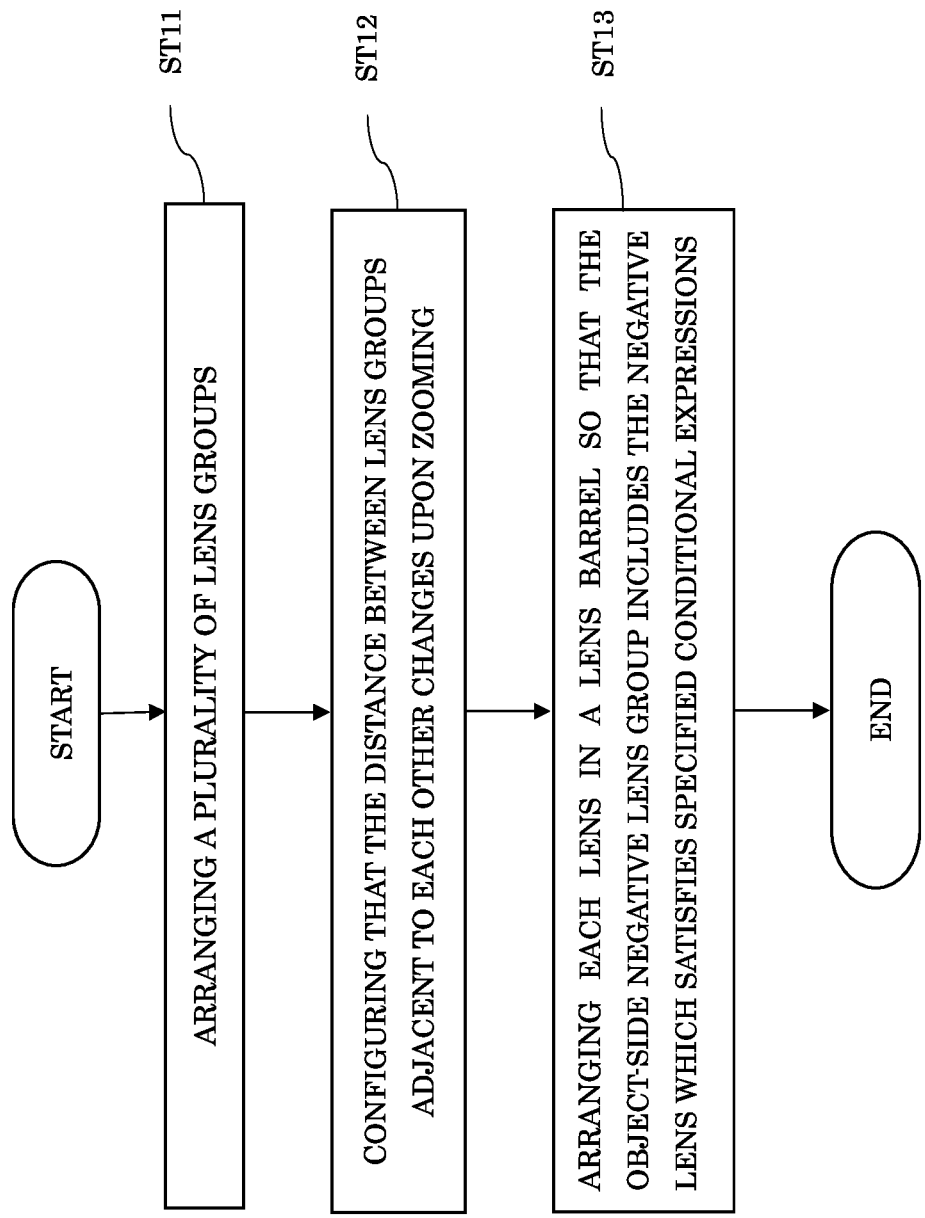

OPTICAL SYSTEM, OPTICAL APPARATUS AND METHOD FOR MANUFACTURING THE OPTICAL SYSTEM, AND ZOOM OPTICAL SYSTEM, OPTICAL APPARATUS AND METHOD FOR MANUFACTURING THE ZOOM OPTICAL SYSTEM

TECHNICAL FIELD

The present invention relates to an optical system, an optical apparatus and a method for manufacturing the optical system, and a zoom optical system, an optical apparatus, and a method for manufacturing the zoom optical system.

TECHNICAL BACKGROUND

In recent years, the image resolutions of imaging elements included in imaging apparatuses, such as digital cameras and video cameras, have been improved. It is desired that a photographing lens provided in an imaging apparatus including such an imaging element be a lens of which not only the reference aberrations (aberrations for single-wavelength aberrations), such as the spherical aberration and the coma aberration, be favorably corrected, but also chromatic aberrations be favorably corrected so as not to cause color bleeding for a white light source, and which have a high resolution. In particular, for correction of the chromatic aberrations, it is desirable that not only primary achromatism be achieved but also secondary spectrum be favorably corrected. As means for correcting the chromatic aberrations, for example, a method of using a resin material having anomalous dispersion characteristics (for example, see Patent literature 1) has been known. As described above, accompanied by the recent improvement in imaging element resolution, a photographing lens with various aberrations being favorably corrected has been desired.

PRIOR ARTS LIST

Patent Document

Patent literature 1: Japanese Laid-Open Patent Publication No. 2016-194609(A)

SUMMARY OF THE INVENTION

The optical system according to the present invention comprises: an aperture stop; and a negative lens that is disposed closer to an object than the aperture stop. The negative lens satisfies the following conditional expressions, $-0.010 < ndN1 - (2.015 - 0.0068 \times vdN1)$, $50.00 < vdN1 < 65.00$, $0.545 < \theta gFN1$, $-0.010 < \theta gFN1 - (0.6418 - 0.00168 \times vdN1)$, where ndN1: a refractive index of the negative lens for d-line,
vdN1: an Abbe number of the negative lens with reference to d-line, and
θgFN1: a partial dispersion ratio of the negative lens, defined by a following expression when a refractive index of the negative lens for g-line is ngN1, a refractive index of the negative lens for F-line is nFN1, and a refractive index of the negative lens for C-line is nCN1:

$\theta gFN1 = (ngN1 - nFN1)/(nFN1 - nCN1)$.

The optical apparatus according to the present invention comprises the optical system described above.

A method for manufacturing an optical system according to the present invention comprises a step of arranging each lens in a lens barrel so that the optical system comprises: an aperture stop; and a negative lens that is disposed closer to an object than the aperture stop, the negative lens satisfying the following conditional expressions, $-0.010 < ndN1 - (2.015 - 0.0068 \times vdN1)$, $50.00 < vdN1 < 65.00$, $0.545 < \theta gFN1$, $-0.010 < \theta gFN1 - (0.6418 - 0.00168 \times vdN1)$, where ndN1: a refractive index of the negative lens for d-line,
vdN1: an Abbe number of the negative lens with reference to d-line, and
θgFN1: a partial dispersion ratio of the negative lens, defined by a following expression when a refractive index of the negative lens for g-line is ngN1, a refractive index of the negative lens for F-line is nFN1, and a refractive index of the negative lens for C-line is nCN1:

$\theta gFN1 = (ngN1 - nFN1)/(nFN1 - nCN1)$.

A zoom optical system according to the present invention comprises: a plurality of lens groups that include lens groups having negative refractive powers, wherein upon zooming, a distance between the lens groups adjacent to each other changes, and an object-side negative lens group disposed closest to an object among the lens groups having the negative refractive powers includes a negative lens that satisfies the following conditional expressions, $-0.010 < ndN3 - (2.015 - 0.0068 \times vdN3)$, $50.00 < vdN3 < 65.00$, $0.545 < \theta gFN3$, $-0.010 < \theta gFN3 - (0.6418 - 0.00168 \times vdN3)$, where ndN3: a refractive index of the negative lens for d-line,
vdN3: an Abbe number of the negative lens with reference to d-line, and
θgFN3: a partial dispersion ratio of the negative lens, defined by a following expression when a refractive index of the negative lens for g-line is ngN3, a refractive index of the negative lens for F-line is nFN3, and a refractive index of the negative lens for C-line is nCN3:

$\theta gFN3 = (ngN3 - nFN3)/(nFN3 - nCN3)$.

The optical apparatus according to the present invention comprises the zoom optical system described above.

A method for manufacturing a zoom optical system that includes a plurality of lens groups including lens groups having negative refractive powers according to the present invention. The method comprises a step of arranging each lens in a lens barrel so that upon zooming, a distance between the lens groups adjacent to each other changes, and an object-side negative lens group disposed closest to an object among the lens groups having the negative refractive powers includes a negative lens that satisfies the following conditional expressions, $$-0.010 < ndN3 - (2.015 - 0.0068 \times vdN3),$$

$$50.00 < vdN3 < 65.00,$$

$$0.545 < \theta gFN3,$$

$$-0.010 < \theta gFN3 - (0.6418 - 0.00168 \times vdN3),$$

where ndN3: a refractive index of the negative lens for d-line,
vdN3: an Abbe number of the negative lens with reference to d-line, and
θgFN3: a partial dispersion ratio of the negative lens, defined by a following expression when a refractive index of the negative lens for g-line is ngN3, a refractive index of the negative lens for F-line is nFN3, and a refractive index of the negative lens for C-line is nCN3:

$$\theta gFN3 = (ngN3 - nFN3)/(nFN3 - nCN3).$$

BRIEF DESCRIPTION OF THE DRAWINGS

FIG. 1 is a lens configuration diagram of an optical system in a state upon focusing on infinity according to First Example;

FIGS. 2A, 2B and 2C are graphs respectively showing various aberrations of the optical system according to First Example upon focusing on infinity, upon focusing on an intermediate distant object and upon focusing on a short distant object;

FIGS. 4A, 4B and 4C are graphs respectively showing various aberrations of the optical system according to Second Example upon focusing on infinity in the wide-angle end state, the intermediate focal length state and the telephoto end state;

FIGS. 6A, 6B and 6C are graphs respectively showing various aberrations of the optical system according to Third Example upon focusing on infinity in the wide-angle end state, the intermediate focal length state and the telephoto end state;

FIG. 7 is a lens configuration diagram of an optical system in a state upon focusing on infinity according to Fourth Example;

FIGS. 8A, 8B and 8C are graphs respectively showing various aberrations of the optical system according to Fourth Example upon focusing on infinity in the wide-angle end state, the intermediate focal length state and the telephoto end state;

FIG. 9 is a lens configuration diagram of an optical system in a state upon focusing on infinity according to Fifth Example;

FIGS. 10A, 10B and 10C are graphs respectively showing various aberrations of the optical system according to Fifth Example upon focusing on infinity in the wide-angle end state, the intermediate focal length state and the telephoto end state;

FIG. 11 is a lens configuration diagram of an optical system in a state upon focusing on infinity according to Sixth Example;

FIGS. 12A, 12B and 12C are graphs respectively showing various aberrations of the optical system according to Sixth Example upon focusing on infinity in the wide-angle end state, the intermediate focal length state and the telephoto end state;

FIGS. 14A, 14B and 14C are graphs respectively showing various aberrations of the optical system according to Seventh Example upon focusing on infinity in the wide-angle end state, the intermediate focal length state and the telephoto end state;

FIG. 15 is a lens configuration diagram of an optical system in a state upon focusing on infinity according to Eighth Example;

FIGS. 16A, 16B and 16C are graphs respectively showing various aberrations of the optical system according to Eighth Example upon focusing on infinity in the wide-angle end state, the intermediate focal length state and the telephoto end state;

FIGS. 18A, 18B and 18C are graphs respectively showing various aberrations of the optical system according to Ninth Example upon focusing on infinity in the wide-angle end state, the intermediate focal length state and the telephoto end state;

FIGS. 20A, 20B and 20C are graphs respectively showing various aberrations of the optical system according to Tenth Example upon focusing on infinity in the wide-angle end state, the intermediate focal length state and the telephoto end state;

FIGS. 22A, 22B and 22C are graphs respectively showing various aberrations of the optical system according to Eleventh Example upon focusing on infinity in the wide-angle end state, the intermediate focal length state and the telephoto end state;

FIG. 25 is a flowchart showing a method of manufacturing the optical system (zoom optical system) according to a second embodiment.

DESCRIPTION OF THE EMBODIMENTS

Figure 23:
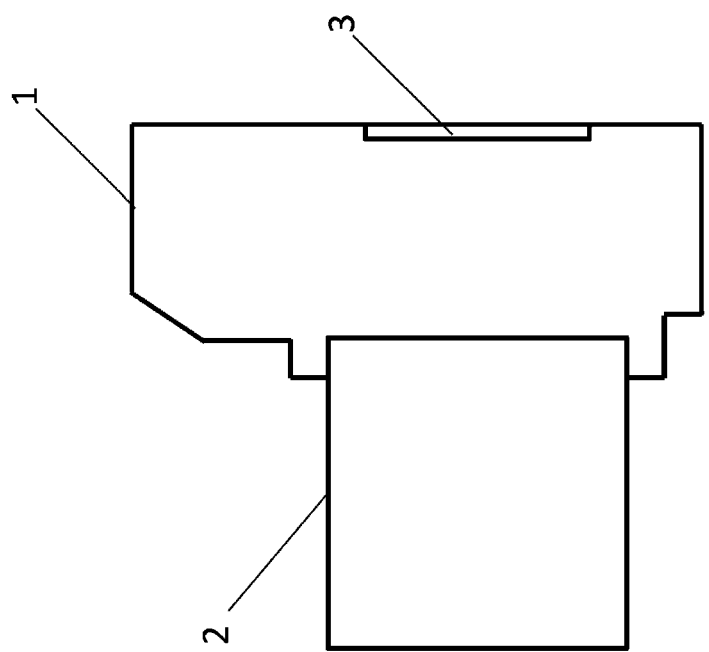
FIG. 23 shows a configuration of a camera that includes the optical system according to each embodiment.

Hereinafter, preferable embodiments according to the present invention are described. First, a camera (optical apparatus) that includes an optical system according to each embodiment is described with reference to FIG. 23. As shown in FIG. 23, the camera 1 is a digital camera that includes the optical system according to each embodiment, as a photographing lens 2. In the camera 1, light from an object (photographic subject), not shown, is collected by the photographing lens 2, and reaches an imaging element 3.

Accordingly, the light from the photographic subject is captured by the imaging element 3, and is recorded as a photographic subject image in a memory, not shown. As described above, a photographer can take the image of the photographic subject through the camera 1. Note that this camera may be a mirrorless camera, or a single-lens reflex camera that includes a quick return mirror.

Next, the optical system according to a first embodiment is described. As shown in FIG. 1, an optical system LS(1) as an example of an optical system (photographing lens) LS according to the first embodiment comprises: an aperture stop S; and a negative lens (L4) that is disposed closer to an object than the aperture stop S, and satisfies following conditional expressions (1) to (4).

$$-0.010 < ndN1 - (2.015 - 0.0068 \times vdN1), \quad (1)$$

$$50.00 < vdN1 < 65.00, \quad (2)$$

$$0.545 < \theta gFN1, \quad (3)$$

$$-0.010 < \theta gFN1 - (0.6418 - 0.00168 \times vdN1), \quad (4)$$

where ndN1: is a refractive index of the negative lens for d-line, vdN1: an Abbe number of the negative lens with reference to d-line, and θgFN1: a partial dispersion ratio of the negative lens, defined by a following expression when a refractive index of the negative lens for g-line is ngN1, a refractive index of the negative lens for F-line is nFN1, and a refractive index of the negative lens for C-line is nCN1:

$$\theta gFN1 = (ngN1 - nFN1)/(nFN1 - nCN1).$$

Note that the Abbe number vdN1 of the negative lens with reference to d-line is defined by the following expression:

$$vdN1 = (ndN1 - 1)/(nFN1 - nCN1).$$

According to the first embodiment, the optical system where for correction of chromatic aberrations, in addition to primary achromatization, the secondary spectrum is favorably corrected, and the optical apparatus that includes this optical system can be achieved. The optical system LS according to the first embodiment may be an optical system LS(2) shown in FIG. 3, an optical system LS(3) shown in FIG. 5, an optical system LS(4) shown in FIG. 7, an optical system LS(5) shown in FIG. 9, or an optical system LS(6) shown in FIG. 11. The optical system LS according to the first embodiment may be an optical system LS(7) shown in FIG. 13, an optical system LS(8) shown in FIG. 15, an optical system LS(9) shown in FIG. 17, an optical system LS(10) shown in FIG. 19, or an optical system LS(11) shown in FIG. 21.

The conditional expression (1) defines an appropriate relationship between the refractive index of the negative lens for d-line and the Abbe number with reference to d-line. By satisfying the conditional expression (1), correction of the reference aberrations, such as the spherical aberration and the coma aberration, and correction of the primary chromatic aberration can be favorably performed.

If the corresponding value of the conditional expression (1) falls outside of the range, the correction of the chromatic aberrations becomes difficult. By setting the lower limit value of the conditional expression (1) to −0.005, the advantageous effects of this embodiment can be further secured. To further secure the advantageous effects of this embodiment, the lower limit value of the conditional expression (1) may be set to −0.001, 0.000, 0.003, 0.005 or 0.007, or further to 0.008.

Note that the upper limit value of the conditional expression (1) may be set to less than 0.150. Accordingly, correction of the reference aberrations, such as the spherical aberration and the coma aberration, and correction of the primary chromatic aberration (achromatization) can be favorably performed. In this case, by setting the upper limit value of the conditional expression (1) to 0.100, the advantageous effects of this embodiment can be further secured. To further secure the advantageous effects of this embodiment, the upper limit value of the conditional expression (1) may be set to 0.080, 0.060 or 0.050, or further to 0.045.

The conditional expression (2) defines an appropriate range of the Abbe number of the negative lens with reference to d-line. By satisfying the conditional expression (2), correction of the reference aberrations, such as the spherical aberration and the coma aberration, and correction of the primary chromatic aberration (achromatization) can be favorably performed.

If the corresponding value of the conditional expression (2) falls outside of the range, the correction of the chromatic aberrations becomes difficult. By setting the lower limit value of the conditional expression (2) to 50.50, the advantageous effects of this embodiment can be further secured. To further secure the advantageous effects of this embodiment, the lower limit value of the conditional expression (2) may be set to 51.00, 51.50 or 52.00, or further to 52.40.

By setting the upper limit value of the conditional expression (2) to 64.00, the advantageous effects of this embodiment can be further secured. To further secure the advantageous effects of this embodiment, the upper limit value of the conditional expression (2) may be set to 63.00, 62.50, 62.00, 61.50, 61.00 or 60.00, or further to 59.50.

The conditional expression (3) appropriately defines the anomalous dispersion characteristics of the negative lens. By satisfying the conditional expression (3), for correction of chromatic aberrations, in addition to primary achromatization, the secondary spectrum can be favorably corrected.

If the corresponding value of the conditional expression (3) falls outside of the range, the correction of the chromatic aberrations becomes difficult. By setting the lower limit value of the conditional expression (3) to 0.547, the advantageous effects of this embodiment can be further secured. To further secure the advantageous effects of this embodiment, the lower limit value of the conditional expression (3) may be set to 0.548 or 0.549, or further to 0.550.

The conditional expression (4) appropriately defines the anomalous dispersion characteristics of the negative lens. By satisfying the conditional expression (4), for correction of chromatic aberrations, in addition to primary achromatization, the secondary spectrum can be favorably corrected.

If the corresponding value of the conditional expression (4) falls outside of the range, the correction of the chromatic aberrations becomes difficult. By setting the lower limit value of the conditional expression (4) to −0.005, the advantageous effects of this embodiment can be further secured. To further secure the advantageous effects of this embodiment, the lower limit value of the conditional expression (4) may be set to −0.001.

Note that the upper limit value of the conditional expression (4) may be set to less than 0.040. Accordingly, correction of the reference aberrations, such as the spherical aberration and the coma aberration, and correction of the primary chromatic aberration (achromatization) can be favorably performed. In this case, by setting the upper limit value of the conditional expression (4) to 0.030, the advantageous effects of this embodiment can be further secured. To further secure the advantageous effects of this embodiment, the upper limit value of the conditional expression (4) may be set to 0.025, or further to 0.020.

Preferably, the optical system LS according to the first embodiment consists of: the aperture stop S; a front group GF disposed closer to the object than the aperture stop S; and a rear group GR disposed closer to an image than the aperture stop S, wherein the front group GF, which includes the negative lens, satisfies the following conditional expression (5), $$-10.00<(-fN1)/fF<10.00, \tag{5}$$

where fN1: the focal length of the negative lens, and fF: a focal length of the front group GF; the focal length of the front group GF in the wide angle end state in a case where the optical system LS is a zoom optical system.

The conditional expression (5) defines an appropriate relationship between the focal length of the negative lens and the focal length of the front group GF. By satisfying the conditional expression (5), the reference aberrations, such as the spherical aberration and the coma aberration, can be favorably corrected.

If the corresponding value of the conditional expression (5) falls outside of the range, the correction of the reference aberrations, such as the spherical aberration and the coma aberration, becomes difficult. By setting the lower limit value of the conditional expression (5) to −9.50, the advantageous effects of this embodiment can be further secured. To further secure the advantageous effects of this embodiment, the lower limit value of the conditional expression (5) may be set to −9.00, −8.50, −8.00, −7.00, −5.00, −3.00, −1.50, −0.05 or 0.05, or further to 0.10.

By setting the upper limit value of the conditional expression (5) to 8.50, the advantageous effects of this embodiment can be further secured. To further secure the advantageous effects of this embodiment, the upper limit value of the conditional expression (5) may be set to 7.50, 6.50, 5.00 or 4.00, or further to 3.00.

In the optical system LS according to the first embodiment, preferably, the negative lens satisfies the following conditional expression (6), $$0.10<(-fN1)/f<15.00 \tag{6}$$

where fN1: the focal length of the negative lens, and f: a focal length of the optical system; the focal length of the optical system LS in the wide angle end state in a case where the optical system LS is a zoom optical system.

The conditional expression (6) defines an appropriate relationship between the focal length of the negative lens and the focal length of the optical system LS. By satisfying the conditional expression (6), the reference aberrations, such as the spherical aberration and the coma aberration, can be favorably corrected.

If the corresponding value of the conditional expression (6) falls outside of the range, the correction of the reference aberrations, such as the spherical aberration and the coma aberration, becomes difficult. By setting the lower limit value of the conditional expression (6) to 0.20, the advantageous effects of this embodiment can be further secured. To further secure the advantageous effects of this embodiment, the lower limit value of the conditional expression (6) may be set to 0.30, 0.40 or 0.45, or further to 0.50.

By setting the upper limit value of the conditional expression (6) to 14.20, the advantageous effects of this embodiment can be further secured. To further secure the advantageous effects of this embodiment, the upper limit value of the conditional expression (6) may be set to 12.00, 10.00 or 8.50, or further to 7.50.

In the optical system LS according to the first embodiment, the negative lens may satisfy the following conditional expression (3-1), $$0.555<\theta gFN1. \tag{3-1}$$

The conditional expression (3-1) is an expression similar to the conditional expression (3), and can exert advantageous effects similar to those of the conditional expression (3). By setting the lower limit value of the conditional expression (3-1) to 0.556, the advantageous effects of this embodiment can be further secured. To further secure the advantageous effects of this embodiment, it is preferable to set the lower limit value of the conditional expression (3-1) to 0.557.

In the optical system LS according to the first embodiment, the negative lens may satisfy the following conditional expression (4-1), $$0.010<\theta gFN1-(0.6418-0.00168\times vdN1). \tag{4-1}$$

The conditional expression (4-1) is an expression similar to the conditional expression (4), and can exert advantageous effects similar to those of the conditional expression (4). By setting the lower limit value of the conditional expression (4-1) to 0.011, the advantageous effects of this embodiment can be further secured. To further secure the advantageous effects of this embodiment, it is preferable to set the lower limit value of the conditional expression (4-1) to 0.012.

Note that the upper limit value of the conditional expression (4-1) may be set to less than 0.030. Accordingly, advantageous effects similar to those of the conditional expression (4) can be achieved. In this case, by setting the upper limit value of the conditional expression (4-1) to 0.028, the advantageous effects of this embodiment can be further secured. To further secure the advantageous effects of this embodiment, the upper limit value of the conditional expression (4-1) may be set to 0.025 or 0.023, or further to 0.020.

In the optical system LS according to the first embodiment, preferably, the negative lens satisfies the following conditional expression (7), $$DN1>0.400 \text{ [mm]} \tag{7}$$

where DN1: a thickness of the negative lens on an optical axis.

The conditional expression (7) appropriately defines the thickness of the negative lens on the optical axis. By satisfying the conditional expression (7), the various aberrations, such as the coma aberration, the chromatic aberrations (the longitudinal chromatic aberration and the chromatic aberration of magnification), can be favorably corrected.

If the corresponding value of the conditional expression (7) falls outside of the range, the correction of the various aberrations, such as the coma aberration and the chromatic aberrations (the longitudinal chromatic aberration and the chromatic aberration of magnification), becomes difficult. By setting the lower limit value of the conditional expression (7) to 0.450 [mm], the advantageous effects of this embodiment can be further secured. To further secure the advantageous effects of this embodiment, the lower limit value of the conditional expression (7) may be set to 0.490 [mm], 0.550 [mm], 0.580 [mm], 0.650 [mm], 0.680 [mm], 0.750 [mm], 0.800 [mm], 0.850 [mm], 0.880 [mm], 0.950

[mm], 0.980 [mm], 1.050 [mm], 1.100 [mm], 1.140 [mm], 1.250 [mm], or further to 1.350 [mm].

In the optical system LS according to the first embodiment, preferably, the negative lens is a single lens, or one lens of two lenses of a cemented lens consisting of the two lenses cemented to each other. Use of glass as the material of the lens has smaller variation in optical characteristics due to temperature than that of resin. In this embodiment, glass can be used as a material of the negative lens. Accordingly, even in the case where the negative lens has a lens surface in contact with air (i.e., a single lens, or one lens of two lenses of a cemented lens consisting of the two lenses cemented to each other), it is preferable because variation in optical characteristics due to temperature is small.

In the optical system LS according to the first embodiment, it is desirable that at least one lens surface of an object-side lens surface and an image-side lens surface of the negative lens be in contact with air. Use of glass as the material of the lens has smaller variation in optical characteristics due to temperature than that of resin. In this embodiment, glass can be used as a material of the negative lens. Accordingly, even in a case where a lens surface of the negative lens is in contact with air, it is preferable because the variation in optical characteristics due to temperature is small.

In the optical system LS according to the first embodiment, it is desirable that the negative lens be a glass lens. The secular change of the negative lens that is a glass lens is smaller than that of a resin lens. Accordingly, it is preferable because the variation in optical characteristics due to temperature is small.

Figure 24:
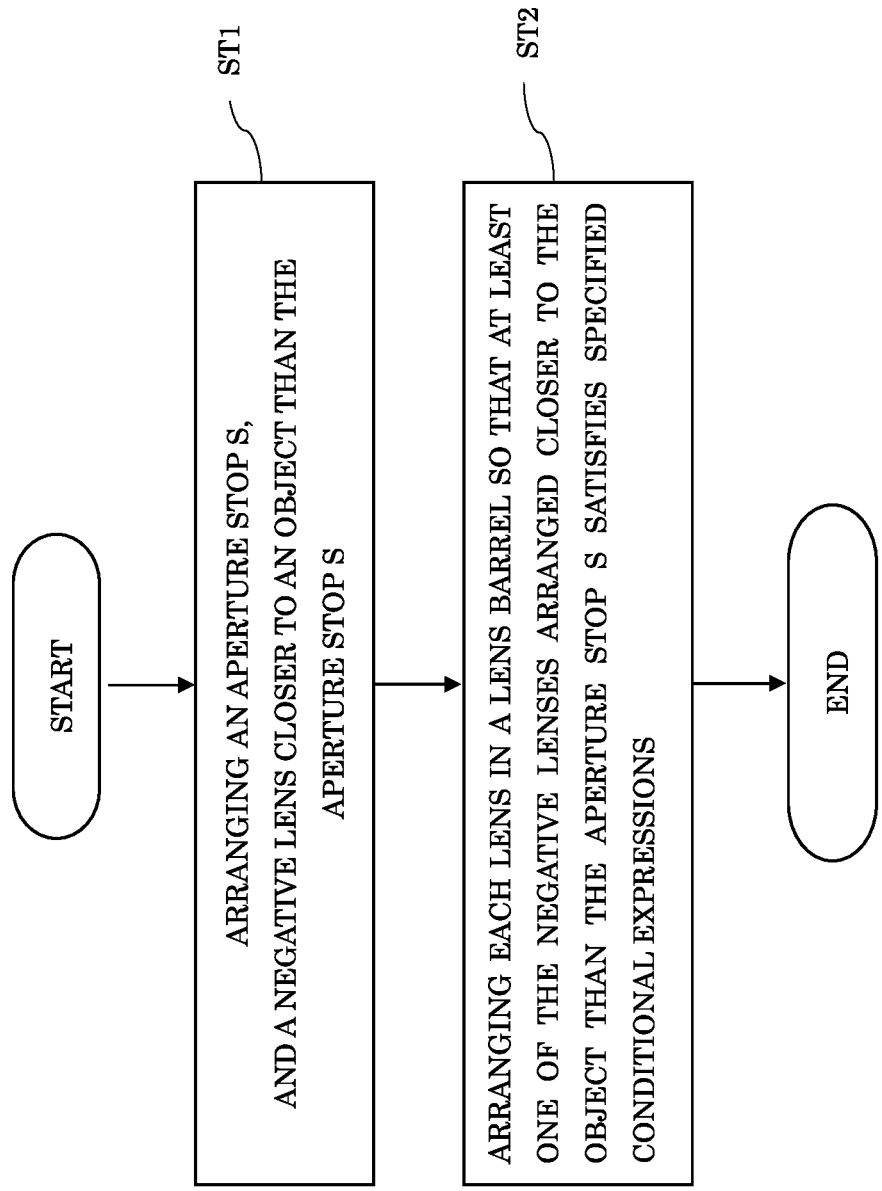
FIG. 24 is a flowchart showing a method of manufacturing the optical system according to a first embodiment.

Subsequently, referring to FIG. 24, a method for manufacturing the optical system LS according to the first embodiment is schematically described. First, an aperture stop S, and a negative lens closer to an object than the aperture stop S are arranged (step ST1). At this time, each lens is arranged in a lens barrel so that at least one of the negative lenses arranged closer to the object than the aperture stop S satisfies the conditional expressions (1) to (4) and the like (step ST2). According to such a manufacturing method, the optical system where for correction of chromatic aberrations, in addition to primary achromatization, the secondary spectrum is favorably corrected can be manufactured.

Figure 3:
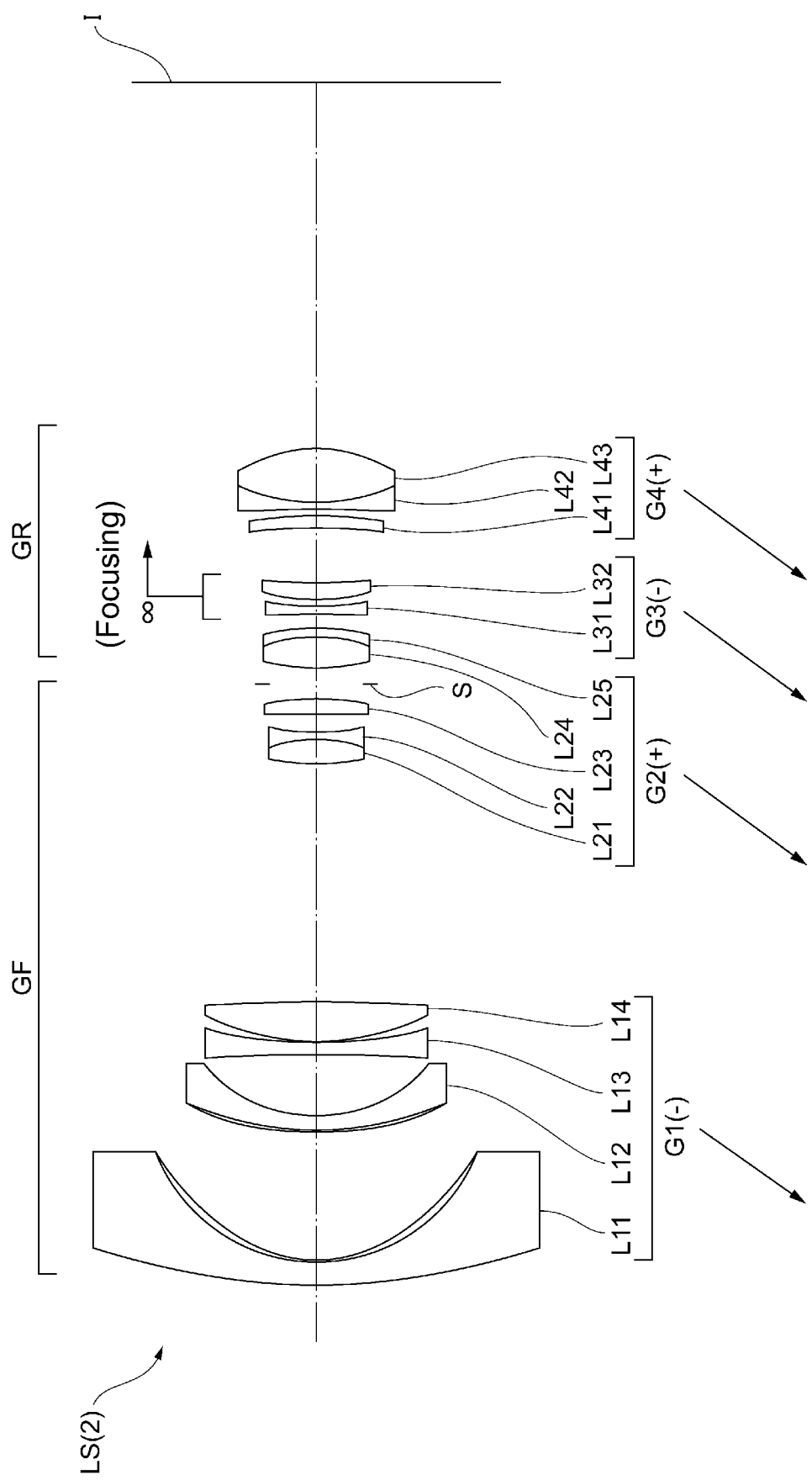
FIG. 3 is a lens configuration diagram of an optical system in a state upon focusing on infinity according to Second Example.

Next, the optical system according to a second embodiment is described. As shown in FIG. 3, the optical system LS(2) as an example of the optical system (photographing lens) LS according to the second embodiment includes a plurality of lens groups that include lens groups having negative refractive powers. Upon zooming, the distance between the lens groups adjacent to each other changes. An object-side negative lens group (a first lens group G1) disposed closest to an object among the lens groups having the negative refractive powers includes a negative lens (L13) that satisfies the following conditional expressions (11) to (14).

$$-0.010 < ndN3 - (2.015 - 0.0068 \times vdN3), \quad (11)$$

$$50.00 < vdN3 < 65.00, \quad (12)$$

$$0.545 < \theta gFN3, \quad (13)$$

$$-0.010 < \theta gFN3 - (0.6418 - 0.00168 \times vdN3), \quad (14)$$

where $ndN3$: a refractive index of the negative lens for d-line, $vdN3$: an Abbe number of the negative lens with reference to d-line, and $\theta gFN3$: a partial dispersion ratio of the negative lens, defined by a following expression when a refractive index of the negative lens for g-line is $ngN3$, a refractive index of the negative lens for F-line is $nFN3$, and a refractive index of the negative lens for C-line is $nCN3$:

$$\theta gFN3 = (ngN3 - nFN3)/(nFN3 - nCN3).$$

Note that the Abbe number $vdN3$ of the negative lens with reference to d-line is defined by the following expression:

$$vdN3 = (ndN3 - 1)/(nFN3 - nCN3).$$

The optical system LS according to the second embodiment is a zoom optical system that performs zooming by changing the distance between lens groups adjacent to each other. According to the second embodiment, the zoom optical system where for correction of chromatic aberrations, in addition to primary achromatization, the secondary spectrum is favorably corrected, and the optical apparatus that includes this zoom optical system can be achieved. The optical system LS (zoom optical system) according to the second embodiment may be an optical system LS(3) shown in FIG. 5, an optical system LS(4) shown in FIG. 7, an optical system LS(5) shown in FIG. 9, or an optical system LS(6) shown in FIG. 11. The optical system LS (zoom optical system) according to the second embodiment may be an optical system LS(7) shown in FIG. 13, an optical system LS(8) shown in FIG. 15, an optical system LS(9) shown in FIG. 17, an optical system LS(10) shown in FIG. 19, or an optical system LS(11) shown in FIG. 21.

The conditional expression (11) defines an appropriate relationship between the refractive index of the negative lens for d-line and the Abbe number with reference to d-line. By satisfying the conditional expression (11), correction of the reference aberrations, such as the spherical aberration and the coma aberration, and correction of the primary chromatic aberration (achromatization) can be favorably performed.

If the corresponding value of the conditional expression (11) falls outside of the range, the correction of the chromatic aberrations becomes difficult. By setting the lower limit value of the conditional expression (11) to −0.005, the advantageous effects of this embodiment can be further secured. To further secure the advantageous effects of this embodiment, the lower limit value of the conditional expression (11) may be set to −0.001, 0.000, 0.003, 0.005 or 0.007, or further to 0.008.

Note that the upper limit value of the conditional expression (11) may be set to less than 0.150. Accordingly, correction of the reference aberrations, such as the spherical aberration and the coma aberration, and correction of the primary chromatic aberration (achromatization) can be favorably performed. In this case, by setting the upper limit value of the conditional expression (11) to 0.100, the advantageous effects of this embodiment can be further secured. To further secure the advantageous effects of this embodiment, the upper limit value of the conditional expression (11) may be set to 0.080, 0.060 or 0.050, or further to 0.045.

The conditional expression (12) defines an appropriate range of the Abbe number of the negative lens with reference to d-line. By satisfying the conditional expression (12), correction of the reference aberrations, such as the spherical aberration and the coma aberration, and correction of the primary chromatic aberration (achromatization) can be favorably performed.

If the corresponding value of the conditional expression (12) falls outside of the range, the correction of the chromatic aberrations becomes difficult. By setting the lower limit value of the conditional expression (12) to 50.50, the advantageous effects of this embodiment can be further secured. To further secure the advantageous effects of this embodiment, the lower limit value of the conditional expression (12) may be set to 51.00, 51.50 or 52.00, or further to 52.40.

By setting the upper limit value of the conditional expression (12) to 64.00, the advantageous effects of this embodiment can be further secured. To further secure the advantageous effects of this embodiment, the upper limit value of the conditional expression (12) may be set to 63.00, 62.50, 62.00, 61.50, 61.00 or 60.00, or further to 59.50.

The conditional expression (13) appropriately defines the anomalous dispersion characteristics of the negative lens. By satisfying the conditional expression (13), for correction of chromatic aberrations, in addition to primary achromatization, the secondary spectrum can be favorably corrected.

If the corresponding value of the conditional expression (13) falls outside of the range, the correction of the chromatic aberrations becomes difficult. By setting the lower limit value of the conditional expression (13) to 0.547, the advantageous effects of this embodiment can be further secured. To further secure the advantageous effects of this embodiment, the lower limit value of the conditional expression (13) may be set to 0.548 or 0.549, or further to 0.550.

The conditional expression (14) appropriately defines the anomalous dispersion characteristics of the negative lens. By satisfying the conditional expression (14), for correction of chromatic aberrations, in addition to primary achromatization, the secondary spectrum can be favorably corrected.

If the corresponding value of the conditional expression (14) falls outside of the range, the correction of the chromatic aberrations becomes difficult. By setting the lower limit value of the conditional expression (14) to −0.005, the advantageous effects of this embodiment can be further secured. To further secure the advantageous effects of this embodiment, the lower limit value of the conditional expression (14) may be set to −0.001.

Note that the upper limit value of the conditional expression (14) may be set to less than 0.040. Accordingly, correction of the reference aberrations, such as the spherical aberration and the coma aberration, and correction of the primary chromatic aberration (achromatization) can be favorably performed. In this case, by setting the upper limit value of the conditional expression (14) to 0.030, the advantageous effects of this embodiment can be further secured. To further secure the advantageous effects of this embodiment, the upper limit value of the conditional expression (14) may be set to 0.025, or further to 0.020.

In the optical system LS (zoom optical system) according to the second embodiment, preferably, the negative lens satisfies the following conditional expression (15), $$0.50 < fN3/fGa < 7.00 \quad (15)$$

where $fN3$: the focal length of the negative lens, and $fGa$: a focal length of the object-side negative lens group.

The conditional expression (15) defines an appropriate relationship between the focal length of the negative lens and the focal length of the object-side negative lens group. By satisfying the conditional expression (15), the reference aberrations, such as the spherical aberration and the coma aberration, can be favorably corrected.

If the corresponding value of the conditional expression (15) falls outside of the range, the correction of the reference aberrations, such as the spherical aberration and the coma aberration, becomes difficult. By setting the lower limit value of the conditional expression (15) to 0.55, the advantageous effects of this embodiment can be further secured. To further secure the advantageous effects of this embodiment, the lower limit value of the conditional expression (15) may be set to 0.60, 0.65, 0.70, 0.75, 0.80, 0.85, 0.90, 0.95, 1.00 or 1.05, or further to 1.10.

By setting the upper limit value of the conditional expression (15) to 6.50, the advantageous effects of this embodiment can be further secured. To further secure the advantageous effects of this embodiment, the upper limit value of the conditional expression (15) may be set to 6.20, 5.50, 5.00, 4.50, 4.00, 3.80, 3.30, 3.00 or 2.80, or further to 2.30.

In the optical system LS (zoom optical system) according to the second embodiment, preferably, the object-side negative lens group satisfies the following conditional expression (16), $$0.20 < (-fGa)/f < 3.50 \quad (16)$$

where $fGa$: a focal length of the object-side negative lens group, and $f$: a focal length of the zoom optical system LS (zoom optical system) in a wide angle end state.

The conditional expression (16) defines an appropriate relationship between the focal length of the object-side negative lens group and the focal length of the optical system LS (zoom optical system). By satisfying the conditional expression (16), the reference aberrations, such as the spherical aberration and the coma aberration, can be favorably corrected.

If the corresponding value of the conditional expression (16) falls outside of the range, the correction of the reference aberrations, such as the spherical aberration and the coma aberration, becomes difficult. By setting the lower limit value of the conditional expression (16) to 0.25, the advantageous effects of this embodiment can be further secured. To further secure the advantageous effects of this embodiment, the lower limit value of the conditional expression (16) may be set to 0.30, 0.35, 0.40, 0.45 or 0.50, or further to 0.55.

By setting the upper limit value of the conditional expression (16) to 3.30, the advantageous effects of this embodiment can be further secured. To further secure the advantageous effects of this embodiment, the upper limit value of the conditional expression (16) may be set to 3.00, 2.80, 2.65, 2.45 or 2.15, or further to 2.00.

In the optical system LS (zoom optical system) according to the second embodiment, the negative lens may satisfy the following conditional expression (13-1), $$0.555 < \theta gFN3. \quad (13\text{-}1)$$

The conditional expression (13-1) is an expression similar to the conditional expression (13), and can exert advantageous effects similar to those of the conditional expression (13). By setting the lower limit value of the conditional expression (13-1) to 0.556, the advantageous effects of this embodiment can be further secured. To further secure the advantageous effects of this embodiment, it is preferable to set the lower limit value of the conditional expression (13-1) to 0.557.

In the optical system LS (zoom optical system) according to the second embodiment, the negative lens may satisfy the following conditional expression (14-1), $$0.010 < \theta gFN3 - (0.6418 - 0.00168 \times vdN3). \quad (14\text{-}1)$$

The conditional expression (14-1) is an expression similar to the conditional expression (14), and can exert advantageous effects similar to those of the conditional expression (14). By setting the lower limit value of the conditional expression (14-1) to 0.011, the advantageous effects of this embodiment can be further secured. To further secure the advantageous effects of this embodiment, it is preferable to set the lower limit value of the conditional expression (14-1) to 0.012.

Note that the upper limit value of the conditional expression (14-1) may be set to less than 0.030. Accordingly, advantageous effects similar to those of the conditional expression (14) can be achieved. In this case, by setting the upper limit value of the conditional expression (14-1) to 0.028, the advantageous effects of this embodiment can be further secured. To further secure the advantageous effects of this embodiment, the upper limit value of the conditional expression (14-1) may be set to 0.025 or 0.023, or further to 0.020.

In the optical system LS (zoom optical system) according to the second embodiment, preferably, the negative lens satisfies the following conditional expression (17), $$DN3 > 0.400 \text{ [mm]} \tag{17}$$

where DN3: a thickness of the negative lens on an optical axis.

The conditional expression (17) appropriately defines the thickness of the negative lens on the optical axis. By satisfying the conditional expression (17), the various aberrations, such as the coma aberration, the chromatic aberrations (the longitudinal chromatic aberration and the chromatic aberration of magnification), can be favorably corrected.

If the corresponding value of the conditional expression (17) falls outside of the range, the correction of the various aberrations, such as the coma aberration and the chromatic aberrations (the longitudinal chromatic aberration and the chromatic aberration of magnification), becomes difficult. By setting the lower limit value of the conditional expression (17) to 0.450 [mm], the advantageous effects of this embodiment can be further secured. To further secure the advantageous effects of this embodiment, the lower limit value of the conditional expression (17) may be set to 0.490 [mm], 0.550 [mm], 0.580 [mm], 0.650 [mm], 0.680 [mm], 0.750 [mm], 0.800 [mm], 0.850 [mm], 0.880 [mm], 0.950 [mm], 0.980 [mm], 1.050 [mm], 1.100 [mm], 1.140 [mm] or 1.250 [mm], or further to 1.350 [mm].

In the optical system LS (zoom optical system) according to the second embodiment, preferably, the negative lens is a single lens, or one lens of two lenses of a cemented lens consisting of the two lenses cemented to each other. Use of glass as the material of the lens has smaller variation in optical characteristics due to temperature than that of resin. In this embodiment, glass can be used as a material of the negative lens. Accordingly, even in the case where the negative lens has a lens surface in contact with air (i.e., a single lens, or one lens of two lenses of a cemented lens consisting of the two lenses cemented to each other), it is preferable because variation in optical characteristics due to temperature is small.

In the optical system LS (zoom optical system) according to the second embodiment, at least one lens surface of an object-side lens surface and an image-side lens surface of the negative lens is in contact with air. Use of glass as the material of the lens has smaller variation in optical characteristics due to temperature than that of resin. In this embodiment, glass can be used as a material of the negative lens. Accordingly, even in a case where a lens surface of the negative lens is in contact with air, it is preferable because the variation in optical characteristics due to temperature is small.

In the optical system LS (zoom optical system) according to the second embodiment, it is desirable that the negative lens be a glass lens. The secular change of the negative lens that is a glass lens is smaller than that of a resin lens. Accordingly, it is preferable because the variation in optical characteristics due to temperature is small.

Subsequently, referring to FIG. 25, a method for manufacturing the optical system LS (zoom optical system) according to the second embodiment is schematically described. First, a plurality of lens groups including lens groups having negative refractive powers are arranged (step ST11). The configuration is made so that the distance between lens groups adjacent to each other changes upon zooming (step ST12). Each lens is arranged in the lens barrel so that the object-side negative lens group disposed closest to the object among the lens groups having negative refractive powers includes the negative lens satisfying the conditional expressions (11) to (14) and the like (step ST13). According to such a manufacturing method, the zoom optical system where for correction of chromatic aberrations, in addition to primary achromatization, the secondary spectrum is favorably corrected can be manufactured.

EXAMPLES

Optical systems LS according to Examples of each embodiment are described with reference to the drawings. Note that Examples corresponding to the first embodiment are First to Eleventh Examples, and Examples corresponding to the second embodiment are Second to Eleventh Examples. FIGS. 1, 3, 5, 7, 9, 11, 13, 15, 17, 19 and 21 are sectional views showing the configurations and refractive power allocations of optical systems LS {LS (1) to LS (11)} according to First to Eleventh Examples. In the sectional views of the optical systems LS(1) to LS(11) according to First to Eleventh Examples, the moving direction upon focusing by each focusing lens group from the infinity to a short-distance object is indicated by an arrow accompanied by characters "FOCUSING". The optical system LS(2) to (11) according to Second to Eleventh Examples are zoom optical systems that perform zooming by changing the distance between lens groups adjacent to each other. In the sectional views of the optical systems LS(2) to LS(11) according to Second to Eleventh Examples, the moving direction of each lens group along the optical axis upon zooming from the wide angle end state (W) to the telephoto end state (T) is indicated by an arrow.

In FIGS. 1, 3, 5, 7, 9, 11, 13, 15, 17, 19 and 21, each lens group is represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently on an Example-by-Example basis. Accordingly, even when the same combination of a symbol and a numeral is used among Examples, such usage does not mean the same configuration.

Tables 1 to 11 are shown below. Among the drawings, Table 1 is a table showing each data item in First Example, Table 2 is that in Second Example, Table 3 is that in Third Example, Table 4 is that in Fourth Example, Table 5 is that in Fifth Example, Table 6 is that in Sixth Example, Table 7 is that in Seventh Example, Table 8 is that in Eighth Example, Table 9 is that in Ninth Example, Table 10 is that in Tenth Example, and Table 11 is that in Eleventh Example. In each Example, as targets of calculation of aberration characteristics, d-line (wavelength λ=587.6 nm), g-line (wavelength λ=435.8 nm), C-line (wavelength λ=656.3 nm), and F-line (wavelength λ=486.1 nm) are selected.

In the table of [General Data], f indicates the focal length of the entire lens system, FNO indicates the f-number, 2ω indicates the angle of view (the unit is ° (degrees), and ω is the half angle of view), and Y indicates the image height. TL indicates a distance obtained by adding BF to the distance from the lens foremost surface to the lens last surface on the optical axis upon focusing on infinity. BF indicates the distance (back focus) from the lens last surface to the image surface I on the optical axis upon focusing on infinity. fF indicates the focal length of the front group, and fR indicates the focal length of the rear group. Note that in a case where the optical system is a zoom optical system, these values are indicated for each of zoom states at the wide-angle end (W), the intermediate focal length (M) and the telephoto end (T).

In the table of [Lens Data], Surface Number indicates the order of the optical surface from the object side along the direction in which the ray travels, R indicates the radius of curvature (the surface whose center of curvature resides on the image side is regarded to have a positive value) of each optical surface, D indicates the surface distance which is the distance to the next lens surface (or the image surface) from each optical surface on the optical axis, nd is the refractive index of the material of the optical member for d-line, νd indicates the Abbe number of the material of the optical member with respect to d-line, and θgF indicates the partial dispersion ratio of the material of the optical member. The radius of curvature "∞" indicates a plane or an opening. (Aperture Stop S) indicates an aperture stop S. The description of the air refractive index nd=1.00000 is omitted. In a case where the optical surface is an aspherical surface, the surface number is assigned * symbol, and the field of the radius of curvature R indicates the paraxial radius of curvature.

The refractive index of the optical member for g-line (wavelength λ=435.8 nm) is indicated by ng. The refractive index of the optical member for F-line (wavelength λ=486.1 nm) is indicated by nF. The refractive index of the optical member for C-line (wavelength λ=656.3 nm) is indicated by nC. Here, the partial dispersion ratio θgF of the material of the optical member is defined by the following expression (A).

$$\theta gF = (ng - nF)/(nF - nC). \quad (A)$$

In the table of [Aspherical Data], the shape of the aspherical surface indicated in [Lens Data] is indicated by the following expression (B). X(y) indicates the distance (sag amount) from the tangent plane at the vertex of the aspherical surface to the position on the aspherical surface at the height y along the optical axis direction. R indicates the radius of curvature (paraxial radius of curvature) of the reference spherical surface. κ indicates the conic constant. Ai indicates the i-th aspherical coefficient. "E-n" indicates "×10$^{-n}$". For example, 1.234E−05=1.234×10$^{-5}$. Note that the second-order aspherical coefficient A2 is zero, and the description thereof is omitted.

$$X(y) = (y^2/R)/\{1+(1-\kappa \times y^2/R^2)^{1/2}\} + A4 \times y^4 + A6 \times y^6 + A8 \times y^8 + A10 \times y^{10} + A12 \times y^{12}. \quad (B)$$

In a case where the optical system is not a zoom optical system, f indicates the focal length of the entire lens system, and β indicates the photographing magnification, as [Variable Distance Data on Short-Distance Photographing]. The table of [Variable Distance Data on Short-Distance Photographing] indicates the surface distance at the surface number where the surface distance is "Variable" in [Lens Data] corresponding to each focal length and photographing magnification.

In the case where the optical system is the zoom optical system, the surface distance at the surface number where the surface distance is "Variable" in [Lens Data] corresponding to each of zooming states at the wide angle end (W), the intermediate focal length (M) and the telephoto end (T) are indicated as [Variable Distance Data on Zoom Photographing].

The table of [Lens Group Data] shows the first surface (the surface closest to the object) and the focal length of each lens group.

The table of [Conditional Expression Corresponding Value] shows the value corresponding to each conditional expression.

Hereinafter, at all the data values, the listed focal length f, the radius of curvature R, the surface distance D, other lengths and the like are represented with "mm" if not otherwise specified. However, even after subjected to proportional scaling in or out, the optical system can achieve equivalent optical performance. Accordingly, the representation is not limited thereto.

The descriptions of the tables so far are common to all the Examples. Redundant descriptions are hereinafter omitted.

First Example

First Example is described with reference to FIGS. 1 and 2A, 2B and 2C and Table 1. FIG. 1 is a diagram showing a lens configuration of an optical system in a state upon focusing on infinity according to First Example. The optical system LS(1) according to First Example consists of, in order from the object: a first lens group G1 having a positive refractive power; and a second lens group G2 having a positive refractive power. Upon focusing from the infinity object to the short-distant (finite distant) object, the second lens group G2 moves toward the object along the optical axis. The aperture stop S is disposed in the first lens group G1. A sign (+) or (−) assigned to each lens group symbol indicates the refractive power of each lens group. This indication similarly applies to all the following Examples.

The first lens group G1 consists of, in order from the object: a negative meniscus lens L1 having a convex surface facing the object; a positive meniscus lens L2 having a convex surface facing the object; a negative meniscus lens L3 having a convex surface facing the object; negative meniscus lens L4 having a convex surface facing an object; a cemented lens consisting of a negative meniscus lens L5 having a convex surface facing an object, and a positive meniscus lens L6 having a convex surface facing the object; a biconvex positive lens L7; a cemented lens consisting of a positive meniscus lens L8 having a concave surface facing the object, and a biconcave negative lens L9; and a biconvex positive lens L10. An aperture stop S is disposed between a positive lens L7 and a positive meniscus lens L8 (of the cemented lens) in the first lens group G1. In this Example, the negative meniscus lens L4 of the first lens group G1 corresponds to a negative lens that satisfies the conditional expressions (1) to (4) and the like.

The second lens group G2 consists of, in order from the object: a positive meniscus lens L21 having a concave surface facing the object; and a cemented lens consisting of a positive meniscus lens L22 having a concave surface facing the object, and a negative meniscus lens L23 having a concave surface facing the object. An image surface I is disposed on the image side of the second lens group G2. The positive meniscus lens L21 has an image-side lens surface that is an aspherical surface.

In this Example, the negative meniscus lens L1, the positive meniscus lens L2, the negative meniscus lens L3, the negative meniscus lens L4, the cemented lens consisting of the negative meniscus lens L5 and the positive meniscus lens L6, and the positive lens L7 constitute the front group GF disposed closer to the object than the aperture stop S. The cemented lens consisting of the positive meniscus lens L8 and the negative lens L9, the positive lens L10, the positive meniscus lens L21, the cemented lens consisting of the positive meniscus lens L22 and the negative meniscus lens L23 having a concave surface facing the object constitute the rear group GR disposed closer to the image than the aperture stop S.

The following Table 1 lists values of data on the optical system according to First Example.

TABLE 1

[General Data]

| | |
|---|---|
| f | 18.427 |
| FNO | 2.925 |
| 2ω | 100.785 |
| Y | 21.700 |
| TL | 102.549 |
| BF | 37.769 |
| fF | 332.090 |
| fR | 33.732 |

[Lens Data]

| Surface Number | R | D | nd | vd | θgF |
|---|---|---|---|---|---|
| 1 | 47.34020 | 1.800 | 1.84042 | 43.34 | 0.5621 |
| 2 | 25.82350 | 4.000 | | | |
| 3 | 37.48750 | 6.900 | 1.65160 | 58.54 | 0.5436 |
| 4 | 363.46330 | 0.100 | | | |
| 5 | 22.64200 | 1.300 | 1.79668 | 45.37 | 0.5592 |
| 6 | 12.39830 | 3.900 | | | |
| 7 | 31.60920 | 1.150 | 1.62731 | 59.30 | 0.5584 |
| 8 | 13.95370 | 2.500 | | | |
| 9 | 45.71850 | 1.000 | 1.62041 | 60.12 | 0.5417 |
| 10 | 9.13380 | 3.000 | 1.59507 | 35.51 | 0.5913 |
| 11 | 15.12450 | 1.000 | | | |
| 12 | 23.56840 | 12.300 | 1.69911 | 27.83 | 0.6107 |
| 13 | −23.38780 | 0.700 | | | |
| 14 | ∞ | 1.850 | | (Aperture Stop S) | |
| 15 | −38.67920 | 4.000 | 1.62588 | 35.70 | 0.5847 |
| 16 | −13.61320 | 1.200 | 1.86074 | 23.01 | 0.6195 |
| 17 | 72.75580 | 1.000 | | | |
| 18 | 78.27770 | 3.400 | 1.66755 | 41.96 | 0.5745 |
| 19 | −15.39400 | D19(Variable) | | | |
| 20 | −33.19360 | 2.000 | 1.51680 | 64.12 | 0.5360 |
| 21* | −30.04030 | 1.200 | | | |
| 22 | −26.81950 | 5.000 | 1.59319 | 67.87 | 0.5435 |
| 23 | −13.53970 | 1.800 | 1.86074 | 23.01 | 0.6195 |
| 24 | −16.60140 | BF | | | |

TABLE 1-continued

[Aspherical Surface Data]

21st Surface

κ = 1.000, A4 = 5.0910E−05, A6 = 1.2580E−07
A8 = −9.2250E−10, A10 = 5.5330E−12, A12 = 0.0000E+00

[Variable distance data on short-distance photographing]

| | Upon focusing on infinity f = 18.427 | Upon focusing on an intermediate distance object β = −0.033 | Upon focusing on a short-distance object β = −0.110 |
|---|---|---|---|
| D19 | 3.681 | 2.861 | 1.035 |

[Lens Group Data]

| Group | First surface | Focal length |
|---|---|---|
| G1 | 1 | 36.330 |
| G2 | 20 | 61.320 |

[Conditional Expression Corresponding Value]

<Negative meniscus lens L4(fN1 = −40.849)>

Conditional Expression(1)
ndN1 − (2.015 − 0.0068 × vdN1) = 0.016
Conditional Expression(2)vdN1 = 59.30
Conditional Expression(3), (3-1)θgFN1 = 0.5584
Conditional Expression(4), (4-1)
θgFN1 − (0.6418 − 0.00168 × vdN1) = 0.0162
Conditional Expression(5)(−fN1)/fF = 0.123
Conditional Expression(6)(−fN1)/f = 2.217
Conditional Expression(7)DN1 = 1.150

Figure 2B:
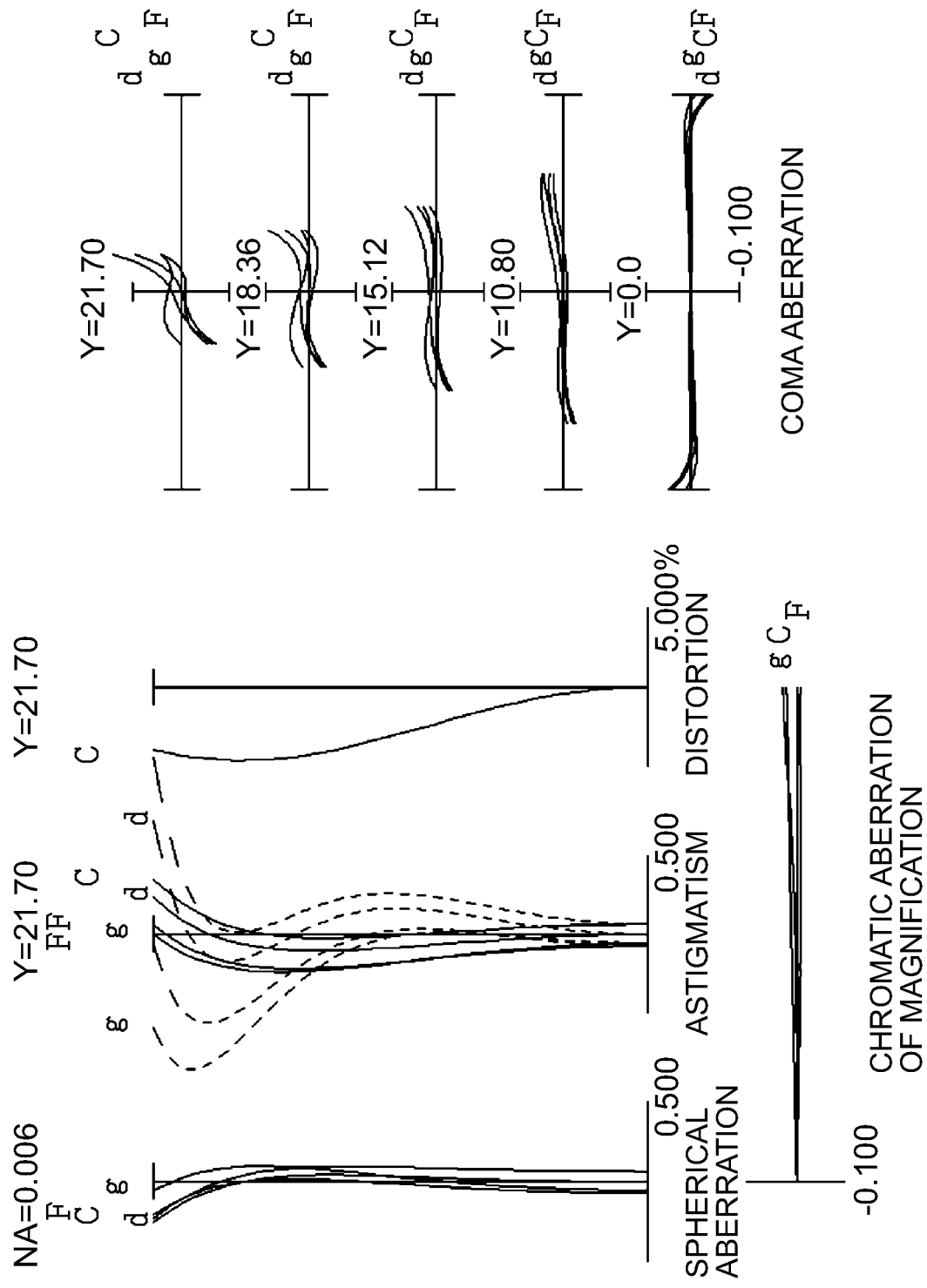

FIG. 2A shows various aberration graphs of the optical system according to First Example upon focusing on infinity. FIG. 2B shows various aberration graphs of the optical system according to First Example upon focusing on an intermediate distant object. FIG. 2C shows various aberration graphs of the optical system according to First Example upon focusing on a short-distant (very short distance) object. In each graph upon focusing on infinity, FNO indicates the f-number, and Y indicates the image height. In each aberration graph upon focusing on the intermediate distant object or focusing on the short distant object, NA indicates the numerical aperture, and Y indicates the image height. The spherical aberration graph indicates the value of the f-number or the numerical aperture that corresponds to the maximum diameter. The astigmatism graph and the distortion graph each indicate the maximum value of the image height. The coma aberration graph indicates the value of the corresponding image height. d indicates d-line (wavelength λ=587.6 nm), g indicates g-line (wavelength λ=435.8 nm), C indicates C-line (wavelength λ=656.3 nm), and F indicates F-line (wavelength λ=486.1 nm). In the astigmatism graph, a solid line indicates a sagittal image surface, and a broken line indicates a meridional image surface. Note that also in the following aberration graphs in each Example, symbols similar to those in this Example are used. Redundant description is omitted.

The various aberration graphs show that the optical system according to First Example has favorably corrected various aberrations, and exerts excellent imaging performance.

Second Example

Second Example is described with reference to FIGS. 3 and 4A, 4B and 4C and Table 2. FIG. 3 is a diagram showing a lens configuration of an optical system (zoom optical system) in a state upon focusing on infinity according to Second Example. The optical system LS(2) according to Second Example consists of, in order from the object: a first lens group G1 having a negative refractive power; a second lens group G2 having a positive refractive power; a third lens group G3 having a negative refractive power; and a fourth lens group G4 having a positive refractive power. Upon zooming from the wide-angle end state (W) to the telephoto end state (T), the first to fourth lens groups G1 to G4 move in directions indicated by arrows in FIG. 3. The aperture stop S is disposed in the second lens group G2.

The first lens group G1 consists of, in order from the object: a negative meniscus lens L11 having a convex surface facing the object; a negative meniscus lens L12 having a convex surface facing the object; a biconcave negative lens L13; and a biconvex positive lens L14. In this Example, the negative lens L13 of the first lens group G1 corresponds to a negative lens that satisfies the conditional expressions (1) to (4) and the like. In this Example, the first lens group G1 corresponds to an object-side negative lens group, and the negative lens L13 of the first lens group G1 corresponds to a negative lens that satisfies the conditional expressions (11) to (14) and the like. The negative meniscus lens L11 is a hybrid type lens that includes a lens main body made of glass, and a resin layer provided on the image-side surface of the lens main body. The image-side surface of the resin layer is an aspherical surface. The negative meniscus lens L11 is a composite type aspherical surface lens. In [Lens Data] described later, the surface number 1 indicates the object-side surface of the lens main body, the surface number 2 indicates the image-side surface of the lens main body and the object-side surface of the resin layer (a surface on which both the elements are in contact), and the surface number 3 indicates the image-side surface of the resin layer. The negative meniscus lens L12 is a hybrid type lens that includes a lens main body made of glass, and a resin layer provided on the object-side surface of the lens main body. The object-side surface of the resin layer is an aspherical surface. The negative meniscus lens L12 is a composite type aspherical surface lens. In [Lens Data] described later, the surface number 4 indicates the object-side surface of the resin layer, the surface number 5 indicates the image-side surface of the resin layer and the object-side surface of the lens main body (a surface on which both the elements are in contact), and the surface number 6 indicates the image-side surface of the lens main body.

The second lens group G2 consists of, in order from the object: a cemented lens consisting of a biconvex positive lens L21 and a biconcave negative lens L22; a positive meniscus lens L23 having a concave surface facing the object; and a cemented lens consisting of the biconvex positive lens L24 and the negative meniscus lens L25 having a concave surface facing the object. An aperture stop S is disposed between the positive meniscus lens L23 and the positive lens L24 (of the cemented lens) of the second lens group G2. The positive meniscus lens L23 of the second lens group G2 constitutes a vibration-proof lens group (partial group) that is movable in a direction perpendicular to the optical axis, and corrects variation in imaging position due to a camera shake and the like (image blur on the image surface I).

The third lens group G3 consists of, in order from the object: a biconcave negative lens L31; and a positive meniscus lens L32 having a convex surface facing the object. Upon focusing from the infinity object to the short-distant (finite distant) object, the third lens group G3 moves toward the image along the optical axis.

The fourth lens group G4 consists of, in order from the object: a positive meniscus lens L41 having a concave surface facing the object; and a cemented lens consisting of the biconcave negative lens L42 and the biconvex positive lens L43. An image surface I is disposed on the image side of the fourth lens group G4. The positive meniscus lens L41 has an image-side lens surface that is an aspherical surface.

In this Example, the negative meniscus lens L11, the negative meniscus lens L12, the negative lens L13, the positive lens L14, the cemented lens consisting of the positive lens L21 and the negative lens L22; and the positive meniscus lens L23 constitute the front group GF disposed closer to the object than the aperture stop S. The cemented lens consisting of the positive lens L24 and the negative meniscus lens L25, the negative lens L31, the positive meniscus lens L32, the positive meniscus lens L41, and the cemented lens consisting of the negative lens L42 and the positive lens L43 constitute the rear group GR disposed closer to the image than the aperture stop S.

The following Table 2 lists values of data on the optical system according to Second Example. Note that the eleventh surface is a virtual surface.

TABLE 2

[General Data]
Zooming ratio = 1.881

|  | W | M | T |
| --- | --- | --- | --- |
| f | 10.310 | 14.992 | 19.394 |
| FNO | 4.625 | 5.233 | 5.828 |
| 2ω | 55.344 | 43.833 | 36.393 |
| Y | 14.250 | 14.250 | 14.250 |
| TL | 127.176 | 118.440 | 118.247 |
| BF | 38.107 | 45.676 | 53.470 |
| fF | −25.207 | −22.363 | −21.191 |
| fR | 35.566 | 35.133 | 34.930 |

[Lens Data]

| Surface Number | R | D | nd | νd | θgF |
| --- | --- | --- | --- | --- | --- |
| 1 | 72.21520 | 2.400 | 1.77250 | 49.62 | 0.5518 |
| 2 | 18.07840 | 0.200 | 1.56093 | 36.64 | 0.5931 |
| 3* | 12.80980 | 13.500 |  |  |  |
| 4* | 38.72530 | 0.200 | 1.55389 | 38.09 | 0.5928 |
| 5 | 33.77930 | 1.500 | 1.80610 | 40.97 | 0.5688 |
| 6 | 15.49570 | 6.413 |  |  |  |
| 7 | −222.76580 | 1.300 | 1.68348 | 54.80 | 0.5501 |
| 8 | 47.03490 | 0.100 |  |  |  |
| 9 | 25.72760 | 4.150 | 1.71736 | 29.57 | 0.6036 |
| 10 | −234.96610 | D10(Variable) |  |  |  |
| 11 | ∞ | 1.100 |  |  |  |
| 12 | 24.59470 | 2.550 | 1.72825 | 28.38 | 0.6069 |
| 13 | −16.15400 | 0.800 | 1.91082 | 35.25 | 0.5824 |
| 14 | 27.17750 | 1.920 |  |  |  |
| 15 | −248.17450 | 1.580 | 1.51680 | 63.88 | 0.5360 |
| 16 | −25.45380 | 1.455 |  |  |  |
| 17 | ∞ | 1.802 |  | (Aperture Stop S) |  |
| 18 | 21.50780 | 3.280 | 1.53172 | 48.78 | 0.5622 |
| 19 | −15.09980 | 0.900 | 1.91082 | 35.25 | 0.5824 |
| 20 | −23.42430 | D20(Variable) |  |  |  |
| 21 | −112.18850 | 0.800 | 1.91082 | 35.25 | 0.5824 |
| 22 | 28.22450 | 0.697 |  |  |  |
| 23 | 18.60970 | 1.830 | 1.51680 | 63.88 | 0.5360 |
| 24 | 78.16100 | D24(Variable) |  |  |  |
| 25 | −60.82670 | 1.350 | 1.53110 | 55.91 | 0.5684 |
| 26* | −34.60170 | 0.600 |  |  |  |

TABLE 2-continued

| 27 | −134.59820 | 0.800 | 1.91082 | 35.25 | 0.5824 |
| 28 | 21.04650 | 5.600 | 1.48749 | 70.31 | 0.5291 |
| 29 | −15.26510 | BF | | | |

[Aspherical Surface Data]

3rd Surface

κ = 0.039, A4 = −1.10E−05, A6 = −2.98E−08
A8 = 1.59E−10, A10 = 2.68E−13, A12 = 0.00E+00

4th Surface

κ = 0.208, A4 = −3.60E−06, A6 = 8.87E−08
A8 = 2.10E−10, A10 = −2.30E−13, A12 = 0.00E+00

26th Surface

κ = 1.000, A4 = 5.66E−05, A6 = 5.08E−08
A8 = −2.05E−09, A10 = 3.50E−11, A12 = 0.00E+00

[Variable distance data on zoom photographing]

| | W | M | T |
|---|---|---|---|
| D10 | 25.062 | 8.757 | 0.770 |
| D20 | 1.457 | 2.644 | 3.179 |
| D24 | 5.723 | 4.536 | 4.001 |

[Lens Group Data]

| Group | First surface | Focal length |
|---|---|---|
| G1 | 1 | −16.381 |
| G2 | 11 | 24.075 |
| G3 | 21 | −53.290 |
| G4 | 25 | 70.213 |

[Conditional Expression Corresponding Value]

<Negative lens L13(fN1 = −56.709)>

Conditional Expression(1)
ndN1 − (2.015 − 0.0068 × vdN1) = 0.041
Conditional Expression(2)vdN1 = 54.80
Conditional Expression(3), (3-1)θgFN1 = 0.5501
Conditional Expression(4), (4-1)
θgFN1 − (0.6418 − 0.00168 × vdN1) = 0.0004
Conditional Expression(5)(−fN1)/fF = −2.250
Conditional Expression(6)(−fN1)/f = 5,500
Conditional Expression(7)DN1 = 1.300
<Negative lens L13(fN3 = −56.709)>

Conditional Expression(11)
ndN3 − (2.015 − 0.0068 × vdN3) = 0.041
Conditional Expression(12)
vdN3 = 54.80
Conditional Expression(13), (13-1)
θgFN3 = 0.5501
Conditional Expression(14), (14-1)
θgFN3 − (0.6418 − 0.00168 × vdN3) = 0.0004
Conditional Expression(15)
fN3/fGa = 3.462
Conditional Expression(16)
(−fGa)/f = 1.589
Conditional Expression(17)DN3 = 1.300

Figure 4C:
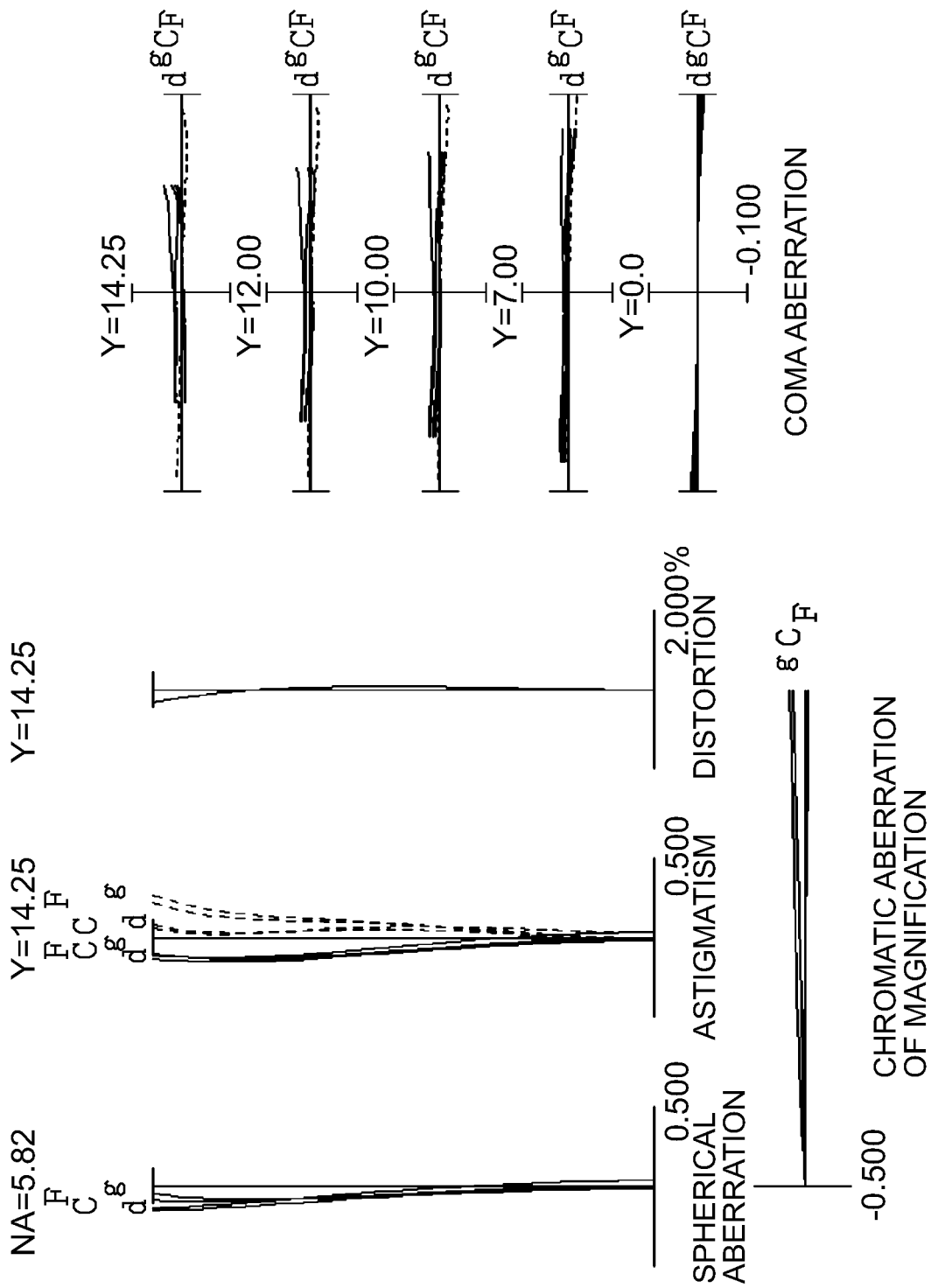

FIG. 4A shows various aberration graphs of the optical system according to Second Example upon focusing on infinity in the wide angle end state. FIG. 4B shows various aberration graphs of the optical system according to Second Example upon focusing on infinity in the intermediate focal length state. FIG. 4C shows various aberration graphs of the optical system according to Second Example upon focusing on infinity in the telephoto end state. The various aberration graphs show that the optical system according to Second Example has favorably corrected various aberrations, and exerts excellent imaging performance.

Third Example

Figure 5:
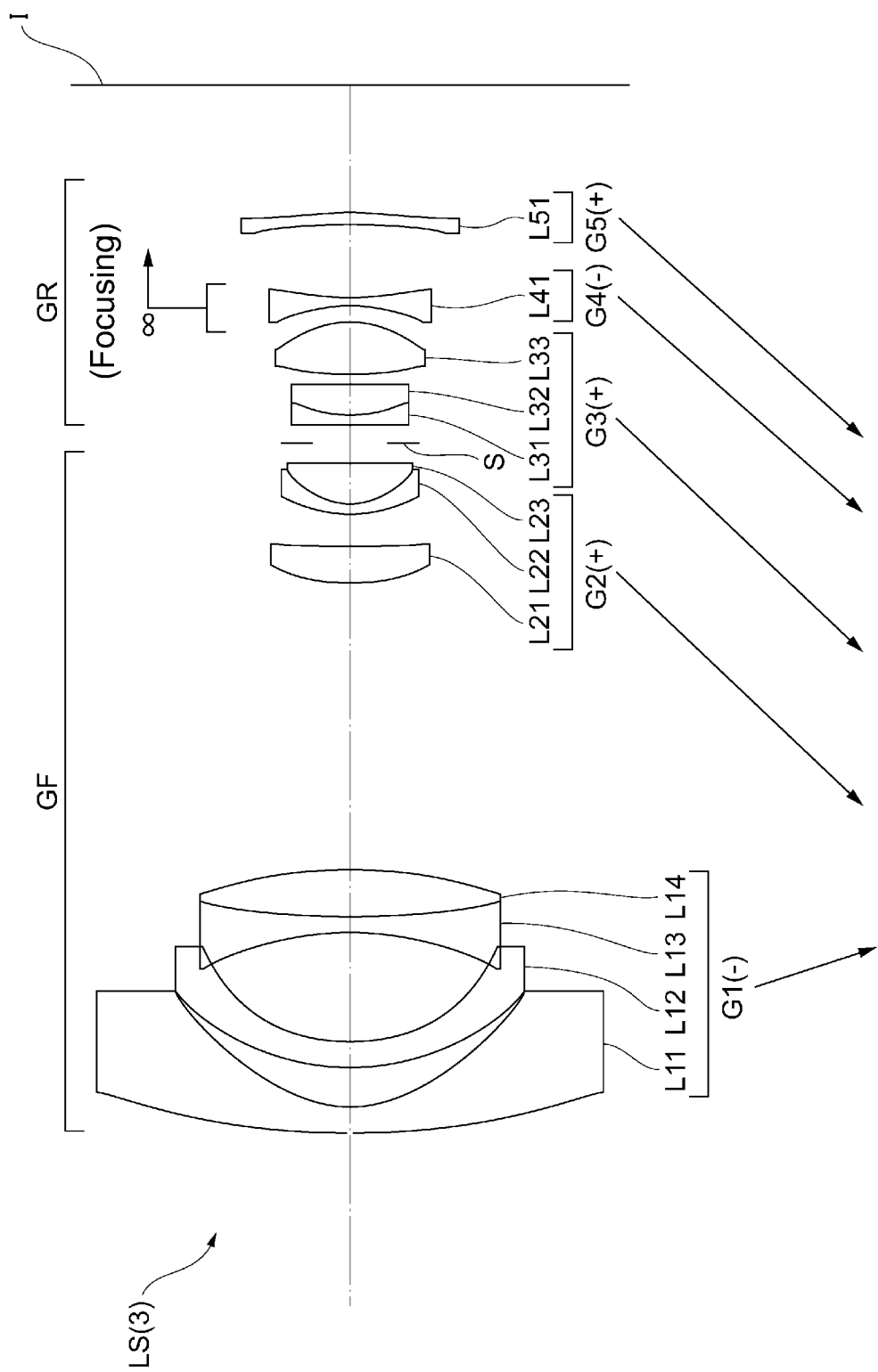
FIG. 5 is a lens configuration diagram of an optical system in a state upon focusing on infinity according to Third Example.

Third Example is described with reference to FIGS. 5 and 6A, 6B and 6C and Table 3. FIG. 5 is a diagram showing a lens configuration of an optical system (zoom optical system) in a state upon focusing on infinity according to Third Example. The optical system LS(3) according to Third Example consists of, in order from the object: a first lens group G1 having a negative refractive power; a second lens group G2 having a positive refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 5. The aperture stop S is disposed between the second lens group G2 and the third lens group G3.

The first lens group G1 consists of, in order from the object: a negative meniscus lens L11 having a convex surface facing the object; a negative meniscus lens L12 having a convex surface facing the object; a biconcave negative lens L13; and a biconvex positive lens L14. In this Example, the negative meniscus lens L11, the negative meniscus lens L12 and the negative lens L13 of the first lens group G1 correspond to a negative lens that satisfies the conditional expressions (1) to (4) and the like. In this Example, the first lens group G1 corresponds to the object-side negative lens group, and the negative meniscus lens L11, the negative meniscus lens L12 and the negative lens L13 of the first lens group G1 correspond to a negative lens that satisfies the conditional expressions (11) to (14) and the like. The negative meniscus lens L11 has an image-side lens surface that is an aspherical surface. The negative meniscus lens L12 has an image-side lens surface that is an aspherical surface.

The second lens group G2 consists of, in order from the object: a positive meniscus lens L21 having a convex surface facing the object; and a cemented lens consisting of a negative meniscus lens L22 having a convex surface facing the object, and a positive meniscus lens L23 having a convex surface facing the object. The aperture stop S is disposed adjacent to the image side of the positive meniscus lens L23, and moves with the second lens group G2 upon zooming.

The third lens group G3 consists of, in order from the object: a cemented lens consisting of a biconcave negative lens L31 and a biconvex positive lens L32; and a biconvex positive lens L33. The positive lens L32 has an image-side lens surface that is an aspherical surface.

The fourth lens group G4 consists of a biconcave negative lens L41. Upon focusing from the infinity object to the short-distant (finite distant) object, the fourth lens group G4 moves toward the image along the optical axis.

The fifth lens group G5 consists of a positive meniscus lens L51 having a concave surface facing the object. An image surface I is disposed on the image side of the fifth lens group G5. The positive meniscus lens L51 has an image-side lens surface that is an aspherical surface.

In this Example, the negative meniscus lens L11, the negative meniscus lens L12, the negative lens L13, the positive lens L14, the positive meniscus lens L21, and the cemented lens consisting of the negative meniscus lens L22 and the positive meniscus lens L23 constitute the front group GF disposed closer to the object than the aperture stop S. The cemented lens consisting of the negative lens L31 and the positive lens L32, the positive lens L33, the negative lens L41, and the positive meniscus lens L51 constitute the rear group GR disposed closer to the image than the aperture stop S.

The following Table 3 lists values of data on the optical system according to Third Example.

TABLE 3

[General Data]
Zooming ratio = 2.018

|  | W | M | T |
|---|---|---|---|
| f | 14.420 | 20.000 | 29.100 |
| FNO | 4.073 | 4.072 | 4.066 |
| 2ω | 115.788 | 91.602 | 67.988 |
| Y | 20.500 | 20.500 | 20.500 |
| TL | 121.803 | 110.314 | 103.827 |
| BF | 15.000 | 23.093 | 30.403 |
| fF | 12.336 | 18.020 | 29.688 |
| fR | −249.182 | −357.800 | −1948.200 |

[Lens Data]

| Surface Number | R | D | nd | νd | θgF |
|---|---|---|---|---|---|
| 1 | 92.62990 | 3.000 | 1.68348 | 54.80 | 0.5501 |
| 2* | 15.67070 | 4.579 |  |  |  |
| 3 | 28.37140 | 2.900 | 1.68348 | 54.80 | 0.5501 |
| 4* | 21.12170 | 12.704 |  |  |  |
| 5 | −37.55490 | 1.900 | 1.68348 | 54.80 | 0.5501 |
| 6 | 88.75380 | 0.100 |  |  |  |
| 7 | 98.47090 | 5.412 | 1.86109 | 34.82 | 0.5864 |
| 8 | −53.58090 | D8(Variable) |  |  |  |
| 9 | 20.49420 | 4.232 | 1.59349 | 67.00 | 0.5358 |
| 10 | 164.24190 | 3.859 |  |  |  |
| 11 | 16.69960 | 1.200 | 1.88300 | 40.66 | 0.5668 |
| 12 | 8.68950 | 4.536 | 1.52748 | 56.00 | 0.5481 |
| 13 | 180.51560 | 2.500 |  |  |  |
| 14 | ∞ | D14(Variable) |  | (Aperture Stop S) |  |
| 15 | −357.35260 | 1.100 | 1.81600 | 46.59 | 0.5567 |
| 16 | 14.59730 | 3.507 | 1.49782 | 82.57 | 0.5386 |
| 17* | −561.45740 | 1.192 |  |  |  |
| 18 | 36.97580 | 6.029 | 1.49782 | 82.57 | 0.5386 |
| 19 | −12.85510 | D19(Variable) |  |  |  |
| 20 | −20.05630 | 1.000 | 1.55199 | 62.60 | 0.5377 |
| 21 | 48.74520 | D21(Variable) |  |  |  |
| 22 | −64.12910 | 1.200 | 1.51680 | 63.88 | 0.5360 |
| 23* | −53.18510 | BF |  |  |  |

[Aspherical Surface Data]

2nd Surface

κ = 0.000, A4 = −9.16E-07, A6 = 3.00E-08
A8 = −1.16E-10, A10 = 1.53E-13, A12 = 0.00E+00

4th Surface

κ = 0.000, A4 = 3.15E-05, A6 = −2.15E-08
A8 = 4.46E-10, A10 = −1.10E-12, A12 = 2.22E-15

17th Surface

κ = 1.000, A4 = 5.91E-05, A6 = 1.04E-07
A8 = 3.02E-09, A10 = −4.09E-11, A12 = 0.00E+00

23rd Surface

κ = 1.000, A4 = 3.06E-05, A6 = 2.73E-08
A8 = −4.72E-11, A10 = 7.08E-13, A12 = 0.00E+00

[Variable distance data on zoom photographing]

|  | W | M | T |
|---|---|---|---|
| D8 | 33.229 | 16.105 | 1.500 |
| D14 | 2.125 | 2.115 | 2.279 |
| D19 | 2.000 | 2.982 | 4.774 |
| D21 | 8.500 | 5.069 | 3.922 |

TABLE 3-continued

[Lens Group Data]

| Group | First surface | Focal length |
|---|---|---|
| G1 | 1 | −23.700 |
| G2 | 9 | 28.300 |
| G3 | 15 | 28.700 |
| G4 | 20 | −25.600 |
| G5 | 22 | 581.300 |

[Conditional Expression Corresponding Value]

<Negative meniscus lens L11(fN1 = −28.041)>

Conditional Expression(1)
ndN1 − (2.015 − 0.0068 × νdN1) = 0.041
Conditional Expression(2)νdN1 = 54.80
Conditional Expression(3), (3-1)θgFN1 = 0.5501
Conditional Expression(4), (4-1)
θgFN1 − (0.6418 − 0.00168 × νdN1) = 0.0004
Conditional Expression(5)(−fN1)/fF = 2.273
Conditional Expression(6)(−fN1)/f = 1.945
Conditional Expression(7)DN1 = 3.000

<Negative meniscus lens L12(fN1 = −144.389)>

Conditional Expression(1)
ndN1 − (2.015 − 0.0068 × νdN1) = 0.041
Conditional Expression(2)νdN1 = 54.80
Conditional Expression(3), (3-1)θgFN1 = 0.5501
Conditional Expression(4), (4-1)
θgFN1 − (0.6418 − 0.00168 × νdN1) = 0.0004
Conditional Expression(5)(−fN1)/fF = 11.705
Conditional Expression(6)(−fN1)/f = 10.013
Conditional Expression(7)DN1 = 2.900

<Negative lens L13(fN1 = −38.375)>

Conditional Expression(1)
ndN1 − (2.015 − 0.0068 × νdN1) = 0.041
Conditional Expression(2)νdN1 = 54.80
Conditional Expression(3), (3-1)θgFN1 = 0.5501
Conditional Expression(4), (4-1)
θgFN1 − (0.6418 − 0.00168 × νdN1) = 0.0004
Conditional Expression(5)(−fN1)/fF = 3.111
Conditional Expression(6)(−fN1)/f = 2.661
Conditional Expression(7)DN1 = 1.900

<Negative meniscus lens L11(fN3 = −28.041)>

Conditional Expression(11)
ndN3 − (2.015 − 0.0068 × νdN3) = 0.041
Conditional Expression(12)νdN3 = 54.80
Conditional Expression(13), (13-1)θgFN3 = 0.5501
Conditional Expression(14), (14-1)
θgFN1 − (0.6418 − 0.00168 × νdN3) = 0.0004
Conditional Expression(15)fN3/fGa = 1.183
Conditional Expression(16)(−fGa)/f = 1.644
Conditional Expression(17)DN3 = 3.000

<Negative meniscus lens L12(fN3 = −144.389)>

Conditional Expression(11)
ndN3 − (2.015 − 0.0068 × νdN3) = 0.041
Conditional Expression(12)νdN3 = 54.80
Conditional Expression(13), (13-1)θgFN3 = 0.5501
Conditional Expression(14), (14-1)
θgFN1 − (0.6418 − 0.00168 × νdN3) = 0.0004
Conditional Expression(15)fN3/fGa = 6.092
Conditional Expression(16)(−fGa)/f = 1.644
Conditional Expression(17)DN3 = 2.900

<Negative lens L13(fN3 = −38.375)>

Conditional Expression(11)
ndN3 − (2.015 − 0.0068 × νdN3) = 0.041
Conditional Expression(12)νdN3 = 54.80
Conditional Expression(13), (13-1)θgFN3 = 0.5501
Conditional Expression(14), (14-1)
θgFN1 − (0.6418 − 0.00168 × νdN3) = 0.0004
Conditional Expression(15)fN3/fGa = 1.619
Conditional Expression(16)(−fGa)/f = 1.644
Conditional Expression(17)DN3 = 1.900

FIG. 6A shows various aberration graphs of the optical system according to Third Example upon focusing on infinity in the wide angle end state. FIG. 6B shows various aberration graphs of the optical system according to Third Example upon focusing on infinity in the intermediate focal length state. FIG. 6C shows various aberration graphs of the optical system according to Third Example upon focusing on infinity in the telephoto end state. The various aberration graphs show that the optical system according to Third Example has favorably corrected various aberrations, and exerts excellent imaging performance.

Fourth Example

Fourth Example is described with reference to FIGS. 7 and 8A, 8B and 8C and Table 4. FIG. 7 is a diagram showing a lens configuration of an optical system (zoom optical system) in a state upon focusing on infinity according to Fourth Example. The optical system LS(4) according to Fourth Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 7. The aperture stop S is disposed in the third lens group G3.

The first lens group G1 consists of, in order from the object: a cemented lens consisting of a negative meniscus lens L11 having a convex surface facing the object, and a biconvex positive lens L22; and a positive meniscus lens L13 having a convex surface facing the object.

The second lens group G2 consists of, in order from the object: a negative meniscus lens L21 having a convex surface facing the object; biconcave negative lens L22; a biconvex positive lens L23; and a negative meniscus lens L24 having a concave surface facing the object. Upon focusing from the infinity object to the short-distant (finite distant) object, the second lens group G2 moves toward the object along the optical axis. In this Example, the negative lens L22 and the negative meniscus lens L24 of the second lens group G2 correspond to a negative lens that satisfies the conditional expressions (1) to (4) and the like. In this Example, the second lens group G2 corresponds to an object-side negative lens group, and the negative lens L22 and the negative meniscus lens L24 of the second lens group G2 correspond to a negative lens that satisfies the conditional expressions (11) to (14) and the like. The negative meniscus lens L21 has an object-side lens surface that is an aspherical surface. The negative meniscus lens L24 has an image-side lens surface that is an aspherical surface.

The third lens group G3 consists of, in order from the object: a biconvex positive lens L31; a cemented lens consisting of a negative meniscus lens L32 having a convex surface facing the object, and a biconvex positive lens L33; and a biconvex positive lens L34. An aperture stop S is disposed between the positive lens L31 and the negative meniscus lens L32 (of the cemented lens) of the third lens group G3.

The fourth lens group G4 consists of, in order from the object: a cemented lens consisting of a positive meniscus lens L41 having a concave surface facing the object, and a negative meniscus lens L42 having a concave surface facing the object; and a biconcave negative lens L43.

The fifth lens group G5 consists of, in order from the object: a biconvex positive lens L51; and a cemented lens consisting of a biconvex positive lens L52, and a biconcave negative lens L53. An image surface I is disposed on the image side of the fifth lens group G5. The positive lens L51 has an object-side lens surface that is an aspherical surface.

In this Example, the cemented lens consisting of the negative meniscus lens L11 and the positive lens L22, the positive meniscus lens L13, the negative meniscus lens L21, the negative lens L22, the positive lens L23, the negative meniscus lens L24, and the positive lens L31 constitute the front group GF disposed closer to the object than the aperture stop S. The cemented lens consisting of the negative meniscus lens L32 and the positive lens L33, the positive lens L34, the cemented lens consisting of the positive meniscus lens L41 and the negative meniscus lens L42, the negative lens L43, the positive lens L51, and the cemented lens consisting of the positive lens L52 and the negative lens L53 constitute the rear group GR disposed closer to the image than the aperture stop S.

The following Table 4 lists values of data on the optical system according to Fourth Example.

TABLE 4

| [General Data] | | | |
|---|---|---|---|
| Zooming ratio = 4.708 | | | |
| | W | M | T |
| f | 24.721 | 50.047 | 116.396 |
| FNO | 4.061 | 4.089 | 4.154 |
| 2ω | 86.421 | 43.929 | 19.678 |
| Y | 21.600 | 21.600 | 21.600 |
| TL | 147.200 | 161.419 | 192.191 |
| BF | 32.363 | 42.319 | 54.282 |
| fF | 130.487 | −421.097 | −283.255 |
| fR | 64.879 | 65.108 | 63.558 |

| [Lens Data] | | | | | |
|---|---|---|---|---|---|
| Surface Number | R | D | nd | vd | θgF |
| 1 | 200.00000 | 1.200 | 1.80090 | 23.50 | 0.6172 |
| 2 | 104.14190 | 7.444 | 1.49782 | 82.57 | 0.5138 |
| 3 | −307.28020 | 0.100 | | | |
| 4 | 57.34930 | 5.648 | 1.59593 | 53.79 | 0.5519 |
| 5 | 128.95340 | D5(Variable) | | | |
| 6* | 71.49190 | 1.050 | 1.90795 | 33.46 | 0.5892 |
| 7 | 17.08640 | 6.423 | | | |
| 8 | −51.62780 | 1.200 | 1.68348 | 54.80 | 0.5501 |
| 9 | 41.08490 | 0.100 | | | |
| 10 | 39.55730 | 6.320 | 1.85168 | 23.41 | 0.6176 |
| 11 | −44.35580 | 0.786 | | | |
| 12 | −28.66820 | 1.200 | 1.68348 | 54.80 | 0.5501 |
| 13* | −263.12090 | D13(Variable) | | | |
| 14 | 43.24040 | 3.754 | 1.61063 | 51.59 | 0.5558 |
| 15 | −90.35860 | 0.100 | | | |
| 16 | ∞ | 0.100 | (Aperture Stop S) | | |
| 17 | 39.53750 | 1.200 | 1.93504 | 24.35 | 0.6140 |
| 18 | 18.91420 | 5.342 | 1.49801 | 82.47 | 0.5140 |
| 19 | −147.86550 | 0.100 | | | |
| 20 | 48.40300 | 2.948 | 1.59761 | 53.52 | 0.5524 |
| 21 | −295.39370 | D21(Variable) | | | |
| 22 | −35.36590 | 3.889 | 1.92286 | 20.88 | 0.6287 |
| 23 | 18.36590 | 1.200 | 1.67449 | 44.60 | 0.5682 |
| 24 | −175.62470 | 2.444 | | | |
| 25 | −58.08520 | 1.200 | 1.69893 | 42.67 | 0.5717 |
| 26 | 870.88710 | D26(Variable) | | | |
| 27* | 157.96590 | 5.992 | 1.49782 | 82.57 | 0.5138 |
| 28 | −24.48700 | 0.100 | | | |

TABLE 4-continued

| 29 | 65.91830 | 7.455 | 1.69249 | 43.15 | 0.5709 |
|---|---|---|---|---|---|
| 30 | −25.49740 | 5.017 | 1.88686 | 29.29 | 0.5989 |
| 31 | 75.48320 | BF | | | |

[Aspherical Surface Data]

6th Surface k = 1.000, A4 = −2.91E−06, A6 = −1.03E−08
A8 = 2.57E−11, A10 = −6.80E−14, A12 = 0.00E+00
13th Surface κ = 1.000, A4 = −1.06E−05, A6 = −1.03E−08
A8 = −3.07E−11, A10 = 0.00E+00, A12 = 0.00E+00
27th Surface κ = 1.000, A4−1.53E−05, A6 = 9.72E−09
A8 = −2.61E−11, A10 = 3.55E−14, A12 = 0.00E+00

[Variable distance data on zoom photographing]

| | W | M | T |
|---|---|---|---|
| D5 | 1.500 | 19.695 | 47.327 |
| D13 | 24.246 | 10.310 | 1.500 |
| D21 | 2.853 | 9.990 | 14.771 |
| D26 | 13.928 | 6.794 | 2.000 |

[Lens Group Data]

| Group | First surface | Focal length |
|---|---|---|
| G1 | 1 | 115.700 |
| G2 | 6 | −18.700 |
| G3 | 14 | 27.100 |
| G4 | 22 | −46.200 |
| G5 | 27 | 54.900 |

[Conditional Expression Corresponding Value]

<Negative lens L22(fN1 = −33.299)>

Conditional Expression(1)
ndN1 − (2.015 − 0.0068 × vdN1) = 0.041
Conditional Expression(2)vdN1 = 54.80
Conditional Expression(3), (3-1)θgFN1 = 0.5501
Conditional Expression(4), (4-1)
θgFN1 − (0.6418 − 0.00168 × vdN1) = 0.0004
Conditional Expression(5)(−fN1)/fF = 0.255
Conditional Expression(6)(−fN1)/f = 1.347
Conditional Expression(7)DN1 = 1.200
<Negative meniscus lens L24(fN1 = −47.172)>

Conditional Expression(1)
ndN1 − (2.015 − 0.0068 × vdN1) = 0.041
Conditional Expression(2)vdN1 = 54.80
Conditional Expression(3), (3-1)θgFN1 = 0.5501
Conditional Expression(4), (4-1)
θgFN1 − (0.6418 − 0.00168 × vdN1) = 0.0004
Conditional Expression(5)(−fN1)/fF = 0.362
Conditional Expression(6)(−fN1)/f = 1.908
Conditional Expression(7)DN1 = 1.200
<Negative lens L22(fN3 = −33.299)>

Conditional Expression(11)
ndN3 − (2.015 − 0.0068 × vdN3) = 0.041
Conditional Expression(12)vdN3 = 54.80
Conditional Expression(13), (13-1)θgFN3 = 0.5501
Conditional Expression(14), (14-1)
θgFN1 − (0.6418− 0.00168 × vdN3) = 0.0004
Conditional Expression(15)fN3/fGa = 1.781
Conditional Expression(16)(−fGa)/f = 0.756
Conditional Expression(17)DN3 = 1.200
<Negative meniscus lens L24(fN3 = −47.172)>

Conditional Expression(11)
ndN3 − (2.015 − 0.0068 × vdN3) = 0.041
Conditional Expression(12)vdN3 = 54.80
Conditional Expression(13), (13-1)θgFN3 = 0.5501
Conditional Expression(14), (14-1)

TABLE 4-continued

θgFN1 − (0.6418 − 0.00168 × vdN3) = 0.0004
Conditional Expression(15)fN3/fGa = 2.523
Conditional Expression(16)(−fGa)/f = 0.756
Conditional Expression(17)DN3 = 1.200

Figure 8A:
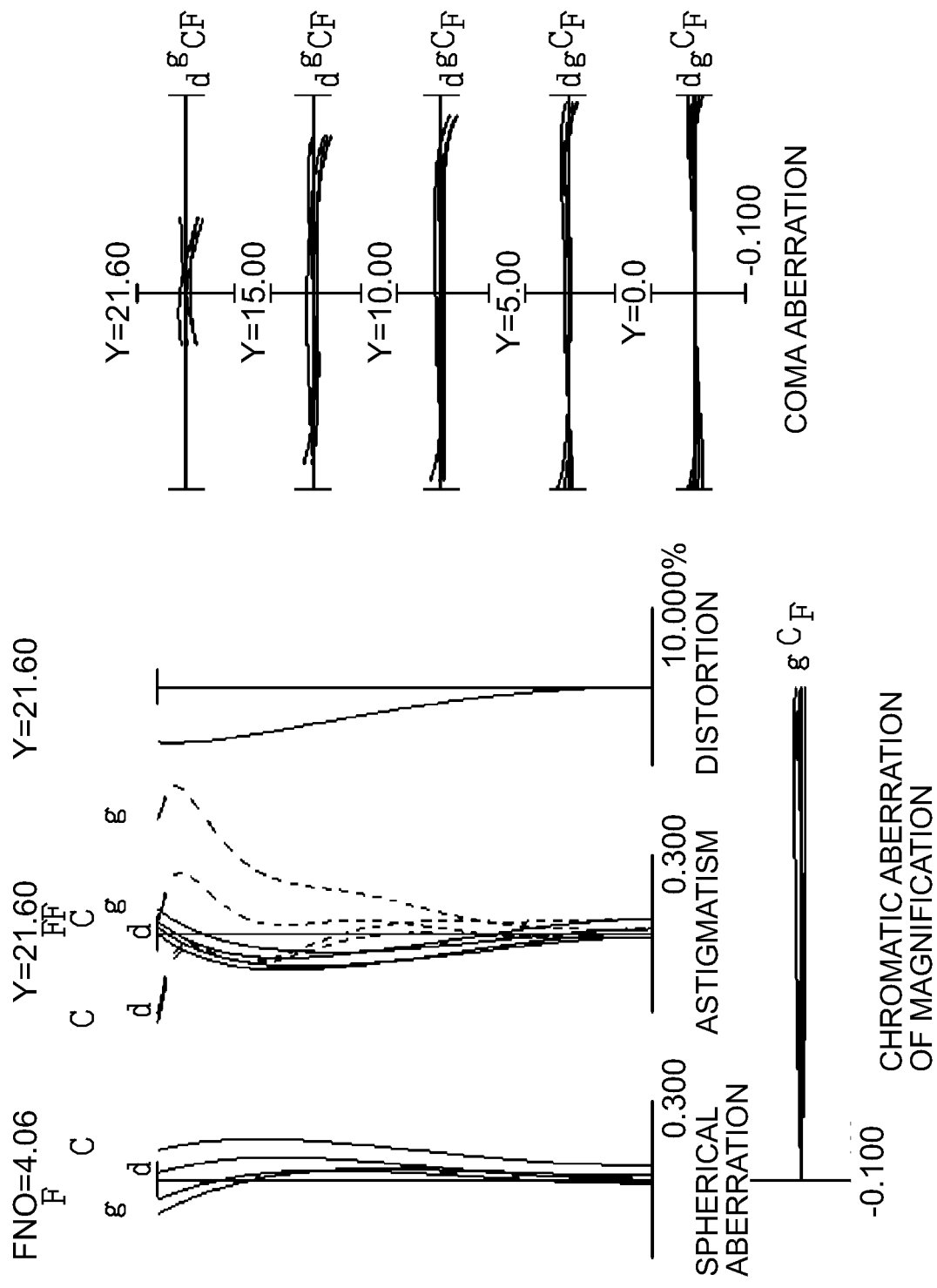

FIG. 8A shows various aberration graphs of the optical system according to Fourth Example upon focusing on infinity in the wide angle end state. FIG. 8B shows various aberration graphs of the optical system according to Fourth Example upon focusing on infinity in the intermediate focal length state. FIG. 8C shows various aberration graphs of the optical system according to Fourth Example upon focusing on infinity in the telephoto end state. The various aberration graphs show that the optical system according to Fourth Example has favorably corrected various aberrations, and exerts excellent imaging performance.

Fifth Example

Fifth Example is described with reference to FIGS. 9 and 10A, 10B and 10C and Table 5. FIG. 9 is a diagram showing a lens configuration of an optical system (zoom optical system) in a state upon focusing on infinity according to Fifth Example. The optical system LS(5) according to Fifth Example consists of, in order from the object: a first lens group G1 having a positive refractive power; a second lens group G2 having a negative refractive power; a third lens group G3 having a positive refractive power; a fourth lens group G4 having a positive refractive power; and a fifth lens group G5 having a negative refractive power. Upon zooming from the wide-angle end state (W) to the telephoto end state (T), the second lens groups G2 and the fourth lens group G4 move in directions indicated by arrows in FIG. 9. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a positive meniscus lens L23 having a convex surface facing the object; and a biconcave negative lens L24. In this Example, the negative meniscus lens L21, the negative lens L22 and the negative lens L24 of the second lens group G2 correspond to a negative lens that satisfies the conditional expressions (1) to (4) and the like. In this Example, the second lens group G2 corresponds to the object-side negative lens group, and the negative meniscus lens L21, the negative lens L22 and the negative lens L24 of the second lens group G2 correspond to a negative lens that satisfies the conditional expressions (11) to (14) and the like.

The third lens group G3 consists of, in order from the object: a biconvex positive lens L31; a plano-convex positive lens L32 having a convex surface facing the object; a positive meniscus lens L33 having a convex surface facing the object; a biconcave negative lens L34; and a cemented lens consisting of a biconvex positive lens L35, and a biconcave negative lens L36. The aperture stop S is disposed adjacent to the object side of the positive lens L31, and moves with the third lens group G3 upon zooming.

The fourth lens group G4 consists of, in order from the object: a biconvex positive lens L41; and a cemented lens consisting of a negative meniscus lens L42 having a convex surface facing the object, and a positive meniscus lens L43 having a convex surface facing the object. Upon focusing from the infinity object to the short-distant (finite distant) object, the fourth lens group G4 moves toward the object along the optical axis.

The fifth lens group G5 consists of, in order from the object: a negative meniscus lens L51 having a convex surface facing the object; a cemented lens consisting of a biconvex positive lens L52, and a biconcave negative lens L53; a plano-concave negative lens L54 having a concave surface facing the image; a biconvex positive lens L55; and a positive meniscus lens L56 having a convex surface facing the object. An image surface I is disposed on the image side of the fifth lens group G5. The cemented lens consisting of the positive lens L52 and the negative lens L53, and the negative lens L54 of the fifth lens group G5 constitute a vibration-proof lens group (partial group) that is movable in a direction perpendicular to the optical axis, and corrects variation in imaging position due to a camera shake and the like (image blur on the image surface I).

In this Example, the cemented lens consisting of the negative meniscus lens L11 and the positive lens L12, the positive meniscus lens L13, the negative meniscus lens L21, the negative lens L22, the positive meniscus lens L23, and the negative lens L24 constitute the front group GF disposed closer to the object than the aperture stop S. The positive lens L31, the positive lens L32, the positive meniscus lens L33, the negative lens L34, the cemented lens consisting of the positive lens L35 and the negative lens L36, the positive lens L41, the cemented lens consisting of the negative meniscus lens L42 and the positive meniscus lens L43, the negative meniscus lens L51, the cemented lens consisting of the positive lens L52 and the negative meniscus lens L53, the negative lens L54, the positive lens L55, and the positive meniscus lens L56 constitute the rear group GR disposed closer to the image than the aperture stop S.

The following Table 5 lists values of data on the optical system according to Fifth Example.

TABLE 5

[General Data]
Zooming ratio = 2.745

|     | W | M | T |
|---|---|---|---|
| f | 71.400 | 140.000 | 196.000 |
| FNO | 2.865 | 2.937 | 2.862 |
| 2ω | 33.666 | 17.094 | 12.198 |
| Y | 21.600 | 21.600 | 21.600 |
| TL | 245.880 | 245.880 | 245.880 |
| BF | 53.818 | 53.818 | 53.818 |
| fF | −86.769 | −153.380 | −238.187 |
| fR | 67.044 | 63.889 | 67.044 |

[Lens Data]

| Surface Number | R | D | nd | vd | θgF |
|---|---|---|---|---|---|
| 1 | 120.99680 | 2.800 | 1.95000 | 29.37 | 0.6002 |
| 2 | 87.12840 | 9.900 | 1.49782 | 82.57 | 0.5386 |
| 3 | −1437.70340 | 0.100 | | | |
| 4 | 97.36390 | 7.700 | 1.45600 | 91.37 | 0.5342 |
| 5 | 657.25840 | D5(Variable) | | | |
| 6 | 73.32110 | 2.400 | 1.68348 | 54.80 | 0.5501 |
| 7 | 33.43260 | 10.250 | | | |
| 8 | −134.27600 | 2.000 | 1.62731 | 59.30 | 0.5584 |
| 9 | 104.31770 | 2.000 | | | |
| 10 | 55.93640 | 4.400 | 1.84666 | 23.78 | 0.6192 |
| 11 | 193.35670 | 3.550 | | | |

TABLE 5-continued

| 12 | −72.87930 | 2.200 | 1.62731 | 59.30 | 0.5584 |
|---|---|---|---|---|---|
| 13 | 610.02530 | D13(Variable) | | | |
| 14 | ∞ | 2.500 | | (Aperture Stop S) | |
| 15 | 667.50610 | 3.700 | 1.83481 | 42.73 | 0.5648 |
| 16 | −127.34870 | 0.200 | | | |
| 17 | 91.74030 | 3.850 | 1.59319 | 67.90 | 0.5440 |
| 18 | ∞ | 0.200 | | | |
| 19 | 52.70200 | 4.900 | 1.49782 | 82.57 | 0.5386 |
| 20 | 340.98300 | 2.120 | | | |
| 21 | −123.54810 | 2.200 | 2.00100 | 29.13 | 0.5995 |
| 22 | 172.97240 | 4.550 | | | |
| 23 | 104.97670 | 5.750 | 1.90265 | 35.72 | 0.5804 |
| 24 | −70.95230 | 2.200 | 1.58144 | 40.98 | 0.5763 |
| 25 | 42.96180 | D25(Variable) | | | |
| 26 | 69.69710 | 4.800 | 1.49782 | 82.57 | 0.5386 |
| 27 | −171.29750 | 0.100 | | | |
| 28 | 43.33010 | 2.000 | 1.95000 | 29.37 | 0.6002 |
| 29 | 28.62160 | 5.550 | 1.59319 | 67.90 | 0.5440 |
| 30 | 175.11530 | D30(Variable) | | | |
| 31 | 59.19620 | 1.800 | 1.80400 | 46.60 | 0.5575 |
| 32 | 33.42540 | 5.150 | | | |
| 33 | 127.38170 | 3.350 | 1.84666 | 23.78 | 0.6192 |
| 34 | −127.38220 | 1.600 | 1.68348 | 54.80 | 0.5501 |
| 35 | 43.09820 | 2.539 | | | |
| 36 | ∞ | 1.600 | 1.95375 | 32.32 | 0.5901 |
| 37 | 71.19380 | 3.750 | | | |
| 38 | 107.03200 | 3.850 | 1.59319 | 67.90 | 0.5440 |
| 39 | −166.05150 | 0.150 | | | |
| 40 | 49.83700 | 3.900 | 1.71999 | 50.27 | 0.5527 |
| 41 | 161.11230 | BF | | | |

[Variable distance data on zoom photographing]

|     | W | M | T |
|---|---|---|---|
| D5 | 2.882 | 35.671 | 50.879 |
| D13 | 50.300 | 17.511 | 2.303 |
| D25 | 17.270 | 14.466 | 17.270 |
| D30 | 2.000 | 4.804 | 2.000 |

[Lens Group Data]

| Group | First surface | Focal length |
|---|---|---|
| G1 | 1 | 143.763 |
| G2 | 6 | −45.569 |
| G3 | 14 | 90.760 |
| G4 | 26 | 60.061 |
| G5 | 31 | −112.026 |

[Conditional Expression Corresponding Value]

<Negative meniscus lens L21(fN1 = −92.166)>

Conditional Expression(1)
ndN1 − (2.015 − 0.0068 × vdN1) = 0.041
Conditional Expression(2)vdN1 = 54.80
Conditional Expression(3), (3-1)θgFN1 = 0.5501
Conditional Expression(4), (4-1)
θgFN1 − (0.6418 − 0.00168 × vdN1) = 0.0004
Conditional Expression(5)(−fN1)/fF = −1.062
Conditional Expression(6)(−fN1)/f = 1.291
Conditional Expression(7)DN1 = 2.400
<Negative lens L22 (fN1 = −93.285)>

Conditional Expression(1)
ndN1 − (2.015 − 0.0068 × vdN1) = 0.016
Conditional Expression(2)vdN1 = 59.30
Conditional Expression(3), (3-1)θgFN1 = 0.5584
Conditional Expression(4), (4-1)
θgFN1 − (0.6418 − 0.00168 × vdN1) = 0.0162
Conditional Expression(5)(−fN1)/fF = −1.075
Conditional Expression(6)(−fN1)/f = 1.307
Conditional Expression(7)DN1 = 2.000
<Negative lens L24(fN1 = −103.650)>

Conditional Expression(1)
ndN1 − (2.015 − 0.0068 × vdN1) = 0.016
Conditional Expression(2)vdN1 = 59.30

TABLE 5-continued

Conditional Expression(3), (3-1)θgFN1 = 0.5584
Conditional Expression(4), (4-1)
θgFN1 − (0.6418 − 0.00168 × vdN1) = 0.0162
Conditional Expression(5)(−fN1)/fF = −1.195
Conditional Expression(6)(−fN1)/f = 1.452
Conditional Expression(7)DN1 = 2.200
<Negative meniscus lens L21(fN3 = −92.166)>

Conditional Expression(11)
ndN3 − (2.015 − 0.0068 × vdN3) = 0.041
Conditional Expression(12)vdN3 = 54.80
Conditional Expression(13), (13-1)θgFN3 = 0.5501
Conditional Expression(14), (14-1)
θgFN1 − (0.6418 − 0.00168 × vdN3) = 0.0004
Conditional Expression(15)fN3/fGa = 2.023
Conditional Expression(16)(−fGa)/f = 0.638
Conditional Expression(17)DN3 = 2.400
<Negative lens L22(fN3 = −93.285)>

Conditional Expression(11)
ndN3 − (2.015 − 0.0068 × vdN3) = 0.016
Conditional Expression(12)vdN3 = 59.30
Conditional Expression(13), (13-1)θgFN3 = 0.5584
Conditional Expression(14), (14-1)
θgFN1 − (0.6418 − 0.00168 × vdN3) = 0.0162
Conditional Expression(15)fN3/fGa = 2.047
Conditional Expression(16)(−fGa)/f = 0.638
Conditional Expression(17)DN3 = 2.000
<Negative lens L24(fN3 = −103.650)>

Conditional Expression(11)
ndN3 − (2.015 − 0.0068 × vdN3) = 0.016
Conditional Expression(12)vdN3 = 59.30
Conditional Expression(13), (13-1)θgFN3 = 0.5584
Conditional Expression(14), (14-1)
θgFN1 − (0.6418 − 0.00168 × vdN3) = 0.0162
Conditional Expression(15)fN3/fGa = 2.274
Conditional Expression(16)(−fGa)/f = 0.638
Conditional Expression(17)DN3 = 2.200

Figure 10A:
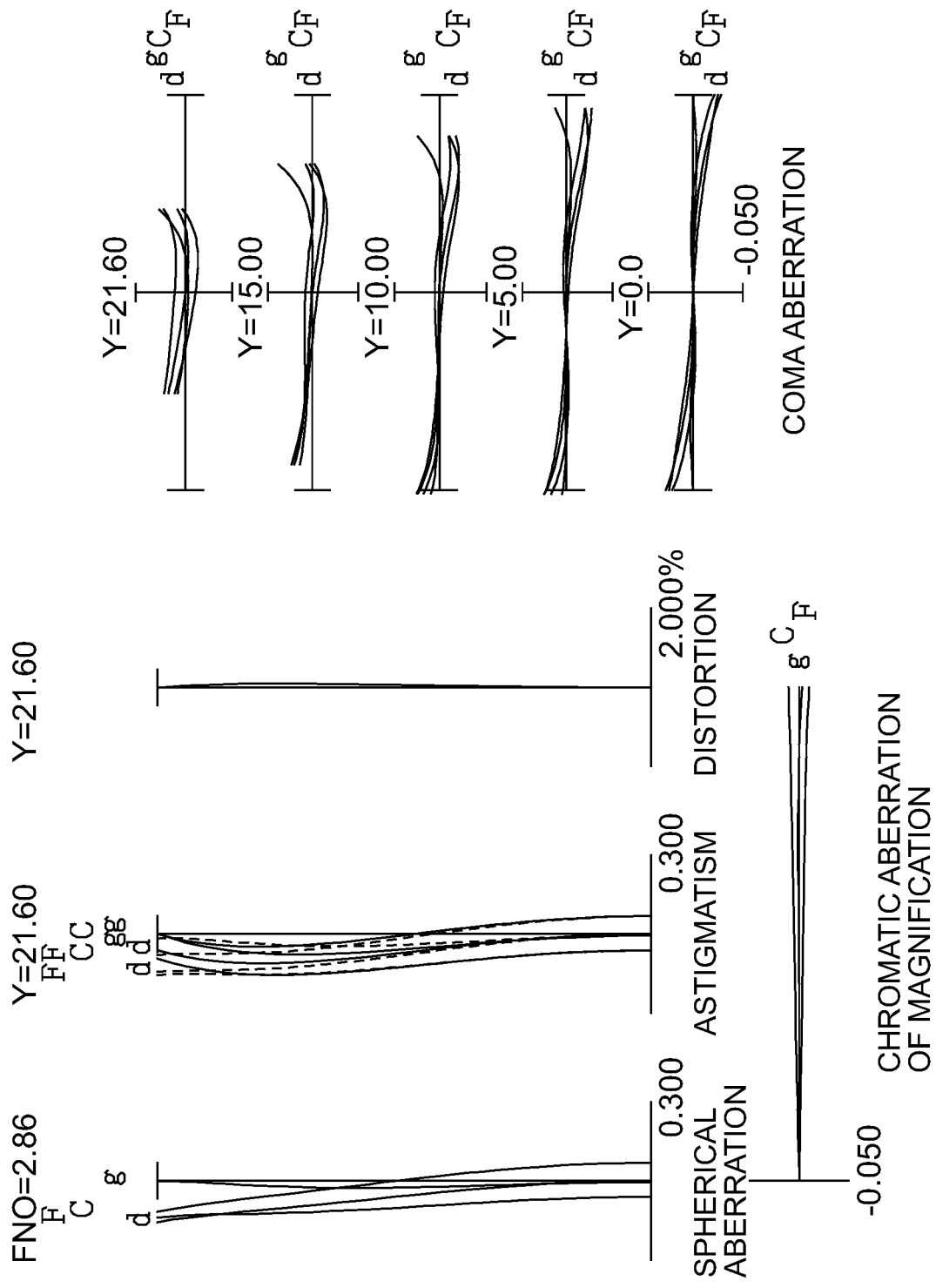

FIG. 10A shows various aberration graphs of the optical system according to Fifth Example upon focusing on infinity in the wide angle end state. FIG. 10B shows various aberration graphs of the optical system according to Fifth Example upon focusing on infinity in the intermediate focal length state. FIG. 10C shows various aberration graphs of the optical system according to Fifth Example upon focusing on infinity in the telephoto end state. The various aberration graphs show that the optical system according to Fifth Example has favorably corrected various aberrations, and exerts excellent imaging performance.

Sixth Example

Sixth Example is described with reference to FIGS. 11 and 12A, 12B and 12C and Table 6. FIG. 11 is a diagram showing a lens configuration of an optical system (zoom optical system) in a state upon focusing on infinity according to Sixth Example. The optical system LS(6) according to Sixth Example consists of, in order from the object: a first lens group G1 having a positive refractive power; a second lens group G2 having a negative refractive power; a third lens group G3 having a positive refractive power; a fourth lens group G4 having a positive refractive power; and a fifth lens group G5 having a negative refractive power. Upon zooming from the wide-angle end state (W) to the telephoto end state (T), the second lens group G2 and the fourth lens group G4 move in directions indicated by arrows in FIG. 11. The aperture stop S is disposed in the fifth lens group G5.

The first lens group G1 consists of, in order from the object: a cemented lens consisting of a negative meniscus lens L11 having a convex surface facing the object, and a biconvex positive lens L12; and a plano-convex positive lens L13 having a convex surface facing the object.

The second lens group G2 consists of, in order from the object: a positive meniscus lens L21 having a convex surface facing the object; a cemented lens consisting of biconvex positive lens L22, and a biconcave negative lens L23; a cemented lens consisting of a biconcave negative lens L24, and a positive meniscus lens L25 having a convex surface facing the object; and a negative meniscus lens L26 having a concave surface facing the object. In this Example, the negative lens L23 of the second lens group G2 corresponds to a negative lens that satisfies the conditional expressions (1) to (4) and the like. In this Example, the second lens group G2 corresponds to an object-side negative lens group, and the negative lens L23 of the second lens group G2 corresponds to a negative lens that satisfies the conditional expressions (11) to (14) and the like.

The third lens group G3 consists of, in order from the object: a biconvex positive lens L31; a biconvex positive lens L32; a biconcave negative lens L33; and a biconvex positive lens L34.

The fourth lens group G4 consists of, in order from the object: a plano-convex positive lens L41 having a convex surface facing the image; and a cemented lens consisting of the biconvex positive lens L42, and a biconcave negative lens L43. Upon focusing from the infinity object to the short-distant (finite distant) object, the fourth lens group G4 moves toward the object along the optical axis.

The fifth lens group G5 consists of, in order from the object: a biconcave negative lens L51; a biconvex positive lens L52; a negative meniscus lens L53 having a convex surface facing the object; a cemented lens consisting of a positive meniscus lens L54 having a concave surface facing the object, and a biconcave negative lens L55; a biconvex positive lens L56; a cemented lens consisting of a negative meniscus lens L57 having a convex surface facing the object, and a biconvex positive lens L58; and a biconcave negative lens L59. An image surface I is disposed on the image side of the fifth lens group G5. An aperture stop S is disposed between the negative lens L51 and the positive lens L52 of the fifth lens group G5. Note that a fixed aperture stop (flare cut stop) Sa is disposed between the negative lens L55 (of the cemented lens) and the positive lens L56.

In this Example, the cemented lens consisting of the negative meniscus lens L11 and the positive lens L12, the positive lens L13, the positive meniscus lens L21, the cemented lens consisting of the positive lens L22 and the negative lens L23, the cemented lens consisting of the negative lens L24 and the positive meniscus lens L25, the negative meniscus lens L26, the positive lens L31, the positive lens L32, the negative lens L33, the positive lens L34, the positive lens L41, the cemented lens consisting of the positive lens L42 and the negative lens L43, and the negative lens L51 constitute the front group GF disposed closer to the object than the aperture stop S. The positive lens L52, the negative meniscus lens L53, the cemented lens consisting of the positive meniscus lens L54 and the negative lens L55, the positive lens L56, the cemented lens consisting of the negative meniscus lens L57 and the positive lens L58, and the negative lens L59 constitute the rear group GR disposed closer to the image than the aperture stop S.

The following Table 6 lists values of data on the optical system according to Sixth Example.

TABLE 6

[General Data]
Zooming ratio = 2.354

|  | W | M | T |
|---|---|---|---|
| f | 123.600 | 200.000 | 291.000 |
| FNO | 2.910 | 2.910 | 2.911 |
| 2ω | 19.564 | 12.076 | 8.292 |
| Y | 21.630 | 21.630 | 21.630 |
| TL | 341.394 | 341.394 | 341.394 |
| BF | 54.819 | 54.819 | 54.819 |
| fF | 1986.248 | 3213.999 | 4676.377 |
| fR | 102.747 | 102.747 | 102.747 |

[Lens Data]

| Surface Number | R | D | nd | vd | θgF |
|---|---|---|---|---|---|
| 1 | 319.23390 | 5.200 | 1.90265 | 35.77 | 0.5815 |
| 2 | 151.34780 | 13.400 | 1.49782 | 82.57 | 0.5386 |
| 3 | −783.35470 | 0.100 |  |  |  |
| 4 | 136.11850 | 13.200 | 1.43385 | 95.23 | 0.5386 |
| 5 | ∞ | D5(Variable) |  |  |  |
| 6 | 122.06030 | 7.600 | 1.72047 | 34.71 | 0.5834 |
| 7 | 1981.86560 | 13.000 |  |  |  |
| 8 | 303.62550 | 4.700 | 1.71736 | 29.57 | 0.6036 |
| 9 | −303.62550 | 2.850 | 1.65240 | 55.27 | 0.5607 |
| 10 | 100.55440 | 3.315 |  |  |  |
| 11 | −1987.36830 | 2.650 | 1.80400 | 46.60 | 0.5575 |
| 12 | 51.73610 | 3.700 | 1.66382 | 27.35 | 0.6319 |
| 13 | 100.83750 | 6.065 |  |  |  |
| 14 | −83.24470 | 2.500 | 1.87071 | 40.73 | 0.5682 |
| 15 | −665.86980 | D15(Variable) |  |  |  |
| 16 | 601.42740 | 4.700 | 1.75500 | 52.33 | 0.5475 |
| 17 | −159.25800 | 0.100 |  |  |  |
| 18 | 93.67070 | 6.800 | 1.43385 | 95.23 | 0.5386 |
| 19 | −253.82990 | 1.564 |  |  |  |
| 20 | −113.21580 | 5.000 | 1.65412 | 39.68 | 0.5738 |
| 21 | 87.15300 | 0.975 |  |  |  |
| 22 | 116.35500 | 5.000 | 1.91082 | 35.25 | 0.5822 |
| 23 | −377.46590 | D23(Variable) |  |  |  |
| 24 | ∞ | 4.000 | 1.80400 | 46.60 | 0.5575 |
| 25 | −119.18440 | 0.100 |  |  |  |
| 26 | 63.25160 | 6.800 | 1.59349 | 67.00 | 0.5366 |
| 27 | −196.14820 | 1.800 | 1.84666 | 23.78 | 0.6192 |
| 28 | 196.14820 | D28(Variable) |  |  |  |
| 29 | −128.97450 | 1.900 | 2.00100 | 29.13 | 0.5995 |
| 30 | 94.21930 | 4.866 |  |  |  |
| 31 | ∞ | 8.000 |  | (Aperture Stop S) |  |
| 32 | 416.97790 | 5.000 | 1.72916 | 54.61 | 0.5443 |
| 33 | −76.00320 | 4.000 |  |  |  |
| 34 | 163.99730 | 2.000 | 1.80611 | 40.73 | 0.5672 |
| 35 | 69.61920 | 3.496 |  |  |  |
| 36 | −129.19950 | 3.600 | 1.90200 | 25.26 | 0.6165 |
| 37 | −52.57870 | 1.900 | 1.62731 | 59.30 | 0.5583 |
| 38 | 177.27800 | 5.206 |  |  |  |
| 39 | ∞ | 9.390 |  |  |  |
| 40 | 78.30600 | 5.000 | 2.00100 | 29.13 | 0.5995 |
| 41 | 1628.46070 | 0.100 |  |  |  |
| 42 | 63.86980 | 3.000 | 1.80400 | 46.60 | 0.5575 |
| 43 | 33.62860 | 10.000 | 1.48749 | 70.32 | 0.5291 |
| 44 | −75.31750 | 6.047 |  |  |  |
| 45 | −67.14290 | 2.000 | 1.90043 | 37.37 | 0.5772 |
| 46 | 216.78070 | BF |  |  |  |

[Variable distance data on zoom photographing]

|  | W | M | T |
|---|---|---|---|
| D5 | 5.100 | 40.193 | 66.953 |
| D15 | 63.457 | 28.364 | 1.603 |
| D23 | 21.296 | 17.639 | 18.670 |
| D28 | 6.100 | 9.757 | 8.725 |

TABLE 6-continued

[Lens Group Data]

| Group | First surface | Focal length |
|---|---|---|
| G1 | 1 | 252.497 |
| G2 | 6 | −70.230 |
| G3 | 16 | 107.659 |
| G4 | 24 | 91.176 |
| G5 | 29 | −145.483 |

[Conditional Expression Corresponding Value]

<Negative lens L23(fN1 = −115.463)>

Conditional Expression(1)
ndN1 − (2.015 − 0.0068 × vdN1) = 0.013
Conditional Expression(2)vdN1 = 55.27
Conditional Expression(3), (3-1)θgFN1 = 0.5607
Conditional Expression(4), (4-1)
θgFN1 − (0.6418 − 0.00168 × vdN1) = 0.0118
Conditional Expression(5)(−fN1)/fF = 0.058
Conditional Expression(6)(−fN1)/f = 0.934
Conditional Expression(7)DN1 = 2.850
<Negative lens L23(fN3 = −115.463)>

Conditional Expression(11)
ndN3 − (2.015 − 0.0068 × vdN3) = 0.013
Conditional Expression(12)vdN3 = 55.27
Conditional Expression(13), (13-1)θgFN3 = 0.5607
Conditional Expression(14), (14-1)
θgFN1 − (0.6418 − 0.00168 × vdN3) = 0.0118
Conditional Expression(15)fN3/fGa = 1.644
Conditional Expression(16)(−fGa)/f = 0.568
Conditional Expression(17)DN3 = 2.850

Figure 12A:
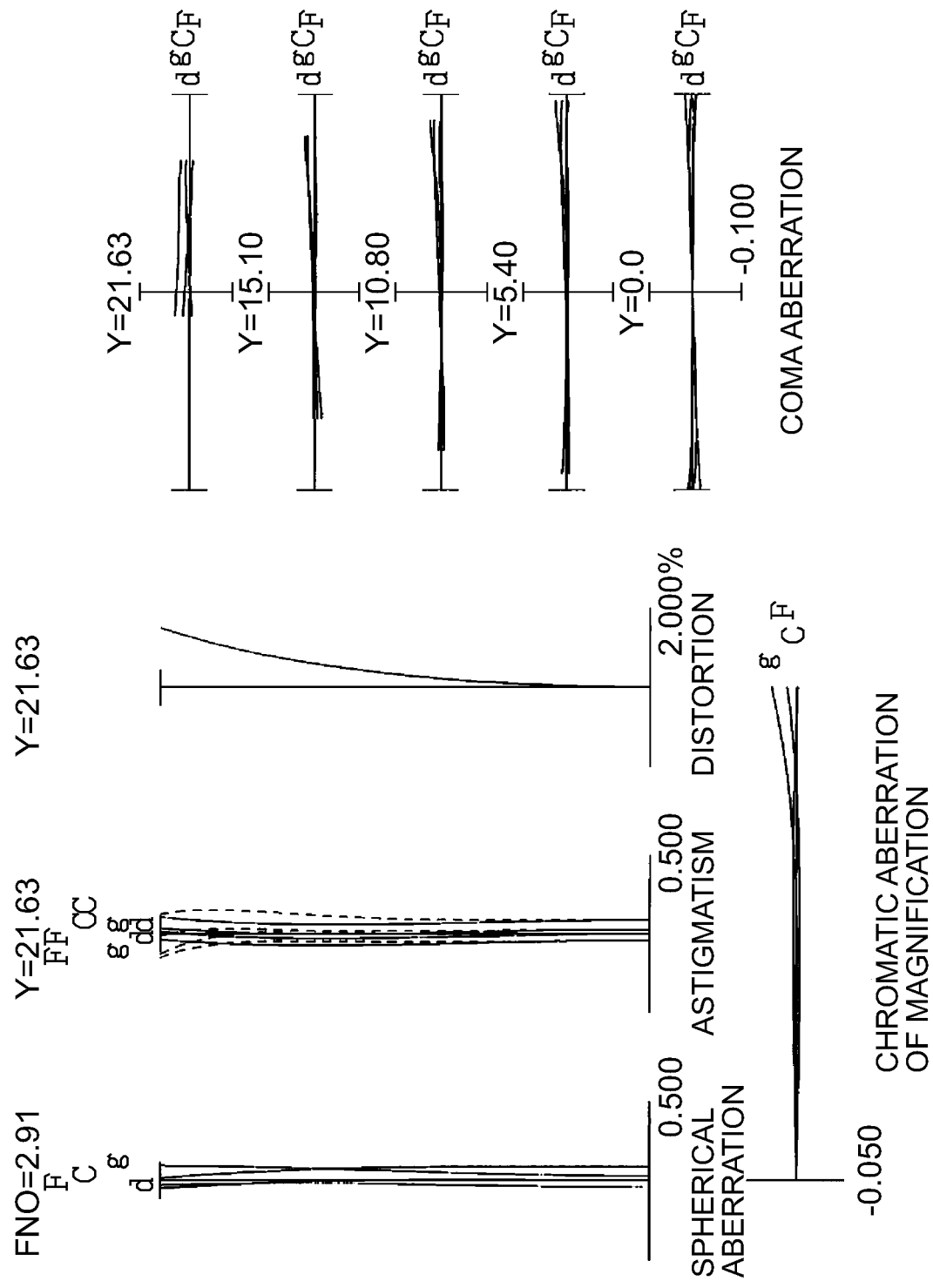

FIG. 12A shows various aberration graphs of the optical system according to Sixth Example upon focusing on infinity in the wide angle end state. FIG. 12B shows various aberration graphs of the optical system according to Sixth Example upon focusing on infinity in the intermediate focal length state. FIG. 12C shows various aberration graphs of the optical system according to Sixth Example upon focusing on infinity in the telephoto end state. The various aberration graphs show that the optical system according to Sixth Example has favorably corrected various aberrations, and exerts excellent imaging performance.

Seventh Example

Figure 13:
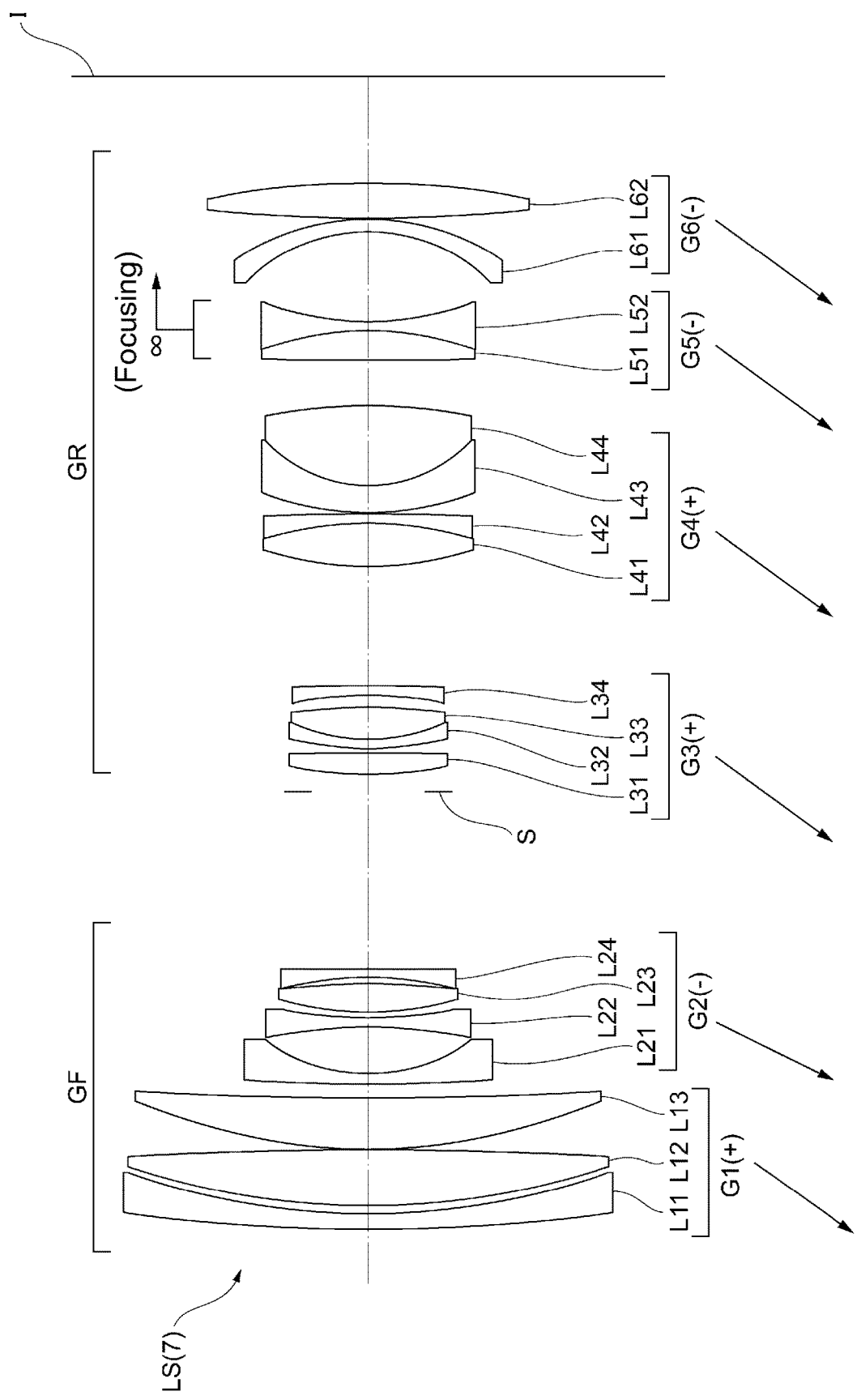
FIG. 13 is a lens configuration diagram of an optical system in a state upon focusing on infinity according to Seventh Example.

Seventh Example is described with reference to FIGS. 13 and 14A, 14B and 14C and Table 7. FIG. 13 is a diagram showing a lens configuration of an optical system (zoom optical system) in a state upon focusing on infinity according to Seventh Example. The optical system LS(7) according to Seventh Example consists of, in order from the object: a first lens group G1 having a positive refractive power; a second lens group G2 having a negative refractive power; a third lens group G3 having a positive refractive power; a fourth lens group G4 having a positive refractive power; a fifth lens group G5 having a negative refractive power; and a sixth lens group G6 having a negative refractive power. Upon zooming from the wide-angle end state (W) to the telephoto end state (T), the first to sixth lens groups G1 to G6 move in directions indicated by arrows in FIG. 13. The aperture stop S is disposed between the second lens group G2 and the third lens group G3.

The first lens group G1 consists of, in order from the object: a negative meniscus lens L11 having a convex surface facing the object; a biconvex positive lens L12; and a positive meniscus lens L13 having a convex surface facing the object.

The second lens group G2 consists of, in order from the object: a negative meniscus lens L21 having a convex surface facing the object; biconcave negative lens L22; a biconvex positive lens L23; and a negative meniscus lens L24 having a concave surface facing the object. In this Example, the negative lens L22 of the second lens group G2 corresponds to a negative lens that satisfies the conditional expressions (1) to (4) and the like. In this Example, the second lens group G2 corresponds to an object-side negative lens group, and the negative lens L22 of the second lens group G2 corresponds to a negative lens that satisfies the conditional expressions (11) to (14) and the like.

The third lens group G3 consists of, in order from the object: a biconvex positive lens L31; a cemented lens consisting of a negative meniscus lens L32 having a convex surface facing the object, and a biconvex positive lens L33; and a negative meniscus lens L34 having a concave surface facing the object. The aperture stop S is disposed adjacent to the object side of the positive lens L31, and moves with the third lens group G3 upon zooming. The cemented lens consisting of the negative meniscus lens L32 and the positive lens L33 of the third lens group G3 constitutes a vibration-proof lens group (partial group) that is movable in a direction perpendicular to the optical axis, and corrects variation in imaging position due to a camera shake and the like (image blur on the image surface I).

The fourth lens group G4 consists of, in order from the object: a cemented lens consisting of a biconvex positive lens L41, and a negative meniscus lens L42 having a concave surface facing the object; and a cemented lens consisting of a negative meniscus lens L43 having a convex surface facing the object, and a biconvex positive lens L44. The positive lens L44 has an image-side lens surface that is an aspherical surface.

The fifth lens group G5 consists of, in order from the object: a cemented lens consisting of a biconvex positive lens L51, and a biconcave negative lens L52. Upon focusing from the infinity object to the short-distant (finite distant) object, the fifth lens group G5 moves toward the image along the optical axis. The negative lens L52 has an image-side lens surface that is an aspherical surface.

The sixth lens group G6 consists of, in order from the object: a negative meniscus lens L61 having a concave surface facing the object; and a biconvex positive lens L62. An image surface I is disposed on the image side of the sixth lens group G6. The negative meniscus lens L61 has an image-side lens surface that is an aspherical surface.

In this Example, the negative meniscus lens L11, the positive lens L12, the positive meniscus lens L13, the negative meniscus lens L21, the negative meniscus lens L22, positive lens L23, and the negative meniscus lens L24 constitute the front group GF disposed closer to the object than the aperture stop S. The positive lens L31, the cemented lens consisting of the negative meniscus lens L32 and the positive lens L33, the negative meniscus lens L34, the cemented lens consisting of the positive lens L41 and the negative meniscus lens L42, the cemented lens consisting of the negative meniscus lens L43 and the positive lens L44, the cemented lens consisting of the positive lens L51 and the negative lens L52, the negative meniscus lens L61, and the positive lens L62 constitute the rear group GR disposed closer to the image than the aperture stop S.

The following Table 7 lists values of data on the optical system according to Seventh Example.

TABLE 7

[General Data]
Zooming ratio = 7.882

|  | W | M | T |
|---|---|---|---|
| f | 24.616 | 105.000 | 194.013 |
| FNO | 4.120 | 6.306 | 6.504 |
| 2ω | 86.537 | 22.101 | 12.176 |
| Y | 21.039 | 21.700 | 21.700 |
| TL | 126.886 | 169.749 | 190.789 |
| BF | 11.756 | 31.173 | 39.042 |
| fF | −22.178 | −43.419 | −73.532 |
| fR | 26.333 | 23.348 | 25.057 |

[Lens Data]

| Surface Number | R | D | nd | νd | θgF |
|---|---|---|---|---|---|
| 1 | 198.37380 | 1.700 | 1.90366 | 31.27 | 0.5948 |
| 2 | 78.64770 | 0.867 |  |  |  |
| 3 | 81.68370 | 6.232 | 1.59319 | 67.90 | 0.5440 |
| 4 | −439.34990 | 0.100 |  |  |  |
| 5 | 64.30820 | 5.536 | 1.59319 | 67.90 | 0.5440 |
| 6 | 450.30050 | D6(Variable) |  |  |  |
| 7 | 223.68080 | 1.100 | 1.90265 | 35.72 | 0.5804 |
| 8 | 19.06430 | 5.167 |  |  |  |
| 9 | −52.46300 | 1.000 | 1.68348 | 54.80 | 0.5501 |
| 10 | 49.37630 | 0.579 |  |  |  |
| 11 | 34.85960 | 3.123 | 1.92286 | 20.88 | 0.6390 |
| 12 | −79.48030 | 0.778 |  |  |  |
| 13 | −33.96090 | 0.902 | 1.81600 | 46.59 | 0.5567 |
| 14 | −2925.82960 | D14(Variable) |  |  |  |
| 15 | ∞ | 2.000 |  | (Aperture Stop S) |  |
| 16 | 42.72150 | 2.329 | 1.90265 | 35.72 | 0.5804 |
| 17 | −223.01850 | 0.500 |  |  |  |
| 18 | 36.53960 | 1.000 | 2.00100 | 29.12 | 0.5996 |
| 19 | 20.75820 | 3.544 | 1.57957 | 53.74 | 0.5519 |
| 20 | −71.54230 | 1.387 |  |  |  |
| 21 | −37.29020 | 1.001 | 1.95375 | 32.33 | 0.5905 |
| 22 | −437.70110 | D22(Variable) |  |  |  |
| 23 | 37.71780 | 4.779 | 1.83481 | 42.73 | 0.5648 |
| 24 | −37.71780 | 1.000 | 1.90366 | 31.27 | 0.5948 |
| 25 | −338.61890 | 0.100 |  |  |  |
| 26 | 31.18000 | 3.102 | 1.95375 | 32.33 | 0.5905 |
| 27 | 15.34670 | 8.806 | 1.49710 | 81.49 | 0.5377 |
| 28* | −42.86350 | D28(Variable) |  |  |  |
| 29 | 490.77490 | 3.221 | 1.84666 | 23.80 | 0.6215 |
| 30 | −34.21660 | 1.001 | 1.85135 | 40.13 | 0.5685 |
| 31* | 31.39620 | D31(Variable) |  |  |  |
| 32 | −18.58490 | 1.400 | 1.85135 | 40.13 | 0.5685 |
| 33* | −25.93960 | 0.100 |  |  |  |
| 34 | 179.9029 | 3.8234 | 1.68376 | 37.57 | 0.5782 |
| 35 | −92.9069 | BF |  |  |  |

[Aspherical Surface Data]

28th Surface

κ = 1.000, A4 = 2.86E−05, A6 = −1.68E−07
A8 = 2.77E−09, A10 = −2.49E−11, A12 = 7.74E−14

31st Surface

κ = 1.000, A4 = −7.57279E−06, A6 = 1.58867E−07
A8 = −2.59261E−09, A10 = 2.08033E−11, A12 = −5.7658E−14

33rd Surface

κ = 1.000, A4 = −7.21237E−07, A6 = −1.27431E−08
A8 = 8.85331E−11, A10 = −2.09373E−13, A12 = 0.0000E+00

[Variable distance data on zoom photographing]

|  | W | M | T |
|---|---|---|---|
| D6 | 1.562 | 40.013 | 56.454 |
| D14 | 19.428 | 4.423 | 1.154 |

TABLE 7-continued

| | | | |
|---|---|---|---|
| D22 | 13.086 | 3.754 | 1.522 |
| D28 | 4.931 | 5.545 | 1.907 |
| D31 | 9.947 | 18.665 | 24.534 |

[Lens Group Data]

| Group | First surface | Focal length |
|---|---|---|
| G1 | 1 | 103.121 |
| G2 | 7 | −16.904 |
| G3 | 15 | 48.856 |
| G4 | 23 | 29.282 |
| G5 | 29 | −39.335 |
| G6 | 32 | −6290.822 |

[Conditional Expression Corresponding Value]

<Negative lens L22(fN1 = −37.069)>

Conditional Expression(1)
ndN1 − (2.015 − 0.0068 × vdN1) = 0.041
Conditional Expression(2)vdN1 = 54.80
Conditional Expression(3), (3-1)θgFN1 = 0.5501
Conditional Expression(4), (4-1)
θgFN1 − (0.6418 − 0.00168 × vdN1) = 0.0004
Conditional Expression(5)(−fN1)/fF = −1.671
Conditional Expression(6)(−fN1)/f = 1.506
Conditional Expression(7)DN1 = 1.000
<Negative lens L22(fN3 = −37.069)>

Conditional Expression(11)
ndN3 − (2.015 − 0.0068 × vdN3) = 0.041
Conditional Expression(12)vdN3 = 54.80
Conditional Expression(13), (13-1)θgFN3 = 0.5501
Conditional Expression(14), (14-1)
θgFN1 − (0.6418 − 0.00168 × vdN3) = 0.0004
Conditional Expression(15)fN3/fGa = 2.193
Conditional Expression(16)(−fGa)/f = 0.687
Conditional Expression(17)DN3 = 1.000

FIG. 14A shows various aberration graphs of the optical system according to Seventh Example upon focusing on infinity in the wide angle end state. FIG. 14B shows various aberration graphs of the optical system according to Seventh Example upon focusing on infinity in the intermediate focal length state. FIG. 14C shows various aberration graphs of the optical system according to Seventh Example upon focusing on infinity in the telephoto end state. The various aberration graphs show that the optical system according to Seventh Example has favorably corrected various aberrations, and exerts excellent imaging performance.

Eighth Example

Eighth Example is described with reference to FIGS. 15 and 16A, 16B and 16C and Table 8. FIG. 15 is a diagram showing a lens configuration of an optical system (zoom optical system) in a state upon focusing on infinity according to Eighth Example. The optical system LS(8) according to Eighth Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 15. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; a positive meniscus lens L13 having a convex surface facing the object; and a positive meniscus lens L14 having a convex surface facing the object.

The second lens group G2 consists of, in order from the object: a negative meniscus lens L21 having a convex surface facing the object; a biconcave negative lens L22; a biconvex positive lens L23; and a biconcave negative lens L24. In this Example, the negative lens L24 of the second lens group G2 corresponds to a negative lens that satisfies the conditional expressions (1) to (4) and the like. In this Example, the second lens group G2 corresponds to an object-side negative lens group, and the negative lens L24 of the second lens group G2 corresponds to a negative lens that satisfies the conditional expressions (11) to (14) and the like.

The third lens group G3 consists of, in order from the object: a biconvex positive lens L31; a negative meniscus lens L32 having a convex surface facing the object; and a cemented lens consisting of a negative meniscus lens L33 having a convex surface facing the object, and a biconvex positive lens L34. The third lens group G3 constitutes a vibration-proof lens group that is movable in a direction perpendicular to the optical axis, and corrects variation in imaging position due to a camera shake and the like (image blur on the image surface I). The aperture stop S is disposed adjacent to the object side of the positive lens L31, and moves with the third lens group G3 upon zooming. The positive lens L31 has opposite lens surfaces that are aspherical surfaces.

The fourth lens group G4 consists of, in order from the object: a cemented lens consisting of a positive meniscus lens L41 having a concave surface facing the object, and a biconcave negative lens L42. Upon focusing from the infinity object to the short-distant (finite distant) object, the fourth lens group G4 moves toward the image along the optical axis.

The fifth lens group G5 consists of, in order from the object: a cemented lens consisting of biconvex positive lens L51, and a negative meniscus lens L52 having a concave surface facing the object. An image surface I is disposed on the image side of the fifth lens group G5. The positive lens L51 has an object-side lens surface that is an aspherical surface. An optical filter FL is disposed between the fifth lens group G5 and the image surface I. The optical filter FL may be, for example, an NC filter (neutral color filter), a color filter, a polarizing filter, an ND filter (neutral density filter), an IR filter (infrared cutoff filter) or the like.

In this Example, the cemented lens consisting of the negative meniscus lens L11 and the positive lens L22, the positive meniscus lens L13, the positive meniscus lens L14, the negative meniscus lens L21, the negative lens L22, the positive lens L23, and the negative lens L24 constitute the front group GF disposed closer to the object than the aperture stop S. The positive lens L31, the negative lens L32, the cemented lens consisting of the negative meniscus lens L33 and the positive lens L34, the cemented lens consisting of the positive meniscus lens L41 and the negative lens L42, and the cemented lens consisting of the positive lens L51 and the negative meniscus lens L52 constitute the rear group GR disposed closer to the image than the aperture stop S.

The following Table 8 lists values of data on the optical system according to Eighth Example.

TABLE 8

[General Data]
Zooming ratio = 78.219

|  | W | M | T |
|---|---|---|---|
| f | 4.430 | 13.187 | 346.510 |
| FNO | 2.746 | 3.489 | 6.835 |
| 2ω | 86.498 | 33.500 | 1.299 |
| Y | 3.350 | 4.000 | 4.000 |
| TL | 131.989 | 135.543 | 198.671 |
| BF | 0.400 | 0.400 | 0.400 |
| fF | −12.191 | −16.895 | −161.406 |
| fR | 24.512 | 28.996 | −59.326 |

[Lens Data]

| Surface Number | R | D | nd | vd | θgF |
|---|---|---|---|---|---|
| 1 | 635.18304 | 2.300 | 1.78590 | 44.17 | 0.5626 |
| 2 | 88.21131 | 7.500 | 1.43700 | 95.10 | 0.5336 |
| 3 | −295.14033 | 0.100 | | | |
| 4 | 87.82570 | 6.100 | 1.49782 | 82.57 | 0.5386 |
| 5 | 1219.65670 | 0.100 | | | |
| 6 | 90.98562 | 4.700 | 1.49782 | 82.57 | 0.5386 |
| 7 | 353.92110 | D7(Variable) | | | |
| 8 | 61.45834 | 1.000 | 1.83481 | 42.73 | 0.5648 |
| 9 | 11.78636 | 5.700 | | | |
| 10 | −21.52038 | 0.800 | 1.83481 | 42.73 | 0.5648 |
| 11 | 108.15181 | 0.100 | | | |
| 12 | 28.80632 | 3.150 | 1.92286 | 20.88 | 0.6390 |
| 13 | −40.21061 | 1.090 | | | |
| 14 | −18.76071 | 0.700 | 1.65167 | 56.24 | 0.5536 |
| 15 | 322.64495 | D15(Variable) | | | |
| 16 | ∞ | 0.750 | | (Aperture Stop S) | |
| 17* | 12.55338 | 3.000 | 1.55332 | 71.68 | 0.5404 |
| 18* | −98.92515 | 2.600 | | | |
| 19 | 23.66805 | 1.000 | 1.90366 | 31.31 | 0.5947 |
| 20 | 12.27040 | 1.750 | | | |
| 21 | 16.93839 | 0.500 | 1.78590 | 44.17 | 0.5626 |
| 22 | 11.18664 | 3.500 | 1.49782 | 82.57 | 0.5386 |
| 23 | −27.12612 | D23(Variable) | | | |
| 24 | −553.37396 | 2.500 | 1.53172 | 48.78 | 0.5622 |
| 25 | −25.28953 | 0.500 | 1.49782 | 82.57 | 0.5386 |
| 26 | 15.03788 | D26(Variable) | | | |
| 27* | 18.69956 | 2.100 | 1.58913 | 61.22 | 0.5401 |
| 28 | −19.90834 | 0.500 | 1.71736 | 29.57 | 0.6036 |
| 29 | −53.24372 | D29(Variable) | | | |
| 30 | ∞ | 0.210 | 1.51680 | 63.88 | 0.5360 |
| 31 | ∞ | 0.850 | | | |
| 32 | ∞ | 0.500 | 1.51680 | 63.88 | 0.5360 |
| 33 | ∞ | BF | | | |

[Aspherical Surface Data]

17th Surface

κ = 1.000, A4 = −3.03829E−05, A6 = −3.11384E−07
A8 = 8.41204E−09, A10 = 0.00000E+00, A12 = 0.00000E+00

18th Surface

κ = 1.000, A4 = 5.13608E−05, A6 = −3.72416E−07
A8 = 1.42105E−08, A10 = −5.31468E−11, A12 = 0.00000E+00

27th Surface

κ = 1.000, A4 = −7.86909E−06, A6 = 2.69411E−07
A8 = −4.51379E−09, A10 = 0.00000E+00, A12 = 0.00000E+00

[Variable distance data on zoom photographing]

|  | W | M | T |
|---|---|---|---|
| D7 | 0.750 | 29.576 | 96.457 |
| D15 | 58.597 | 27.038 | 1.750 |
| D23 | 1.000 | 10.725 | 20.681 |
| D26 | 8.328 | 7.495 | 24.390 |
| D29 | 9.314 | 6.709 | 1.392 |

[Lens Group Data]

| Group | First surface | Focal length |
|---|---|---|
| G1 | 1 | 121.894 |
| G2 | 8 | −10.354 |
| G3 | 16 | 19.925 |
| G4 | 24 | −30.515 |
| G5 | 27 | 26.216 |

[Conditional Expression Corresponding Value]

<Negative lens L24(fN1 = −27.185)>

Conditional Expression(1)
ndN1 − (2.015 − 0.0068 × vdN1) = 0.019
Conditional Expression(2)vdN1 = 56.24
Conditional Expression(3), (3-1)θgFN1 = 0.5536
Conditional Expression(4), (4-1)
θgFN1 − (0.6418 − 0.00168 × vdN1) = 0.0063
Conditional Expression(5)(−fN1)/fF = −2.230
Conditional Expression(6)(−fN1)/f = 6.137
Conditional Expression(7)DN1 = 0.700

<Negative lens L24(fN3 = −27.185)>

Conditional Expression(11)
ndN3 − (2.015 − 0.0068 × vdN3) = 0.019
Conditional Expression(12)vdN3 = 56.24
Conditional Expression(13), (13-1)θgFN3 = 0.5536
Conditional Expression(14), (14-1)
θgFN1 − (0.6418 − 0.00168 × vdN3) = 0.0063
Conditional Expression(15)fN3/fGa = 2.626
Conditional Expression(16)(−fGa)/f = 2.337
Conditional Expression(17)DN3 = 0.700

Figure 16A:
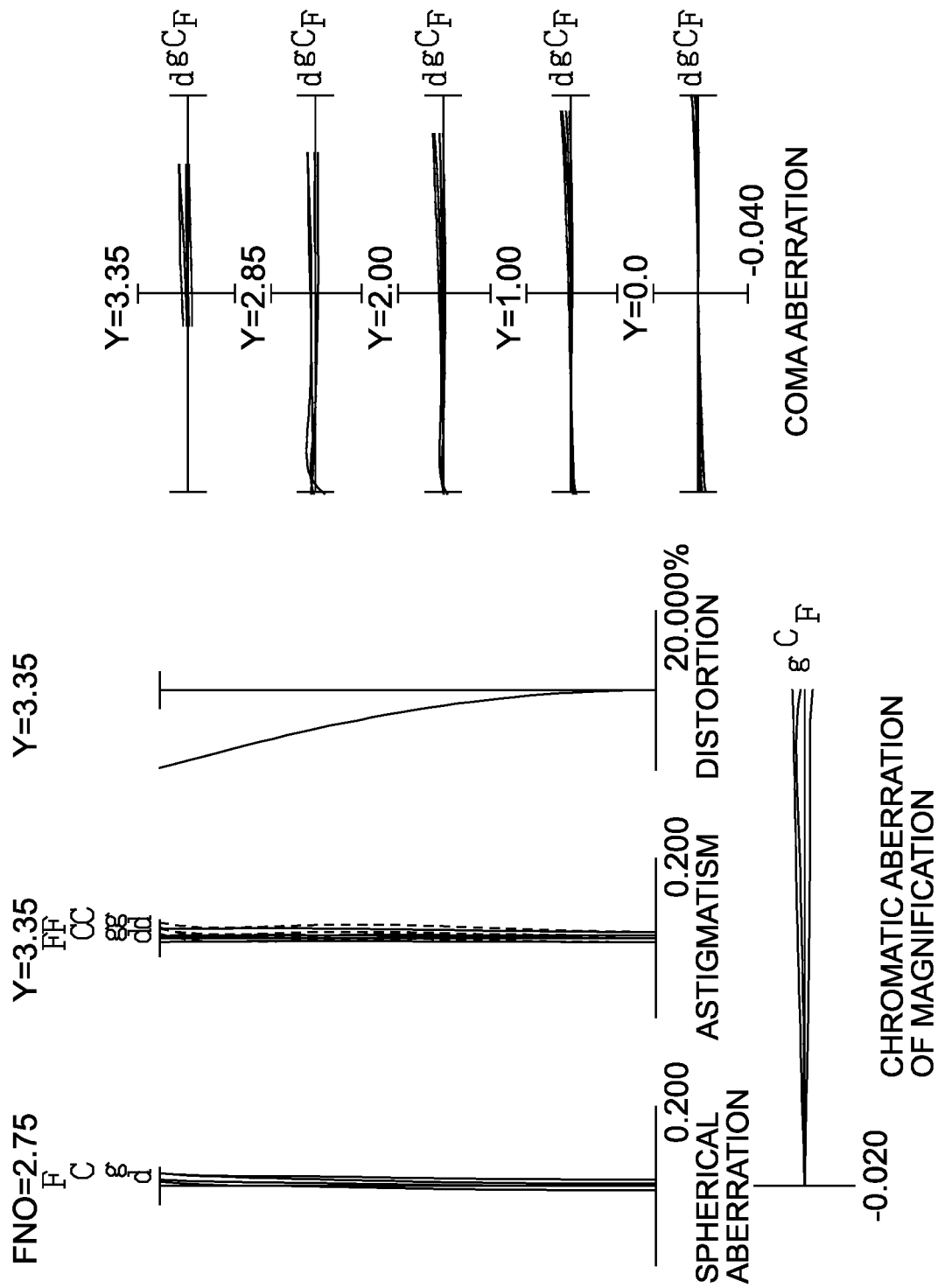

FIG. 16A shows various aberration graphs of the optical system according to Eighth Example upon focusing on infinity in the wide angle end state. FIG. 16B shows various aberration graphs of the optical system according to Eighth Example upon focusing on infinity in the intermediate focal length state. FIG. 16C shows various aberration graphs of the optical system according to Eighth Example upon focusing on infinity in the telephoto end state. The various aberration graphs show that the optical system according to Eighth Example has favorably corrected various aberrations, and exerts excellent imaging performance.

Ninth Example

Figure 17:
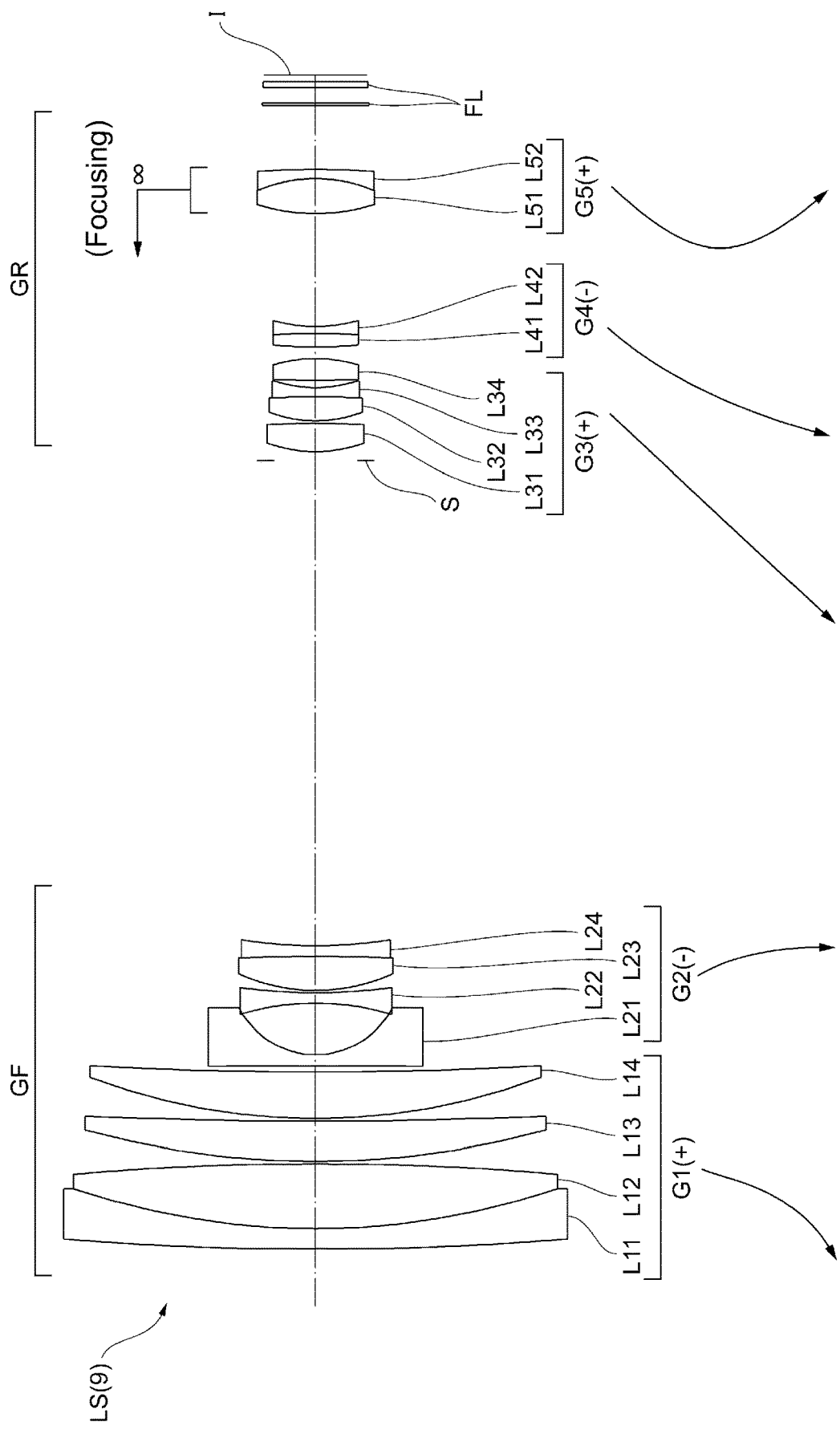
FIG. 17 is a lens configuration diagram of an optical system in a state upon focusing on infinity according to Ninth Example.

Ninth Example is described with reference to FIGS. 17 and 18A, 18B and 18C and Table 9. FIG. 17 is a diagram showing a lens configuration of an optical system (zoom optical system) in a state upon focusing on infinity according to Ninth Example. The optical system LS(9) according to Ninth Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 17. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; a positive meniscus lens L13 having a convex surface facing the object; and a positive meniscus lens L14 having a convex surface facing the object.

The second lens group G2 consists of, in order from the object: a negative meniscus lens L21 having a convex surface facing the object; a biconcave negative lens L22; and a cemented lens consisting of a biconvex positive lens L23, and a biconcave negative lens L24. In this Example, the negative meniscus lens L21 of the second lens group G2 corresponds to a negative lens that satisfies the conditional expressions (1) to (4) and the like. In this Example, the second lens group G2 corresponds to an object-side negative lens group, and the negative meniscus lens L21 of the second lens group G2 corresponds to a negative lens that satisfies the conditional expressions (11) to (14) and the like.

The third lens group G3 consists of, in order from the object: a biconvex positive lens L31; a cemented lens consisting of a biconvex positive lens L32, and a biconcave negative lens L33; and a biconvex positive lens L34. The third lens group G3 constitutes a vibration-proof lens group that is movable in a direction perpendicular to the optical axis, and corrects variation in imaging position due to a camera shake and the like (image blur on the image surface I). The aperture stop S is disposed adjacent to the object side of the positive lens L31, and moves with the third lens group G3 upon zooming. The positive lens L31 has opposite lens surfaces that are aspherical surfaces.

The fourth lens group G4 consists of, in order from the object: a cemented lens consisting of a biconvex positive lens L41, and a biconcave negative lens L42.

The fifth lens group G5 consists of, in order from the object: a cemented lens consisting of biconvex positive lens L51, and a negative meniscus lens L52 having a concave surface facing the object. Upon focusing from the infinity object to the short-distant (finite distant) object, the fifth lens group G5 moves toward the object along the optical axis. An image surface I is disposed on the image side of the fifth lens group G5. The positive lens L51 has an object-side lens surface that is an aspherical surface. Similar to the Eighth Example, an optical filter FL is disposed between the fifth lens group G5 and the image surface I.

In this Example, the cemented lens consisting of the negative meniscus lens L11 and the positive lens L12, the positive meniscus lens L13, the positive meniscus lens L14, the negative meniscus lens L21, the negative lens L22, the cemented lens consisting of the positive lens L23 and the negative lens L24 constitute the front group GF disposed closer to the object than the aperture stop S. The positive lens L31, the cemented lens consisting of the positive lens L32 and the negative lens L33, the positive lens L34, the cemented lens consisting of positive lens L41 and the negative lens L42, and the cemented lens consisting of the positive lens L51 and the negative meniscus lens L52 constitute the rear group GR disposed closer to the image than the aperture stop S.

The following Table 9 lists values of data on the optical system according to Ninth Example.

TABLE 9

[General Data]
Zooming ratio = 56.908

|  | W | M | T |
|---|---|---|---|
| f | 4.397 | 12.677 | 250.201 |
| FNO | 3.492 | 4.324 | 7.259 |

TABLE 9-continued

|  | | | |
|---|---|---|---|
| 2ω | 87.204 | 34.976 | 1.799 |
| Y | 3.400 | 4.000 | 4.000 |
| TL | 102.372 | 105.195 | 145.381 |
| BF | 0.600 | 0.600 | 0.600 |
| fF | −10.013 | −13.902 | −140.788 |
| fR | 20.171 | 20.847 | 115.149 |

[Lens Data]

| Surface Number | R | D | nd | νd | θgF |
|---|---|---|---|---|---|
| 1 | 273.18981 | 1.800 | 1.80440 | 39.61 | 0.5719 |
| 2 | 65.52782 | 5.650 | 1.43700 | 95.10 | 0.5336 |
| 3 | −246.12543 | 0.200 | | | |
| 4 | 75.42445 | 3.500 | 1.49782 | 82.57 | 0.5386 |
| 5 | 483.55234 | 0.200 | | | |
| 6 | 54.82234 | 4.100 | 1.49782 | 82.57 | 0.5386 |
| 7 | 376.10491 | D7(Variable) | | | |
| 8 | 4953.19040 | 1.000 | 1.67769 | 52.63 | 0.5546 |
| 9 | 7.50793 | 4.500 | | | |
| 10 | −23.16393 | 0.900 | 1.83481 | 42.73 | 0.5648 |
| 11 | 47.61347 | 0.200 | | | |
| 12 | 16.11916 | 3.000 | 1.92286 | 20.88 | 0.6390 |
| 13 | −143.49864 | 0.900 | 1.91082 | 35.25 | 0.5822 |
| 14 | 37.59639 | D14(Variable) | | | |
| 15 | ∞ | 0.750 | | (Aperture Stop S) | |
| 16* | 12.15820 | 2.500 | 1.55332 | 71.68 | 0.5404 |
| 17* | −58.02211 | 0.200 | | | |
| 18 | 11.49728 | 2.100 | 1.49782 | 82.57 | 0.5386 |
| 19 | −77.93882 | 0.800 | 1.88300 | 40.66 | 0.5668 |
| 20 | 11.77346 | 0.650 | | | |
| 21 | 137.02945 | 1.900 | 1.48749 | 70.32 | 0.5291 |
| 22 | −12.01805 | D22(Variable) | | | |
| 23 | 40.61484 | 1.200 | 1.79504 | 28.69 | 0.6065 |
| 24 | −53.39104 | 0.600 | 1.79952 | 42.09 | 0.5667 |
| 25 | 14.78044 | D25(Variable) | | | |
| 26* | 7.45330 | 3.050 | 1.62299 | 58.12 | 0.5438 |
| 27 | −12.70314 | 0.800 | 1.83400 | 37.18 | 0.5778 |
| 28 | −65.93420 | D28(Variable) | | | |
| 29 | ∞ | 0.210 | 1.51680 | 63.88 | 0.5360 |
| 30 | ∞ | 1.348 | | | |
| 31 | ∞ | 0.500 | 1.51680 | 63.88 | 0.5360 |
| 32 | ∞ | BF | | | |

[Aspherical Surface Data]

16th Surface

κ = 1.366, A4 = −3.45996E−05, A6 = 4.67304E−07
A8 = 0.00000E+00, A10 = 0.00000E+00, A12 = 0.00000E+00

17th Surface

κ = 1.000, A4 = 1.57317E−04, A6 = 8.62777E−07
A8 = 0.00000E+00, A10 = 0.00000E+00, A12 = 0.00000E+00

26th Surface

κ = 1.000, A4 = 2.30650E−05, A6 = 1.26895E−07
A8 = 0.00000E+00, A10 = 0.00000E+00, A12 = 0.00000E+00

[Variable distance data on zoom photographing]

|  | W | M | T |
|---|---|---|---|
| D7 | 0.500 | 18.937 | 61.732 |
| D14 | 42.310 | 18.734 | 0.200 |
| D22 | 1.000 | 3.984 | 8.357 |
| D25 | 9.814 | 9.840 | 28.250 |
| D28 | 5.590 | 10.542 | 3.684 |

[Lens Group Data]

| Group | First surface | Focal length |
|---|---|---|
| G1 | 1 | 79.847 |
| G2 | 8 | −8.267 |
| G3 | 15 | 15.573 |

TABLE 9-continued

| | | |
|---|---|---|
| G4 | 23 | −29.814 |
| G5 | 26 | 31.361 |

[Conditional Expression Corresponding Value]

<Negative meniscus lens L21(fN1 = −11.061)>

Conditional Expression(1)
ndN1 − (2.015 − 0.0068 × vdN1) = 0.021
Conditional Expression(2)vdN1 = 52.63
Conditional Expression(3), (3-1)θgFN1 = 0.5546
Conditional Expression(4), (4-1)
θgFN1 − (0.6418 − 0.00168 × vdN1) = 0.0012
Conditional Expression(5)(−fN1)/fF = −1.105
Conditional Expression(6)(−fN1)/f = 2.516
Conditional Expression(7)DN1 = 1.000

<Negative meniscus lens L21(fN3 = −11.061)>

Conditional Expression(11)
ndN3 − (2.015 − 0.0068 × vdN3) = 0.021
Conditional Expression(12)vdN3 = 52.63
Conditional Expression(13), (13-1)θgFN3 = 0.5546
Conditional Expression(14), (14-1)
θgFN1 − (0.6418 − 0.00168 × vdN3) = 0.0012
Conditional Expression(15)fN3/fGa = 1.338
Conditional Expression(16)(−fGa)/f = 1.880
Conditional Expression(17)DN3 = 1.000

Figure 18C:
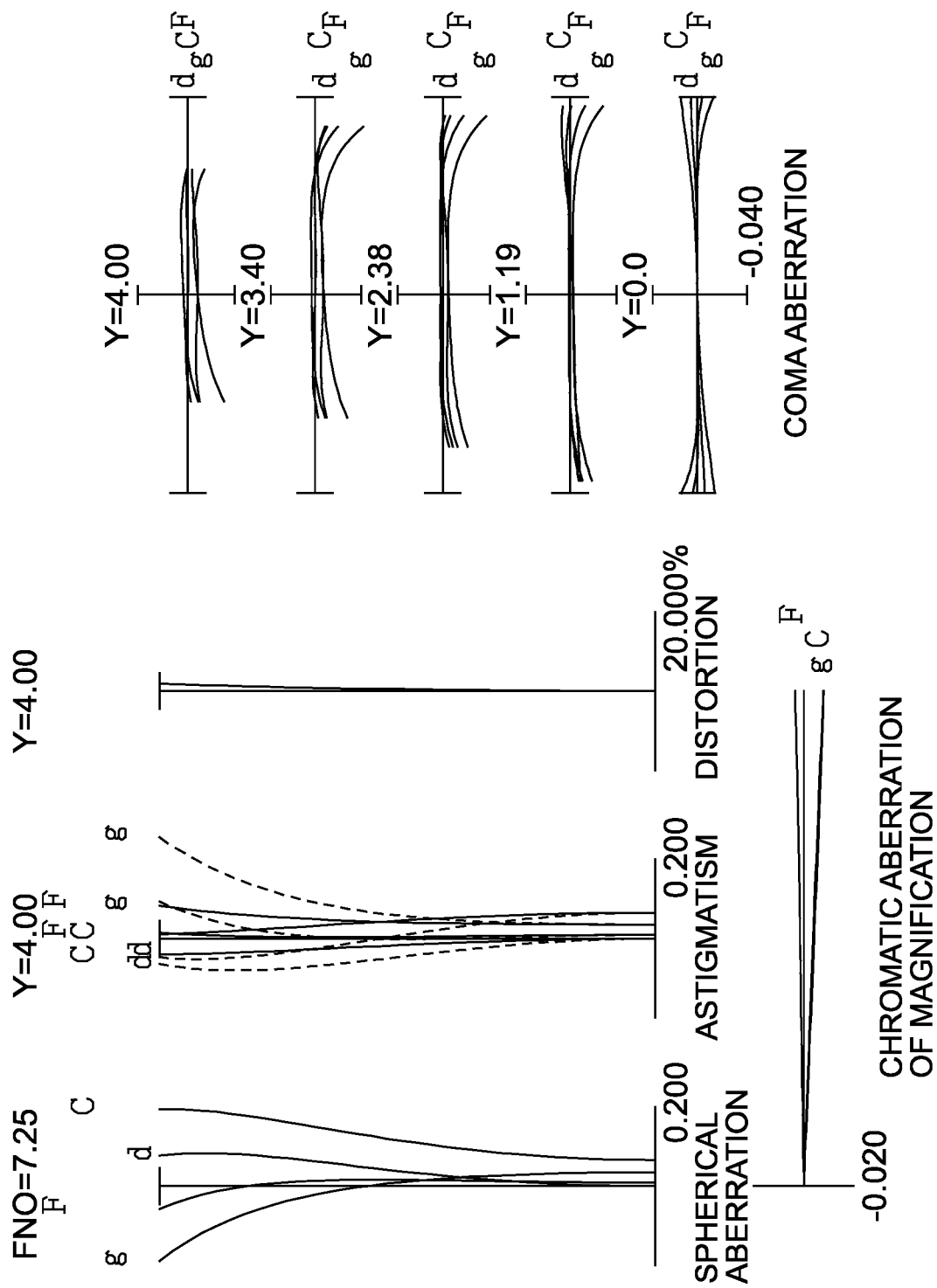

FIG. 18A shows various aberration graphs of the optical system according to Ninth Example upon focusing on infinity in the wide angle end state. FIG. 18B shows various aberration graphs of the optical system according to Ninth Example upon focusing on infinity in the intermediate focal length state. FIG. 18C shows various aberration graphs of the optical system according to Ninth Example upon focusing on infinity in the telephoto end state. The various aberration graphs show that the optical system according to Ninth Example has favorably corrected various aberrations, and exerts excellent imaging performance.

Tenth Example

Figure 19:
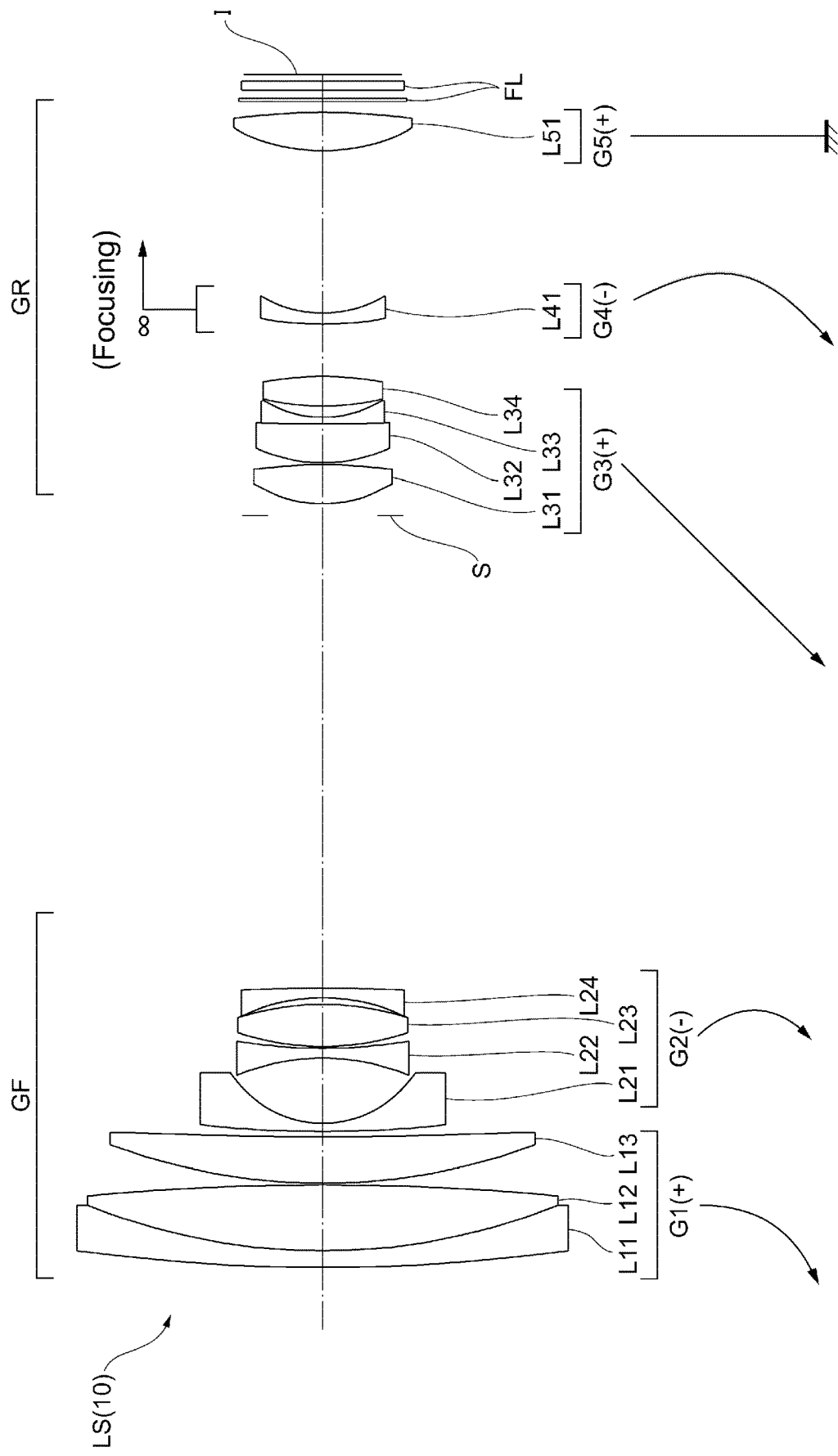
FIG. 19 is a lens configuration diagram of an optical system in a state upon focusing on infinity according to Tenth Example.

Tenth Example is described with reference to FIGS. 19 and 20A, 20B and 20C and Table 10. FIG. 19 is a diagram showing a lens configuration of an optical system (zoom optical system) in a state upon focusing on infinity according to Tenth Example. The optical system LS(10) according to Tenth Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fourth lens groups G1 to G4 move in directions indicated by arrows in FIG. 19. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; and a positive meniscus lens L13 having a convex surface facing the object.

The second lens group G2 consists of, in order from the object: a negative meniscus lens L21 having a convex surface facing the object; biconcave negative lens L22; a biconvex positive lens L23; and a negative meniscus lens L24 having a concave surface facing the object. In this Example, the negative meniscus lens L21 of the second lens group G2 corresponds to a negative lens that satisfies the conditional expressions (1) to (4) and the like. In this Example, the second lens group G2 corresponds to an object-side negative lens group, and the negative meniscus lens L21 of the second lens group G2 corresponds to a negative lens that satisfies the conditional expressions (11) to (14) and the like.

The third lens group G3 consists of, in order from the object: a biconvex positive lens L31; a cemented lens consisting of a positive meniscus lens L32 having a convex surface facing the object, and a negative meniscus lens L33 having a convex surface facing the object; and a biconvex positive lens L34. The third lens group G3 constitutes a vibration-proof lens group that is movable in a direction perpendicular to the optical axis, and corrects variation in imaging position due to a camera shake and the like (image blur on the image surface I). The aperture stop S is disposed adjacent to the object side of the positive lens L31, and moves with the third lens group G3 upon zooming. The positive lens L31 has opposite lens surfaces that are aspherical surfaces.

The fourth lens group G4 consists of a negative meniscus lens L41 having a convex surface facing the object. Upon focusing from the infinity object to the short-distant (finite distant) object, the fourth lens group G4 moves toward the image along the optical axis.

The fifth lens group G5 consists of a biconvex positive lens L51. An image surface I is disposed on the image side of the fifth lens group G5. The positive lens L51 has an object-side lens surface that is an aspherical surface. Similar to the Eighth Example, an optical filter FL is disposed between the fifth lens group G5 and the image surface I.

In this Example, the cemented lens consisting of the negative meniscus lens L11 and the positive lens L12, the positive meniscus lens L13, the negative meniscus lens L21, the negative lens L22, the positive lens L23, and the negative meniscus lens L24 constitute the front group GF disposed closer to the object than the aperture stop S. The positive lens L31, the cemented lens consisting of the positive meniscus lens L32 and the negative meniscus lens L33, the positive lens L34, the negative meniscus lens L41, and the positive lens L51 constitute the rear group GR disposed closer to the image than the aperture stop S.

The following Table 10 lists values of data on the optical system according to Tenth Example.

TABLE 10

[General Data]
Zooming ratio = 32.853

| | W | M | T |
|---|---|---|---|
| f | 4.432 | 10.612 | 145.611 |
| FNO | 3.567 | 4.361 | 7.435 |
| 2ω | 85.001 | 40.168 | 3.043 |
| Y | 3.300 | 4.000 | 4.000 |
| TL | 68.023 | 68.790 | 99.945 |
| BF | 0.400 | 0.400 | 0.400 |
| fF | −7.660 | −9.862 | −59.394 |
| fR | 21.418 | 26.678 | −30.263 |

[Lens Data]

| Surface Number | R | D | nd | vd | θgF |
|---|---|---|---|---|---|
| 1 | 102.43988 | 0.950 | 1.80100 | 34.92 | 0.5853 |
| 2 | 36.00812 | 3.750 | 1.49700 | 81.73 | 0.5371 |
| 3 | −149.20420 | 0.100 | | | |
| 4 | 34.83218 | 2.650 | 1.60300 | 65.44 | 0.5389 |
| 5 | 280.45373 | D5(Variable) | | | |

TABLE 10-continued

| | | | | | |
|---|---|---|---|---|---|
| 6 | 60.18046 | 0.500 | 1.62731 | 59.30 | 0.5584 |
| 7 | 6.30550 | 3.715 | | | |
| 8 | -12.51258 | 0.550 | 1.90366 | 31.31 | 0.5947 |
| 9 | 30.14088 | 0.100 | | | |
| 10 | 15.65323 | 2.400 | 1.92286 | 20.88 | 0.639 |
| 11 | -15.92321 | 0.400 | | | |
| 12 | -10.47990 | 0.550 | 1.80610 | 40.97 | 0.5688 |
| 13 | -89.27818 | D13(Variable) | | | |
| 14 | ∞ | 0.700 | | (Aperture Stop S) | |
| 15* | 7.22087 | 2.200 | 1.49710 | 81.56 | 0.5385 |
| 16* | -25.69859 | 0.100 | | | |
| 17 | 9.11323 | 2.200 | 1.53172 | 48.78 | 0.5622 |
| 18 | 75.26227 | 0.400 | 1.91082 | 35.25 | 0.5822 |
| 19 | 6.37325 | 0.650 | | | |
| 20 | 14.90902 | 1.700 | 1.49700 | 81.73 | 0.5371 |
| 21 | -16.93987 | D21(Variable) | | | |
| 22 | 18.44495 | 0.600 | 1.49700 | 81.73 | 0.5371 |
| 23 | 6.77356 | D23(Variable) | | | |
| 24* | 11.50000 | 2.200 | 1.53113 | 55.75 | 0.5628 |
| 25 | -35.52133 | 0.600 | | | |
| 26 | ∞ | 0.210 | 1.51680 | 63.88 | 0.5360 |
| 27 | ∞ | 0.450 | | | |
| 28 | ∞ | 0.500 | 1.51680 | 63.88 | 0.5360 |
| 29 | ∞ | BF | | | |

[Aspherical Surface Data]

15th Surface $\kappa = -1.173$, $A4 = 4.61200E-04$, $A6 = -1.72721E-06$
$A8 = 0.00000E+00$, $A10 = 0.00000E+00$, $A12 = 0.00000E+00$ 16th Surface $\kappa = 1.000$, $A4 = 1.73828E-04$, $A6 = 8.92317E-07$
$A8 = -5.35697E-08$, $A10 = 0.00000E+00$, $A12 = 0.00000E+00$ 24th Surface $\kappa = 2.877$, $A4 = -1.20577E-04$, $A6 = 2.62458E-06$
$A8 = 0.00000E+00$, $A10 = 0.00000E+00$, $A12 = 0.00000E+00$

[Variable distance data on zoom photographing]

| | W | M | T |
|---|---|---|---|
| D5 | 0.278 | 10.454 | 39.970 |
| D13 | 26.913 | 13.530 | 1.598 |
| D21 | 2.982 | 8.797 | 15.299 |
| D23 | 9.275 | 7.435 | 14.504 |

[Lens Group Data]

| Group | First surface | Focal length |
|---|---|---|
| G1 | 1 | 55.798 |
| G2 | 6 | -6.256 |
| G3 | 14 | 11.856 |
| G4 | 22 | -21.912 |
| G5 | 24 | 16.626 |

[Conditional Expression Corresponding Value]

<Negative meniscus lens L21(fN1 = -11.268)>

Conditional Expression(1)
$ndN1 - (2.015 - 0.0068 \times vdN1) = 0.016$
Conditional Expression(2) $vdN1 = 59.30$
Conditional Expression(3), $(3-1)\theta gFN1 = 0.5584$
Conditional Expression(4), (4-1)
$\theta gFN1 - (0.6418 - 0.00168 \times vdN1) = 0.0162$
Conditional Expression(5) $(-fN1)/fF = -1.471$
Conditional Expression(6) $(-fN1)/f = 2.542$
Conditional Expression(7) $DN1 = 0.500$
<Negative meniscus lens L21(fN3 = -11.268)>

Figure 20A:
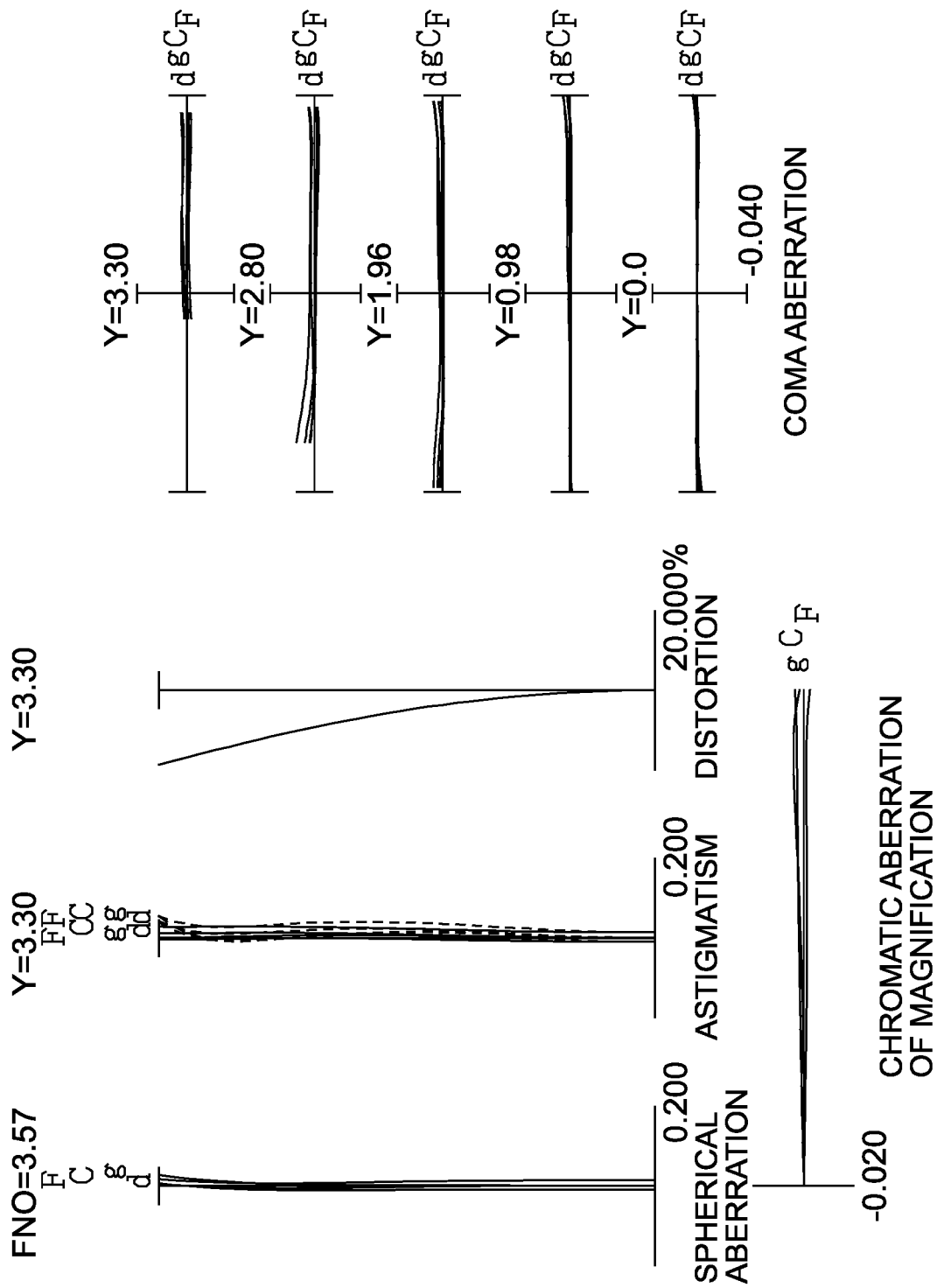
Figure 20C:
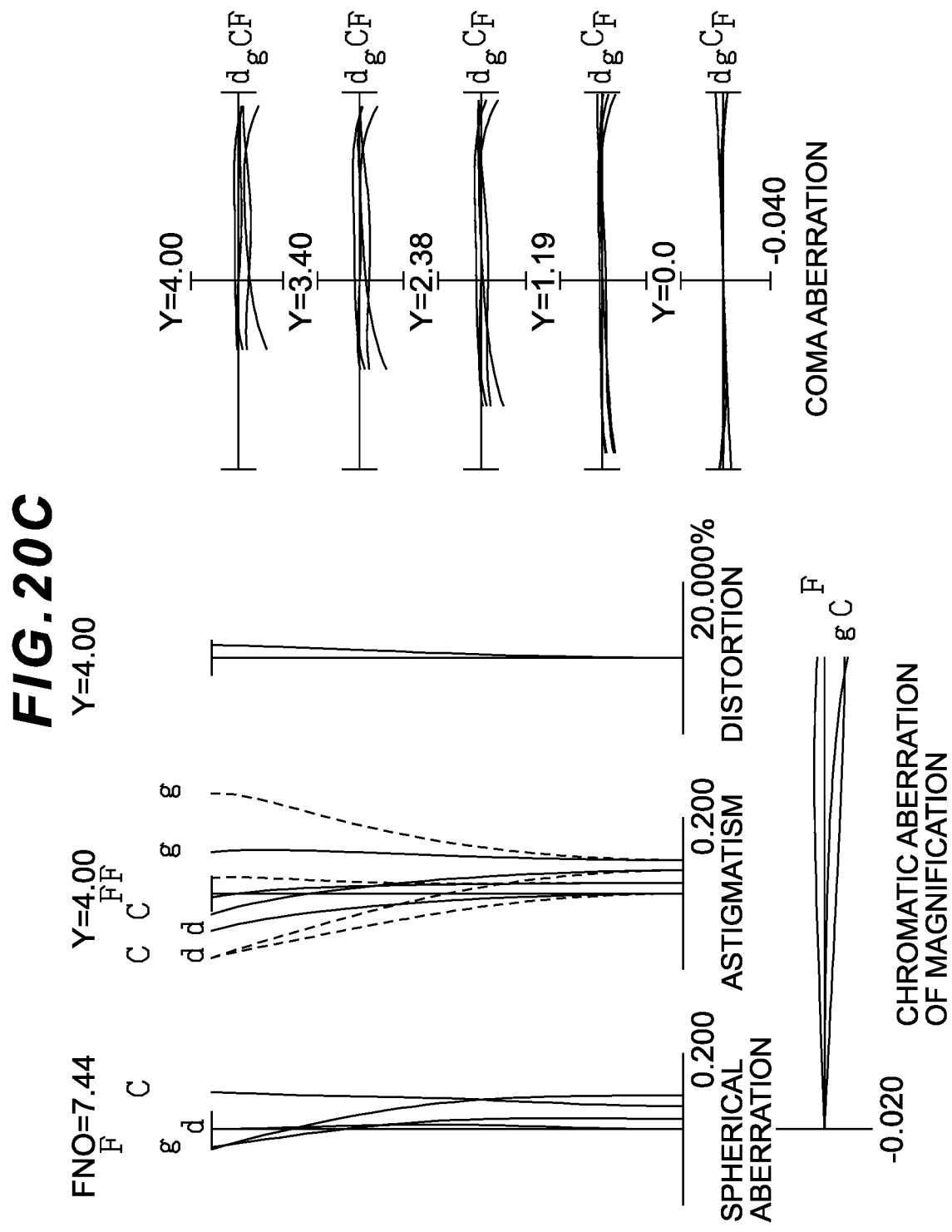

Conditional Expression(11)
$ndN3 - (2.015 - 0.0068 \times vdN3) = 0.016$
Conditional Expression(12) $vdN3 = 59.30$
Conditional Expression(13), $(13-1)\theta gFN3 = 0.5584$
Conditional Expression(14), (14-1)
$\theta gFN1 - (0.6418 - 0.00168 \times vdN3) = 0.0162$
Conditional Expression(15) $fN3/fGa = 1.801$
Conditional Expression(16) $(-fGa)/f = 1.411$
Conditional Expression(17) $DN3 = 0.500$ FIG. 20A shows various aberration graphs of the optical system according to Tenth Example upon focusing on infinity in the wide angle end state. FIG. 20B shows various aberration graphs of the optical system according to Tenth Example upon focusing on infinity in the intermediate focal length state. FIG. 20C shows various aberration graphs of the optical system according to Tenth Example upon focusing on infinity in the telephoto end state. The various aberration graphs show that the optical system according to Tenth Example has favorably corrected various aberrations, and exerts excellent imaging performance.

Eleventh Example

Figure 21:
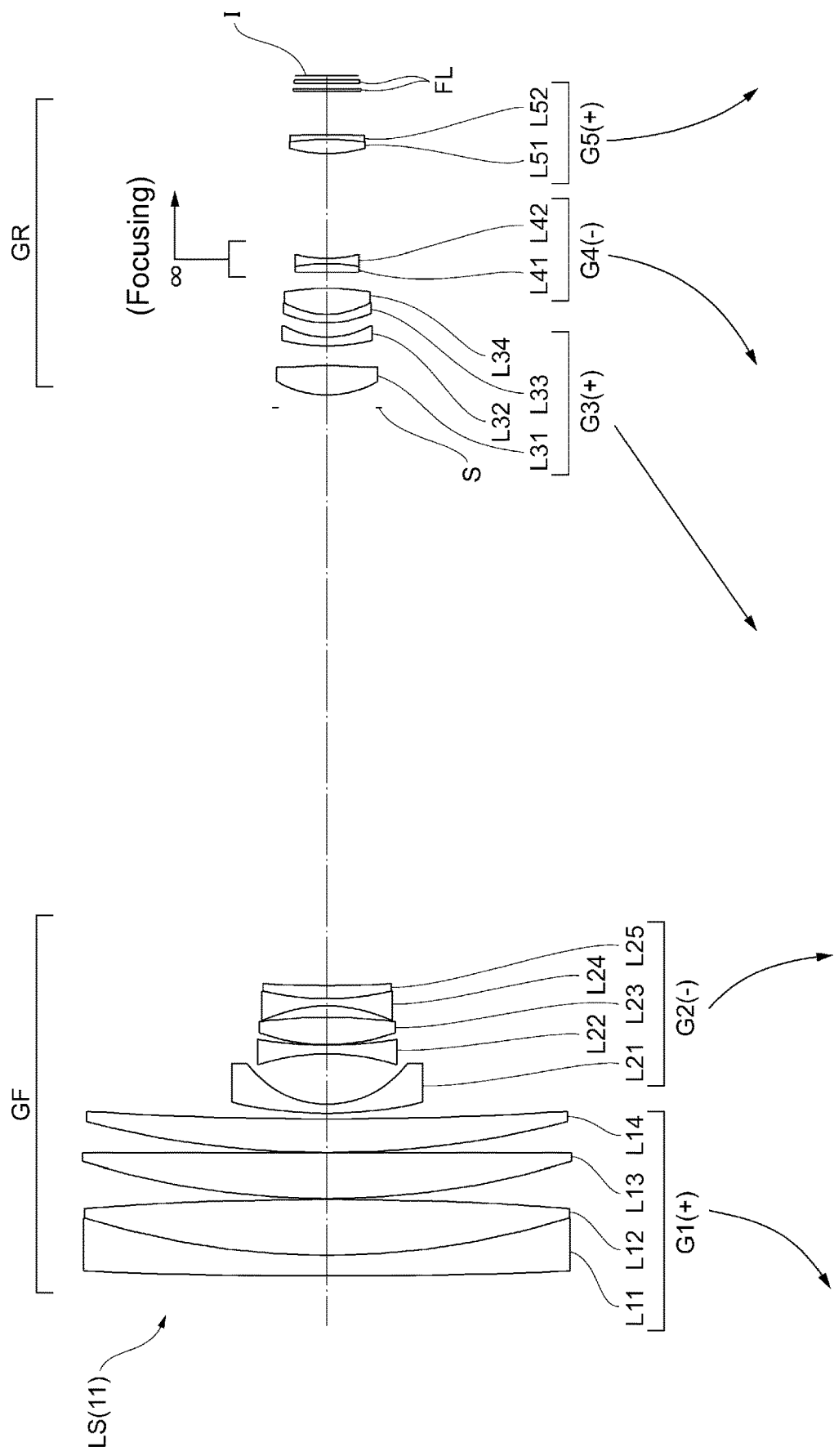
FIG. 21 is a lens configuration diagram of an optical system in a state upon focusing on infinity according to Eleventh Example.

Eleventh Example is described with reference to FIGS. 21 and 22A, 22B and 22C and Table 11. FIG. 21 is a diagram showing a lens configuration of an optical system (zoom optical system) in a state upon focusing on infinity according to Eleventh Example. The optical system LS(11) according to Eleventh Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 21. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; a positive meniscus lens L13 having a convex surface facing the object; and a positive meniscus lens L14 having a convex surface facing the object.

The second lens group G2 consists of, in order from the object: a negative meniscus lens L21 having a convex surface facing the object; a biconcave negative lens L22; a biconvex positive lens L23; and a cemented lens consisting of a biconcave negative lens L24, and a positive meniscus lens L25 having a convex surface facing the object. In this Example, the negative lens L24 of the second lens group G2 corresponds to a negative lens that satisfies the conditional expressions (1) to (4) and the like. In this Example, the second lens group G2 corresponds to an object-side negative lens group, and the negative lens L24 of the second lens group G2 corresponds to a negative lens that satisfies the conditional expressions (11) to (14) and the like.

The third lens group G3 consists of, in order from the object: a biconvex positive lens L31; a negative meniscus lens L32 having a convex surface facing the object; and a cemented lens consisting of a negative meniscus lens L33 having a convex surface facing the object, and a biconvex positive lens L34. The third lens group G3 constitutes a vibration-proof lens group that is movable in a direction perpendicular to the optical axis, and corrects variation in imaging position due to a camera shake and the like (image blur on the image surface I). The aperture stop S is disposed adjacent to the object side of the positive lens L31, and moves with the third lens group G3 upon zooming. The positive lens L31 has opposite lens surfaces that are aspherical surfaces.

The fourth lens group G4 consists of, in order from the object: a cemented lens consisting of a biconvex positive lens L41, and a biconcave negative lens L42. Upon focusing from the infinity object to the short-distant (finite distant) object, the fourth lens group G4 moves toward the image along the optical axis.

The fifth lens group G5 consists of, in order from the object: a cemented lens consisting of biconvex positive lens L51, and a negative meniscus lens L52 having a concave surface facing the object. An image surface I is disposed on the image side of the fifth lens group G5. The positive lens L51 has an object-side lens surface that is an aspherical surface. Similar to the Eighth Example, an optical filter FL is disposed between the fifth lens group G5 and the image surface I.

In this Example, the cemented lens consisting of the negative meniscus lens L11 and the positive lens L12, the positive meniscus lens L13, the positive meniscus lens L14, the negative meniscus lens L21, the negative lens L22, the positive lens L23, and the cemented lens consisting of the negative lens L24 and the positive meniscus lens L25 constitute the front group GF disposed closer to the object than the aperture stop S. The positive lens L31, the negative meniscus lens L32, the cemented lens consisting of the negative meniscus lens L33 and the positive lens L34, the cemented lens consisting of the positive lens L41 and the negative lens L42, and the cemented lens consisting of the positive lens L51 and the negative meniscus lens L52 constitute the rear group GR disposed closer to the image than the aperture stop S.

The following Table 11 lists values of data on the optical system according to Eleventh Example. Note that the sixth surface, and the nineteenth surface are virtual surfaces.

TABLE 11

[General Data]
Zooming ratio = 118.076

|  | W | M | T |
|---|---|---|---|
| f | 4.429 | 14.376 | 523.001 |
| FNO | 2.820 | 3.650 | 8.128 |
| 2ω | 85.436 | 30.806 | 0.863 |
| Y | 3.350 | 4.000 | 4.000 |
| TL | 167.110 | 170.132 | 264.500 |
| BF | 0.540 | 0.540 | 0.540 |
| fF | −12.897 | −17.631 | −239.375 |
| fR | 32.087 | 42.873 | −80.219 |

[Lens Data]

| Surface Number | R | D | nd | vd | OgF |
|---|---|---|---|---|---|
| 1 | 825.93933 | 2.900 | 1.80400 | 46.60 | 0.5575 |
| 2 | 112.39133 | 7.800 | 1.43700 | 95.10 | 0.5336 |
| 3 | −453.66816 | 0.100 | | | |
| 4 | 115.49170 | 6.300 | 1.49782 | 82.57 | 0.5386 |
| 5 | 9088.66420 | 0.100 | | | |
| 6 | ∞ | 0.000 | | | |
| 7 | 133.81125 | 4.700 | 1.49782 | 82.57 | 0.5386 |
| 8 | 571.60343 | D8(Variable) | | | |
| 9 | 55.85227 | 1.300 | 1.87071 | 40.73 | 0.5682 |
| 10 | 13.94864 | 7.000 | | | |
| 11 | −32.19593 | 1.200 | 1.80420 | 46.50 | 0.5572 |
| 12 | 57.84873 | 0.100 | | | |
| 13 | 28.64191 | 3.800 | 1.90200 | 25.26 | 0.6165 |
| 14 | −70.26333 | 1.600 | | | |
| 15 | −20.59922 | 1.000 | 1.68348 | 54.80 | 0.5501 |
| 16 | 39.38825 | 1.800 | 1.92286 | 20.88 | 0.6390 |
| 17 | 139.67089 | D17(Variable) | | | |
| 18 | ∞ | 0.600 | | (Aperture Stop S) | |
| 19 | ∞ | 1.106 | | | |
| 20* | 13.03513 | 4.100 | 1.49710 | 81.56 | 0.5385 |
| 21* | −80.65458 | 2.800 | | | |
| 22 | 26.48603 | 1.200 | 1.91082 | 35.25 | 0.5822 |
| 23 | 11.88277 | 2.000 | | | |
| 24 | 14.86421 | 1.200 | 1.77250 | 49.62 | 0.5518 |
| 25 | 11.87360 | 3.600 | 1.49782 | 82.57 | 0.5386 |
| 26 | −35.53498 | D26(Variable) | | | |
| 27 | 509.89664 | 1.200 | 1.53172 | 48.78 | 0.5622 |
| 28 | −22.32829 | 0.700 | 1.49700 | 81.61 | 0.5389 |
| 29 | 17.44965 | D29(Variable) | | | |
| 30* | 18.42875 | 2.000 | 1.58913 | 61.22 | 0.5401 |
| 31 | −31.60931 | 0.600 | 1.75520 | 27.57 | 0.6092 |
| 32 | −241.53196 | D32(Variable) | | | |
| 33 | ∞ | 0.400 | 1.51680 | 63.88 | 0.5360 |
| 34 | ∞ | 0.700 | | | |
| 35 | ∞ | 0.500 | 1.51680 | 63.88 | 0.5360 |
| 36 | ∞ | BF | | | |

[Aspherical Surface Data]

20th Surface

κ = 1.000, A4 = −3.21091E−05, A6 = −8.68271E−08
A8 = 0.00000E+00, A10 = 0.00000E+00, A12 = 0.00000E+00

21st Surface

κ = 1.000, A4 = 3.10451E−05, A6 = −2.93413E−08
A8 = 7.59720E−10, A10 = 0.00000E+00, A12 = 0.00000E+00

30th Surface

κ = 1.000, A4 = −1.73347E−06, A6 = 0.00000E+00
A8 = 0.00000E+00, A10 = 0.00000E+00, A12 = 0.00000E+00

[Variable distance data on zoom photographing]

|  | W | M | T |
|---|---|---|---|
| D8 | 0.750 | 41.177 | 143.201 |
| D17 | 80.493 | 34.159 | 1.024 |
| D26 | 2.275 | 10.638 | 22.193 |
| D29 | 14.580 | 16.417 | 33.124 |
| D32 | 6.065 | 4.795 | 2.012 |

[Lens Group Data]

| Group | First surface | Focal length |
|---|---|---|
| G1 | 1 | 170.892 |
| G2 | 9 | −11.362 |
| G3 | 18 | 22.993 |
| G4 | 27 | −38.719 |
| G5 | 30 | 33.447 |

[Conditional Expression Corresponding Value]

<Negative lens L24(fN1 = −19.656)>

Conditional Expression(1)
ndN1 − (2.015 − 0.0068 × vdN1) = 0.041
Conditional Expression(2)vdN1 = 54.80
Conditional Expression(3), (3-1)θgFN1 = 0.5501
Conditional Expression(4), (4-1)
θgFN1 − (0.6418 − 0.00168 × vdN1) = 0.0004
Conditional Expression(5)(−fN1)/fF = −1.524
Conditional Expression(6)(−fN1)/f = 4.438
Conditional Expression(7)DN1 = 1.000
<Negative lens L24(fN3 = −19.656)>

Conditional Expression(11)
ndN3 − (2.015 − 0.0068 × vdN3) = 0.041
Conditional Expression(12)vdN3 = 54.80
Conditional Expression(13), (13-1)θgFN3 = 0.5501
Conditional Expression(14), (14-1)

TABLE 11-continued

θgFN1 − (0.6418 − 0.00168 × vdN3) = 0.0004
Conditional Expression(15)fN3/fGa = 1.730
Conditional Expression(16)(−fGa)/f = 2.565
Conditional Expression(17)DN3 = 1.000

Figure 22B:
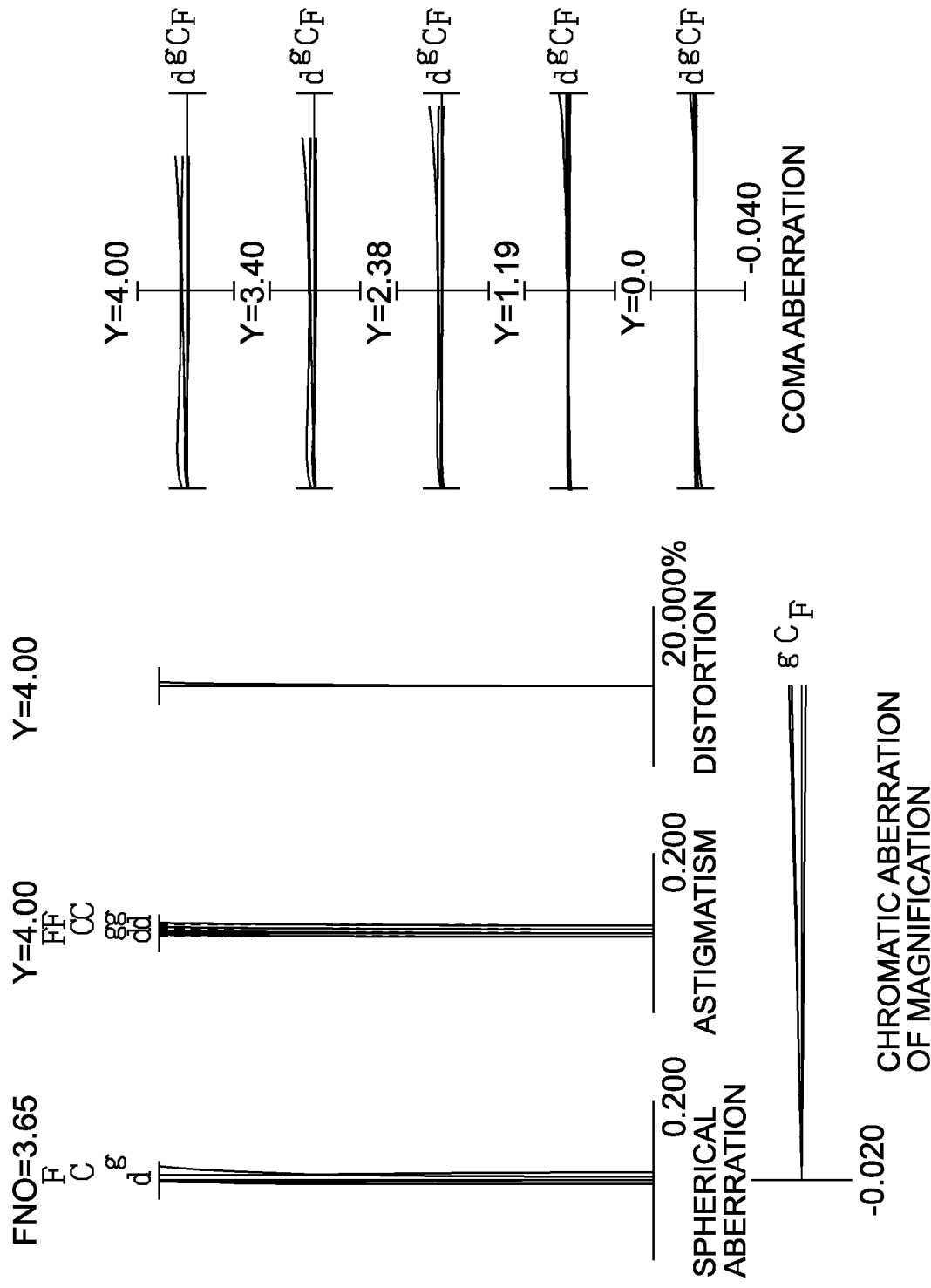

FIG. 22A shows various aberration graphs of the optical system according to Eleventh Example upon focusing on infinity in the wide angle end state. FIG. 22B shows various aberration graphs of the optical system according to Eleventh Example upon focusing on infinity in the intermediate focal length state. FIG. 22C shows various aberration graphs of the optical system according to Eleventh Example upon focusing on infinity in the telephoto end state. The various aberration graphs show that the optical system according to Eleventh Example has favorably corrected various aberrations, and exerts excellent imaging performance.

According to each Example, the optical system or the zoom optical system where for correction of chromatic aberrations, in addition to primary achromatization, the secondary spectrum is favorably corrected can be achieved.

Here, Examples described above show specific examples of the invention of the present application. The invention of the present application is not limited to these Examples.

Note that the following content can be adopted in a range without impairing the optical performance of the optical system of this embodiment.

The focusing lens group is assumed to indicate a portion that includes at least one lens separated by air distances changing upon focusing. That is, a focusing lens group may be adopted that moves a single or multiple lens groups, or a partial lens group in the optical axis direction to achieve focusing from the infinity object to the short-distant object. The focusing lens group is also applicable to autofocusing, and is suitable also for motor drive for autofocusing (using an ultrasonic motor).

In Second, Fifth, and Seventh to Eleventh Examples, the configurations having the vibration-proof function are described. However, the present application is not limited thereto, and may adopt a configuration having no vibration-proof function. The other Examples having no vibration-proof function may have a configuration having the vibration-proof function.

The lens surface may be made of a spherical surface or a planar surface, or an aspherical surface. A case where the lens surface is a spherical surface or a planar surface is preferable because lens processing, and assembling and adjustment are facilitated, and the optical performance degradation due to errors caused by processing and assembling and adjustment can be prevented. Furthermore, it is preferable because the degradation in representation performance even with the image surface being misaligned is small.

In a case where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

An antireflection film having a high transmissivity in a wide wavelength region may be applied onto each lens surface in order to reduce flares and ghosts and achieve optical performances having a high contrast. Accordingly, flares and ghosts can be reduced, and high optical performances having a high contrast can be achieved.

EXPLANATION OF NUMERALS AND CHARACTERS

| G1 First lens group | G2 Second lens group |
| G3 Third lens group | G4 Fourth lens group |
| G5 Fifth lens group | G6 Sixth lens group |
| I Image surface | S Aperture stop |

The invention claimed is:

1. An optical system, comprising:
an aperture stop; and a negative lens disposed in a lens group having negative refractive power, the lens group being disposed closer to an object than the aperture stop, wherein the negative lens satisfies the following conditional expressions:

$50.00 < vdN1 < 65.00$, $0.545 < \theta gFN1 \leq 0.55837$, $-0.010 < \theta gFN1 - (0.6418 - 0.00168 \times vdN1)$, where
vdN1: an Abbe number of the negative lens with reference to d-line, and
θgFN1: a partial dispersion ratio of the negative lens, defined by a following expression when a refractive index of the negative lens for g-line is ngN1, a refractive index of the negative lens for F-line is nFN1, and a refractive index of the negative lens for C-line is nCN1:

$\theta gFN1 = (ngN1 - nFN1)/(nFN1 - nCN1)$.

2. The optical system according to claim 1, consisting of:
the aperture stop; a front group disposed closer to the object than the aperture stop; and a rear group disposed closer to an image than the aperture stop,
wherein the front group includes the negative lens and satisfies the following conditional expression:

$-10.00 < (-fN1)/fF < 10.00$, where fN1: a focal length of the negative lens, and
fF: a focal length of the front group; in a case where the optical system is a zoom optical system, the focal length of the front group in a wide angle end state.

3. The optical system according to claim 1,
wherein the negative lens satisfies the following conditional expression:

$0.10 < (-fN1)/f < 15.00$, where fN1: the focal length of the negative lens, and
f: a focal length of the optical system; in a case where the optical system is a zoom optical system, the focal length of the optical system in a wide angle end state.

4. The optical system according to claim 1,
wherein the negative lens satisfies the following conditional expression:

$0.010 < \theta gFN1 - (0.6418 - 0.00168 \times vdN1)$.

5. The optical system according to claim 1,
wherein the negative lens satisfies the following conditional expression:

$DN1 > 0.400$ [mm]

where DN1: a thickness of the negative lens on an optical axis.

6. The optical system according to claim 1, wherein the negative lens is a single lens, or one lens of two lenses of a cemented lens consisting of the two lenses cemented to each other.

7. The optical system according to claim 1, wherein at least one lens surface of an object-side lens surface and an image-side lens surface of the negative lens is in contact with air.

8. The optical system according to claim 1, wherein the negative lens is a glass lens.

9. An optical apparatus comprising the optical system according to claim 1.

10. A method for manufacturing an optical system, the method comprises a step of arranging, in a lens barrel, an aperture stop, and a lens group having negative refractive power and including a negative lens, the lens group being disposed closer to an object than the aperture stop, the negative lens satisfying the following conditional expressions:

$$50.00 < vdN1 < 65.00,$$

$$0.545 < \theta gFN1 \leq 0.55837,$$

$$-0.010 < \theta gFN1 - (0.6418 - 0.00168 \times vdN1),$$

where vdN1: an Abbe number of the negative lens with reference to d-line, and

θgFN1: a partial dispersion ratio of the negative lens, defined by a following expression when a refractive index of the negative lens for g-line is ngN1, a refractive index of the negative lens for F-line is nFN1, and a refractive index of the negative lens for C-line is nCN1:

$$\theta gFN1 = (ngN1 - nFN1)/(nFN1 - nCN1).$$

11. A zoom optical system, comprising a plurality of lens groups that include lens groups having negative refractive powers,
wherein upon zooming, a distance between the lens groups adjacent to each other changes, and
an object-side negative lens group disposed closest to an object among the lens groups having the negative refractive powers includes a negative lens that satisfies the following conditional expressions:

$$50.00 < vdN3 < 65.00,$$

$$0.545 < \theta gFN3 \leq 0.55837,$$

$$-0.010 < \theta gFN3 - (0.6418 - 0.00168 \times vdN3),$$

where
vdN3: an Abbe number of the negative lens with reference to d-line, and
θgFN3: a partial dispersion ratio of the negative lens, defined by a following expression when a refractive index of the negative lens for g-line is ngN3, a refractive index of the negative lens for F-line is nFN3, and a refractive index of the negative lens for C-line is nCN3:

$$\theta gFN3 = (ngN3 - nFN3)/(nFN3 - nCN3).$$

12. The zoom optical system according to claim 11, wherein the negative lens satisfies the following conditional expression:

$$0.50 < fN3/fGa < 7.00$$

where fN3: the focal length of the negative lens, and
fGa: a focal length of the object-side negative lens group.

13. The zoom optical system according to claim 11, wherein the object-side negative lens group satisfies the following conditional expression:

$$0.20 < (-fGa)/f < 3.50$$

where fGa: a focal length of the object-side negative lens group, and
f: a focal length of the zoom optical system in a wide angle end state.

14. The zoom optical system according to claim 11, wherein the negative lens satisfies the following conditional expression:

$$0.010 < \theta gFN3 - (0.6418 - 0.00168 \times vdN3).$$

15. The zoom optical system according to claim 11, wherein the negative lens satisfies the following conditional expression:

$$DN3 > 0.400 \text{ [mm]}$$

where DN3: a thickness of the negative lens on an optical axis.

16. The zoom optical system according to claim 11, wherein the negative lens is a single lens, or one lens of two lenses of a cemented lens consisting of the two lenses cemented to each other.

17. The zoom optical system according to claim 11, wherein at least one lens surface of an object-side lens surface and an image-side lens surface of the negative lens is in contact with air.

18. The zoom optical system according to claim 11, wherein the negative lens is a glass lens.

19. An optical apparatus comprising the zoom optical system according to claim 11.

20. A method for manufacturing a zoom optical system that includes a plurality of lens groups including lens groups having negative refractive powers, the method comprises a step of arranging the plurality of lens groups in a lens barrel so that
upon zooming, a distance between the lens groups adjacent to each other changes, and
an object-side negative lens group disposed closest to an object among the lens groups having the negative refractive powers includes a negative lens that satisfies the following conditional expressions:

$$50.00 < vdN3 < 65.00,$$

$$0.545 < \theta gFN3 \leq 0.55837,$$

$$-0.010 < \theta gFN3 - (0.6418 - 0.00168 \times vdN3),$$

where
vdN3: an Abbe number of the negative lens with reference to d-line, and
θgFN3: a partial dispersion ratio of the negative lens, defined by a following expression when a refractive index of the negative lens for g-line is ngN3, a refractive index of the negative lens for F-line is nFN3, and a refractive index of the negative lens for C-line is nCN3:

$$\theta gFN3 = (ngN3 - nFN3)/(nFN3 - nCN3).$$

* * * * *